(12) United States Patent
Girsova et al.

(10) Patent No.: US 10,474,737 B1
(45) Date of Patent: Nov. 12, 2019

(54) DYNAMICALLY ADJUSTING TEXT IN DONUT CHARTS

(71) Applicant: Apple Inc., Cupertino, CA (US)

(72) Inventors: Elizaveta Girsova, San Jose, CA (US); Chao-Kuo Lin, Campbell, CA (US); Andrew L. Harding, Portola Valley, CA (US); Ryan M. Olshavsky, San Jose, CA (US); Carlyle C. Hoch, Glenshaw, CA (US); Kevin D. Broom, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 15/996,177

(22) Filed: Jun. 1, 2018

(51) Int. Cl.
*G06F 17/00* (2019.01)
*G06F 17/21* (2006.01)
*G06F 3/0481* (2013.01)
*G06F 3/0484* (2013.01)

(52) U.S. Cl.
CPC .......... *G06F 17/214* (2013.01); *G06F 3/0481* (2013.01); *G06F 3/04845* (2013.01)

(58) Field of Classification Search
CPC ... G06F 17/214; G06F 3/04845; G06F 3/0481
See application file for complete search history.

(56) References Cited

U.S. PATENT DOCUMENTS

| | | | | |
|---|---|---|---|---|
| 7,296,220 B2 * | 11/2007 | Yalovsky | ............... | G06F 17/245 714/30 |
| 8,638,333 B2 * | 1/2014 | Garg | ............... | G06F 16/904 345/440 |
| 9,282,200 B2 * | 3/2016 | Grosz | ............... | G06F 3/1242 |
| 10,311,141 B1 * | 6/2019 | Olkin | ............... | G06F 17/246 |
| 2006/0136825 A1 * | 6/2006 | Cory | ............... | G06T 11/206 715/700 |
| 2007/0002377 A1 * | 1/2007 | Tokunaga | ............... | G06F 17/211 358/1.18 |
| 2009/0327883 A1 * | 12/2009 | Robertson | ............... | G06F 16/44 715/273 |
| 2010/0162152 A1 * | 6/2010 | Allyn | ............... | G06F 3/0481 715/767 |

(Continued)

OTHER PUBLICATIONS

"How to add text inside the doughnut chart using Chart.js?", downloaded from https://stackoverflow.com/questions/20966817/how-to-add-text-inside-the-doughnut-chart-using-chart-js ; posted Jan. 7, 2014, pp. 1-11.*

*Primary Examiner* — Laurie A Ries
(74) *Attorney, Agent, or Firm* — Fletcher Yoder, P.C.

(57) ABSTRACT

The present disclosure relates to dynamically adjusting a title in a donut chart based on an adjustment to the donut chart. The donut chart may include an outer ring portion, an inner hole region, and the title. In particular, the title may be set based on the inner hole region to prevent the title from overlapping the outer ring portion which may prevent the title from obscuring labels located in the outer ring portion. As a property of the donut chart is adjusted, the title may be automatically adjusted for better visual effect. For example, the title may be dynamically resized and/or dynamically rewrapped. In this manner, the title may be dynamically adjusted based on an adjustment to the donut chart, avoiding the tedious process of manually adjusting the title for better visual effect.

20 Claims, 66 Drawing Sheets

(56) References Cited

U.S. PATENT DOCUMENTS

| | | | | |
|---|---|---|---|---|
| 2011/0225525 A1* | 9/2011 | Chasman | ............. | G06F 3/0486 |
| | | | | 715/763 |
| 2015/0347356 A1* | 12/2015 | Beaver | ...................... | G06F 3/03 |
| | | | | 345/472 |
| 2015/0356160 A1* | 12/2015 | Berwick | ............ | G06F 3/04842 |
| | | | | 715/781 |
| 2016/0092403 A1* | 3/2016 | McElwee | .............. | G06T 11/206 |
| | | | | 715/201 |
| 2016/0103581 A1* | 4/2016 | Kim | ..................... | G06F 3/0482 |
| | | | | 715/711 |
| 2016/0275144 A1* | 9/2016 | Herman | ............. | G06F 16/3328 |
| 2018/0121034 A1* | 5/2018 | Baker | .................. | G06F 3/0482 |
| 2018/0276182 A1* | 9/2018 | O'Donovan | ......... | G06F 17/212 |

\* cited by examiner

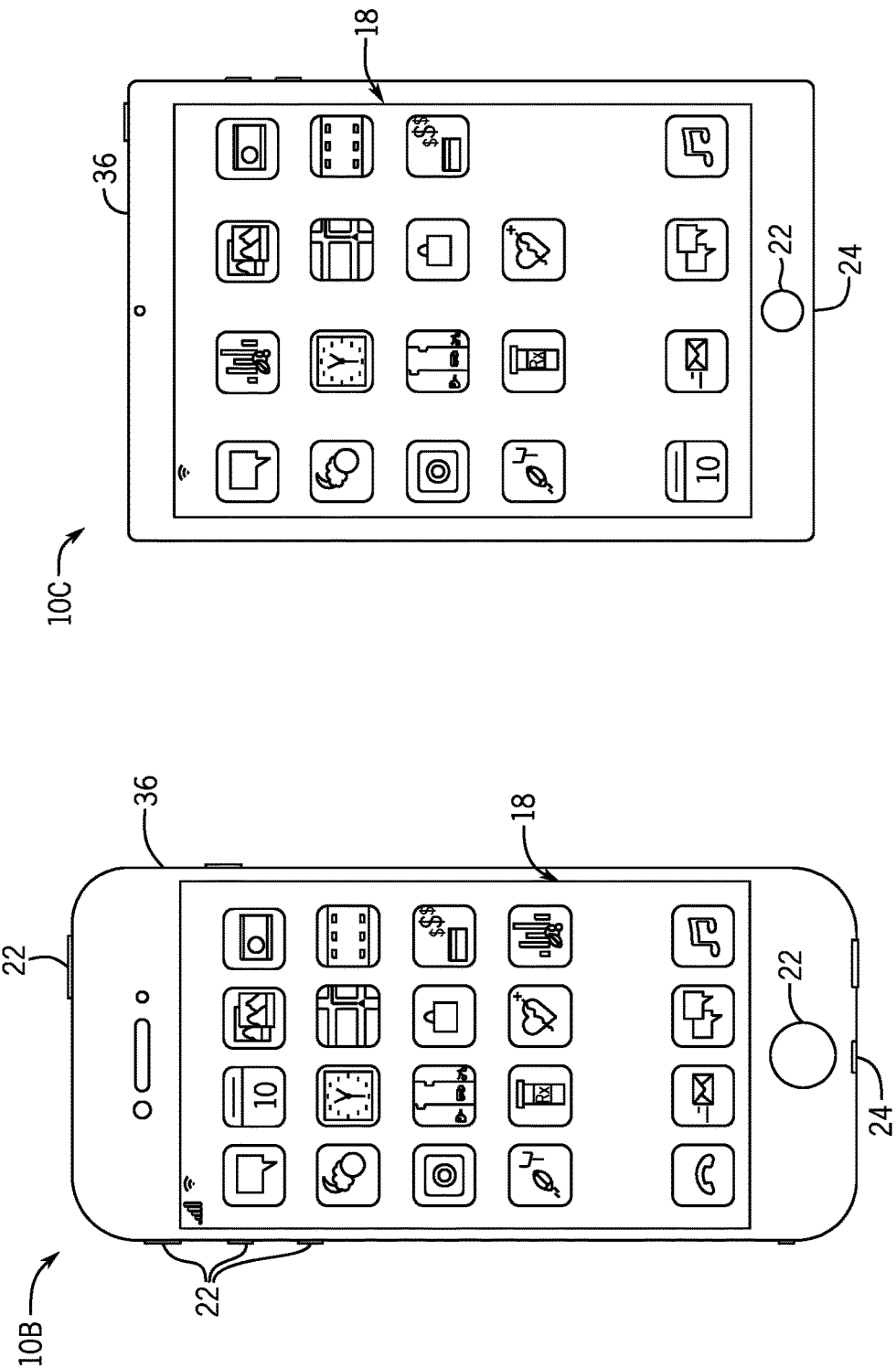

TO FIG. 18B

DYNAMICALLY ADJUSTING TEXT IN DONUT CHARTS

BACKGROUND

The present disclosure relates generally to adjusting displayed text and, more particularly, to dynamically adjusting text (e.g., a title) in a donut chart based on an adjustment to the donut chart.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A donut chart is a pie chart with an area of the center removed (creating an inner hole region bounded by an outer ring portion). The donut chart may be displayed in a user interface displayed on an electronic display. For example, the donut chart may be generated based on data in a spreadsheet. Text, such as in the form of a title, may be inserted in the inner hole region of the donut chart. However, the title may overlap the outer ring portion, which may, for example, obscure labels located in the outer ring portion. Moreover, the title may not be automatically or properly centered within the inner hole region. Additionally, a property (such as the font size of the title, the size of the donut chart, the size of the inner hole region, and the like) of the donut chart may be adjusted, but the title may not be automatically repositioned. As such, a user may tediously recenter and/or rewrap the text to adjust the title for better visual effect.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to dynamically adjusting text (e.g., a title) in a donut chart based on an adjustment to the donut chart. The donut chart may include an outer ring portion, an inner hole region, and the title (e.g., the inner text inside the inner hole region). In particular, the title may be set based on the inner hole region to prevent the title from overlapping the outer ring portion, which may, for example, prevent the title from obscuring labels located in the outer ring portion. In some embodiments, the title may be dynamically sized (e.g., the font size of the title may be adjusted) and dynamically wrapped (e.g., the locations of line breaks in the title may be adjusted) in the inner hole region of the donut chart for better visual effect. The title may be wrapped in a circular shape within the inner hole region such that the placement/rendering of the title better fits the curvature of the inner hole region, resulting in a more natural and pleasing look and feel. Moreover, as a property (such as the font size of the title, the size of the donut chart, the size of the inner hole region, and the like) of the donut chart may be adjusted, the title may be automatically adjusted for better visual effect. For example, the title may be dynamically resized (e.g., shrunk, shortened, lengthened, enlarged, and the like) and/or dynamically rewrapped (e.g., the locations of line breaks in the title may be adjusted). In this manner, the title may be dynamically adjusted based on an adjustment to the donut chart, avoiding the tedious process of manually adjusting the title for better visual effect.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION OF SPECIFIC EMBODIMENTS

Figure 1:
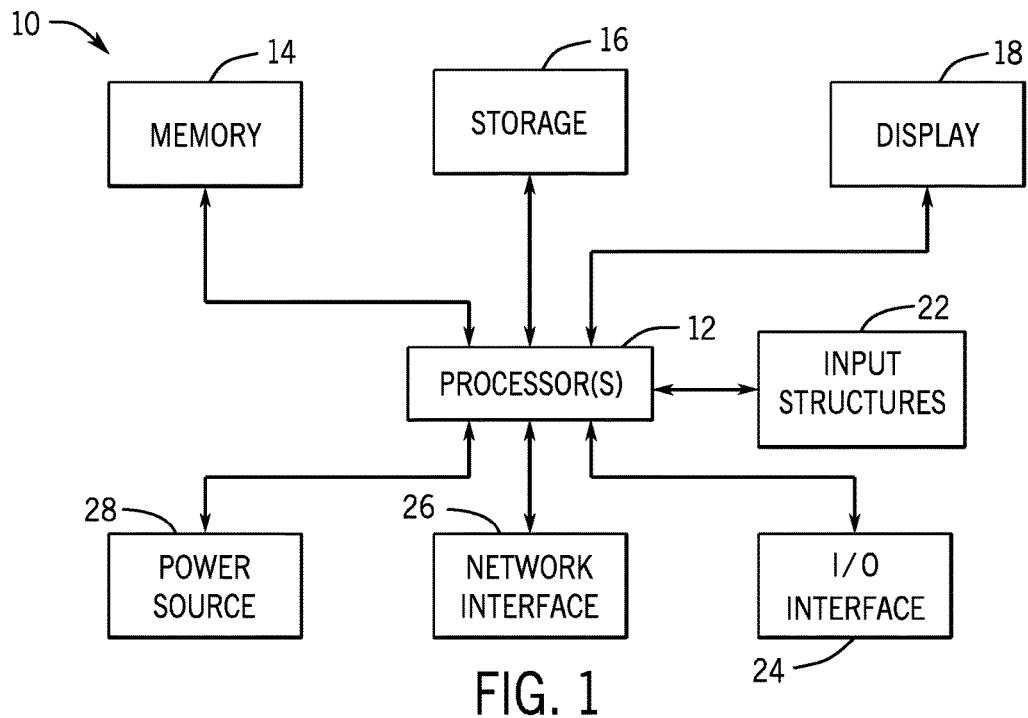
FIG. 1 is a schematic block diagram of an electronic device that dynamically adjusts a title in a donut chart based on an adjustment to the donut chart, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

A donut chart is a pie chart with an area of the center removed (creating an inner hole region bounded by an outer ring portion). The donut chart may be displayed in a user interface displayed on an electronic display. For example, the donut chart may be generated (e.g., automatically generated) based on data in a spreadsheet. Text, such as in the form of a title, may be inserted in the inner hole region of the donut chart. While the discussion herein refers to the text in the inner hole region as the "title," the techniques described herein are not intended to be limited to titles, but instead can be applied to any suitable text associated with the donut chart, such as text in the inner hole region of the donut chart.

The present disclosure includes techniques for dynamically adjusting the title in the donut chart based on an adjustment to the donut chart. In particular, the title may be set based on the inner hole region to prevent the title from overlapping the outer ring portion, which may, for example, prevent the title from obscuring labels located in the outer ring portion. In some embodiments, the title may be dynamically sized (e.g., the font size of the title may be adjusted) and dynamically wrapped (e.g., the locations of line breaks in the title may be adjusted) in the inner hole region of the donut chart for better visual effect. The title may be wrapped in a circular shape within the inner hole region such that the placement/rendering of the title better fits the curvature of the inner hole region, resulting in a more natural and pleasing look and feel. Moreover, as a property (such as the font size of the title, the size of the donut chart, the size of the inner hole region, and the like) of the donut chart may be adjusted, the title may be automatically adjusted for better visual effect. For example, the title may be dynamically resized (e.g., shrunk, shortened, lengthened, enlarged, and the like) and/or dynamically rewrapped (e.g., the locations of line breaks in the title may be adjusted). In this manner, the title may be dynamically adjusted based on an adjustment to the donut chart, avoiding tedious process of manually adjusting the title for better visual effect.

Figure 2:
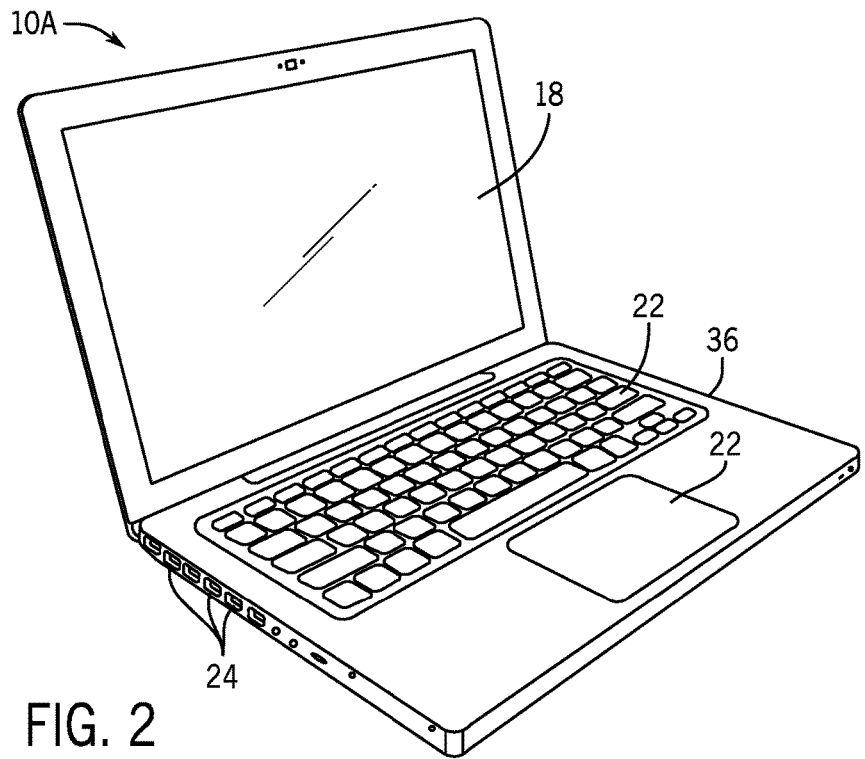
FIG. 2 is a perspective view of a notebook computer representing an embodiment of the electronic device of FIG. 1.
Figure 5:
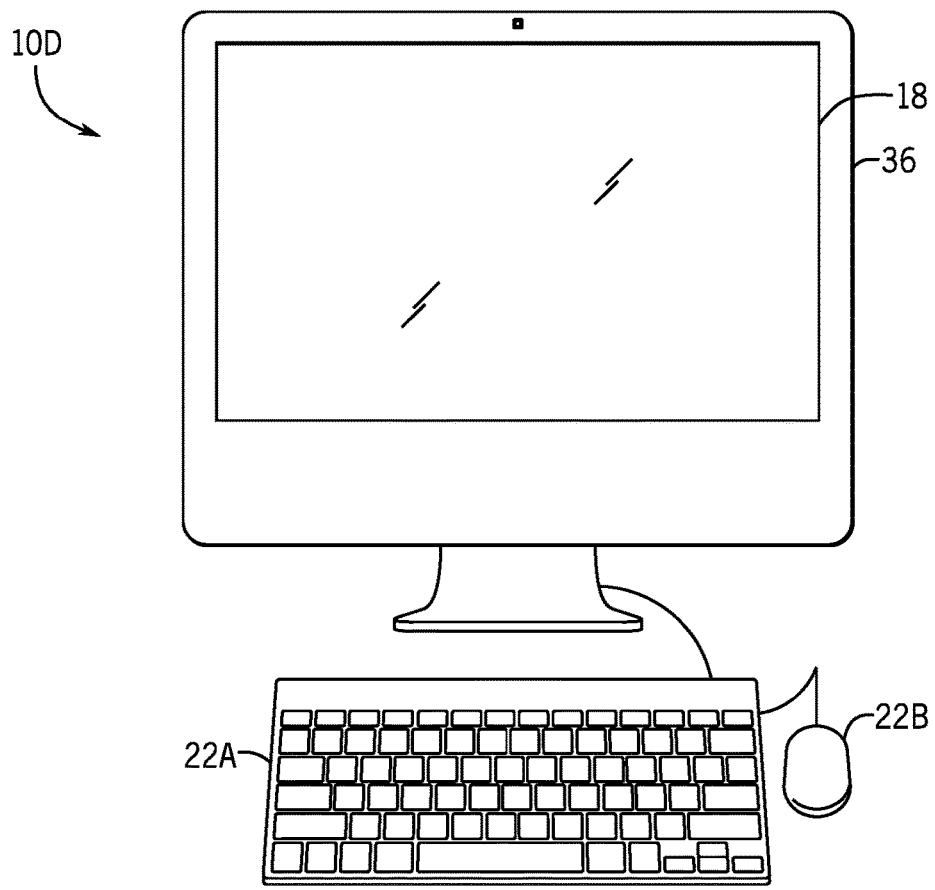
FIG. 5 is a front view of a desktop computer representing another embodiment of the electronic device of FIG. 1.
Figure 6:
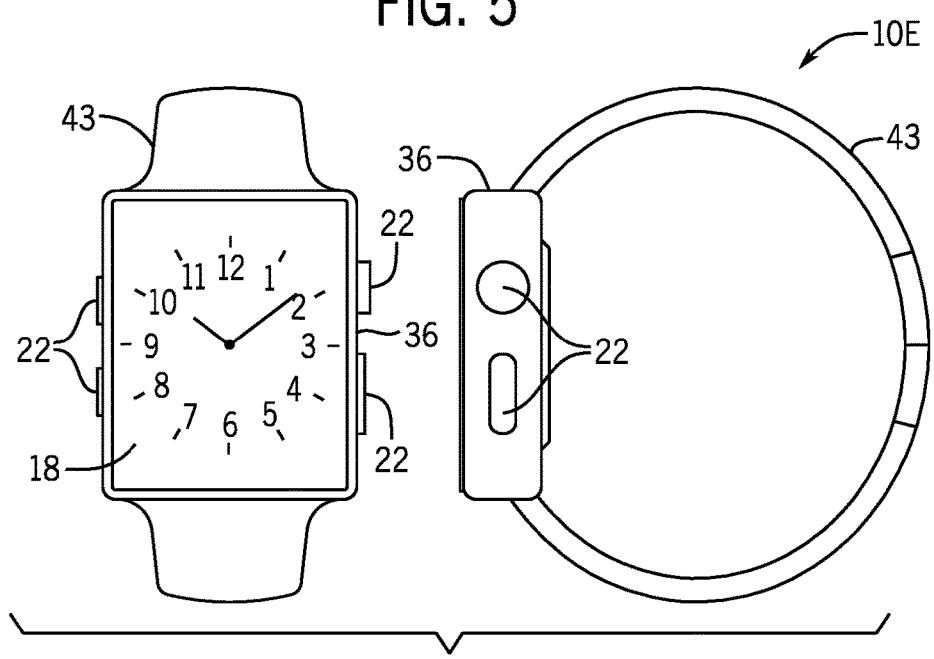
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. For example, the processor core complex 12 may carry out instructions stored in the local memory 14 and/or the main memory storage device 16 to set (e.g., size and/or wrap) a title in an inner hole region in a donut chart, detect user input of a property adjustment to the donut chart, and dynamically adjust (e.g., resize and/or rewrap) the title in the inner hole region based on the property adjustment. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. For example, the processor core complex 12 may supply image frames that display a donut chart and a title centered and positioned in the donut chart. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 according to embodiments of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal service bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a Mac-Book®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Adjusting the Donut Chart

Figure 7:
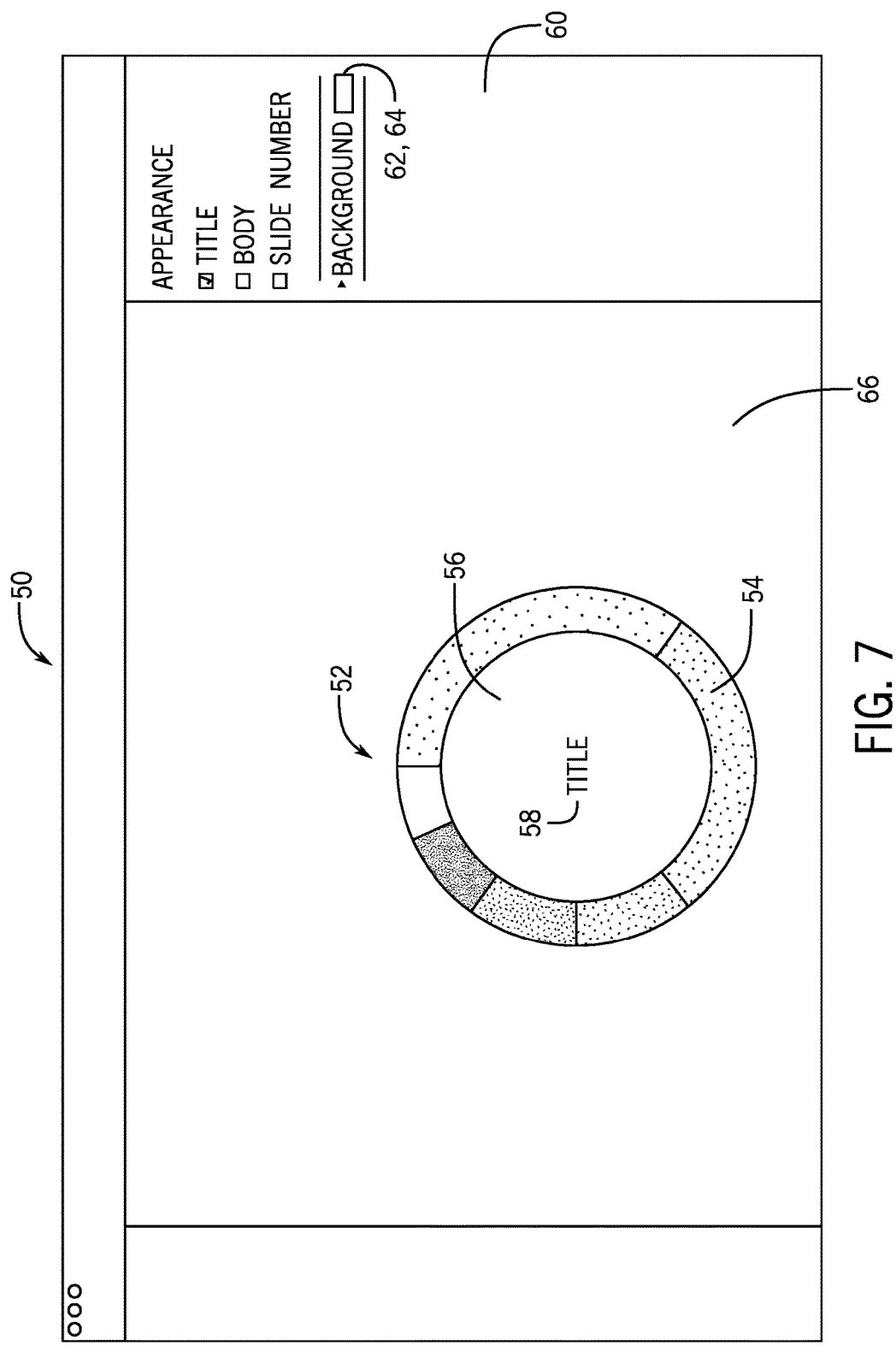
FIG. 7 illustrates a software application that displays and enables adjustment to a donut chart on a display of the electronic device of FIG. 1, according to embodiments of the present disclosure.

FIG. 7 illustrates a software application 50 that displays and enables adjustment to a donut chart 52 on a display 18 of the electronic device 10 of FIG. 1, according to embodiments of the present disclosure. The software application 50 may be any suitable software application that may generate and/or adjust the donut chart 52, such as a presentation application, word processing application, spreadsheet application, note-taking application, slideshow application, and the like. As illustrated, the donut chart 52 includes an outer ring portion 54, an inner hole portion 56, and a title 58. As illustrated, the title 58 may include placeholder text (e.g., "Title") when a user has not entered text for the title 58. The software application 50 may include a formatting panel 60, which may include one or more controls 62 that enable adjustment to at least some properties associated with the donut chart 52. For example, a background color control 64 may enable adjustment to a background color 66 associated with the donut chart 52. The background color 66 may include the color for the inner hole portion 56 of the donut chart 52.

Figure 8:
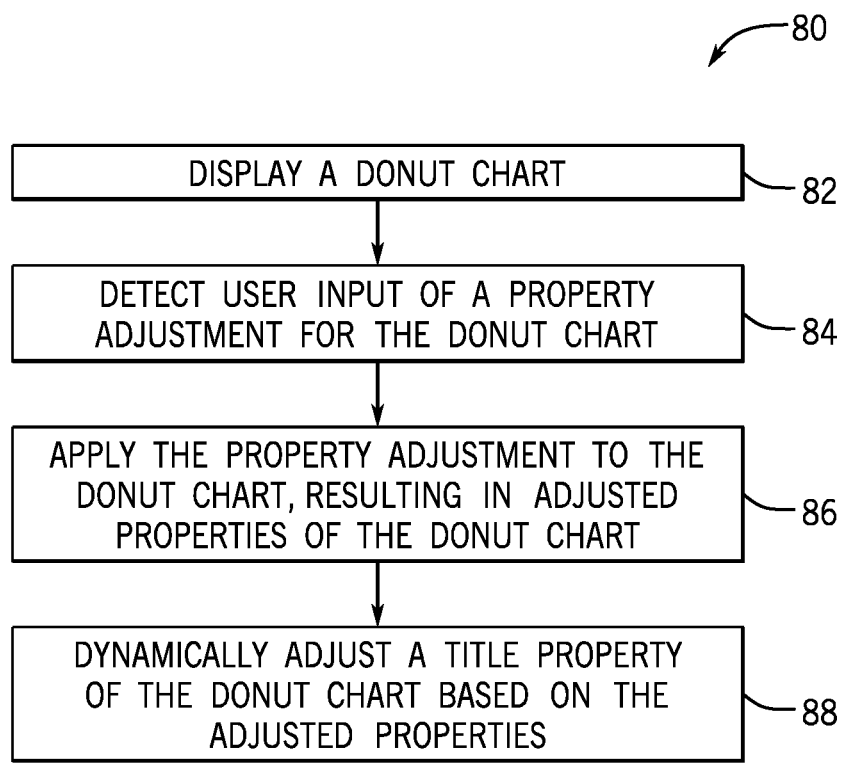
FIG. 8 is a flow diagram of a process for dynamically adjusting the title in the donut chart of FIG. 7 based on a property adjustment to the donut chart, according to embodiments of the present disclosure.

With this in mind, FIG. 8 is a flow diagram of a process 80 for dynamically adjusting the title 58 in the donut chart 52 based on a property adjustment to the donut chart 52, according to embodiments of the present disclosure. The process 80 may be in the form of an application (e.g., the software application 50) that includes instructions that are executed by at least one suitable processor of a computer system, such as the processor core complex 12 of the electronic device 10. The illustrated process 80 is merely provided as an example, and in other embodiments, certain illustrated steps of the process 80 may be performed in other orders, skipped, or repeated, according to embodiments of the present disclosure.

As illustrated, in process block 82, the processor core complex 12 may display the donut chart 52. For example, the donut chart 52 may be displayed on the display 18 of the electronic device 10. In particular, the donut chart 52 may have the outer ring portion 54 and the inner hole region 56, where the title 58 may be centered in the inner hole region 56, as shown in FIG. 7.

In process block 84, the processor core complex 12 may detect user input of one or more property adjustments for the donut chart 52. The user input may be provided by directly selecting a property of the donut chart 52 (e.g., the title 58) or a control 62 provided by the formatting panel 60, as discussed in further detail below. The one or more property adjustments may include any suitable adjustment of donut chart property, such as an adjustment to the donut chart 52, the outer ring portion 54, the inner hole portion 56, and/or the title 58. For example, the property adjustment may include adding text to the title 58, removing text from the title 58, resizing (e.g., increasing or decreasing) the donut chart 52, resizing the outer ring portion 54, relating a segment of the outer ring portion 54, changing a label of a segment of the outer ring portion 54, resizing the inner hole portion 56, resizing the title 58, repositioning the title 58, changing a font property of the title 58, and the like.

In process block 86, the processor core complex 12 may then apply the one or more property adjustments to the donut chart 52, resulting in one or more adjusted properties of the donut chart 52.

In process block 88, the processor core complex 12 may dynamically adjust one or more properties of the title 58 (e.g., title properties) of the donut chart 52 based on the one or more adjusted properties in response to applying the one or more property adjustments to the donut chart 58. Dynamically adjusting the properties of the title 58 may include any suitable adjustment to the title 58, such as dynamically resizing the title 58, dynamically re-centering the title 58, dynamically rewrapping the title 58 (e.g., dynamically adjusting the locations of line breaks in the title 58), and the like.

1. Adding or Removing Text to the Title of the Donut Chart

Figure 9A:
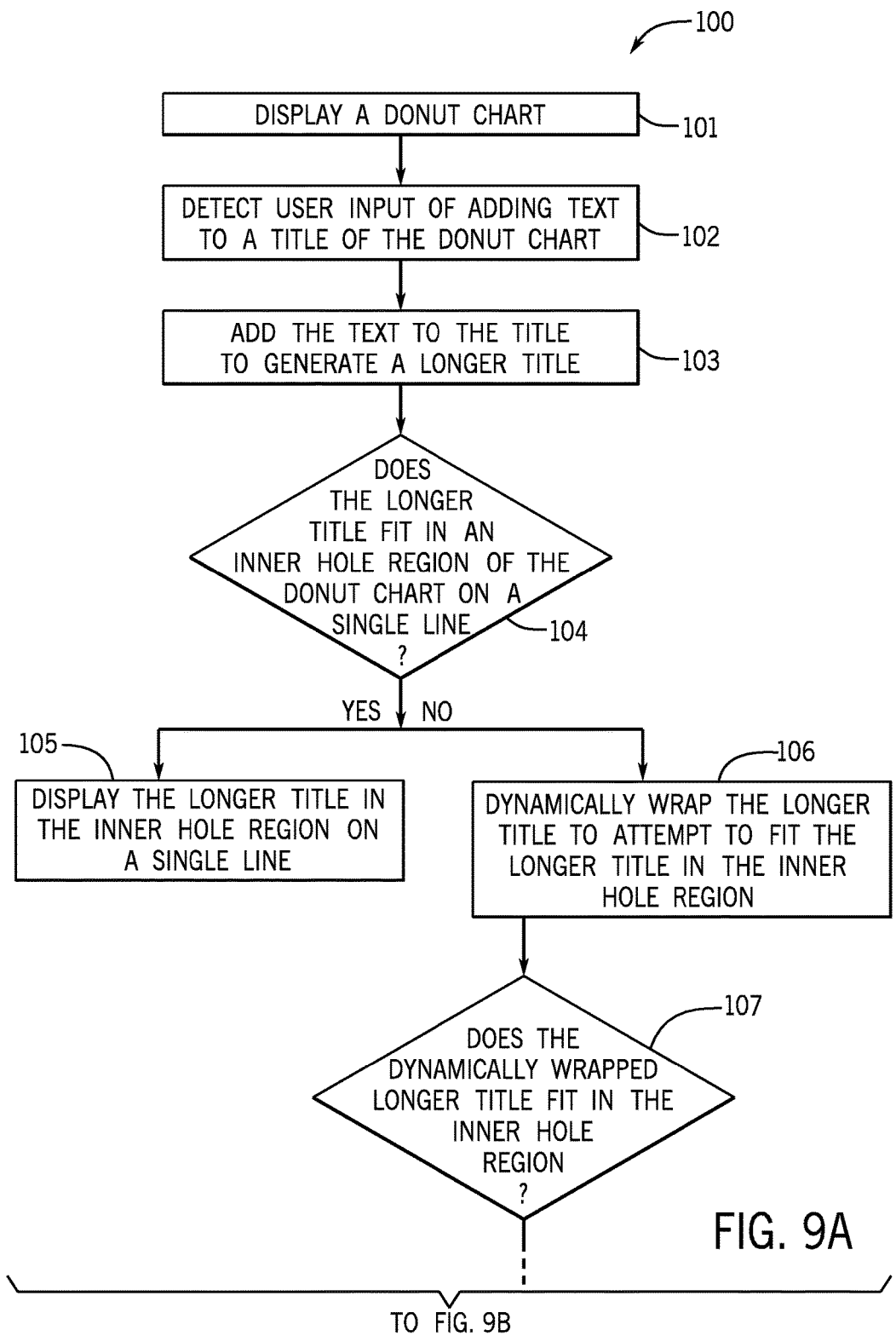
FIGS. 9A-B are a flow diagram of a more specific process for dynamically adjusting the title based on adding text to the title of the donut chart of FIG. 7, according to embodiments of the present disclosure.
Figure 9B:
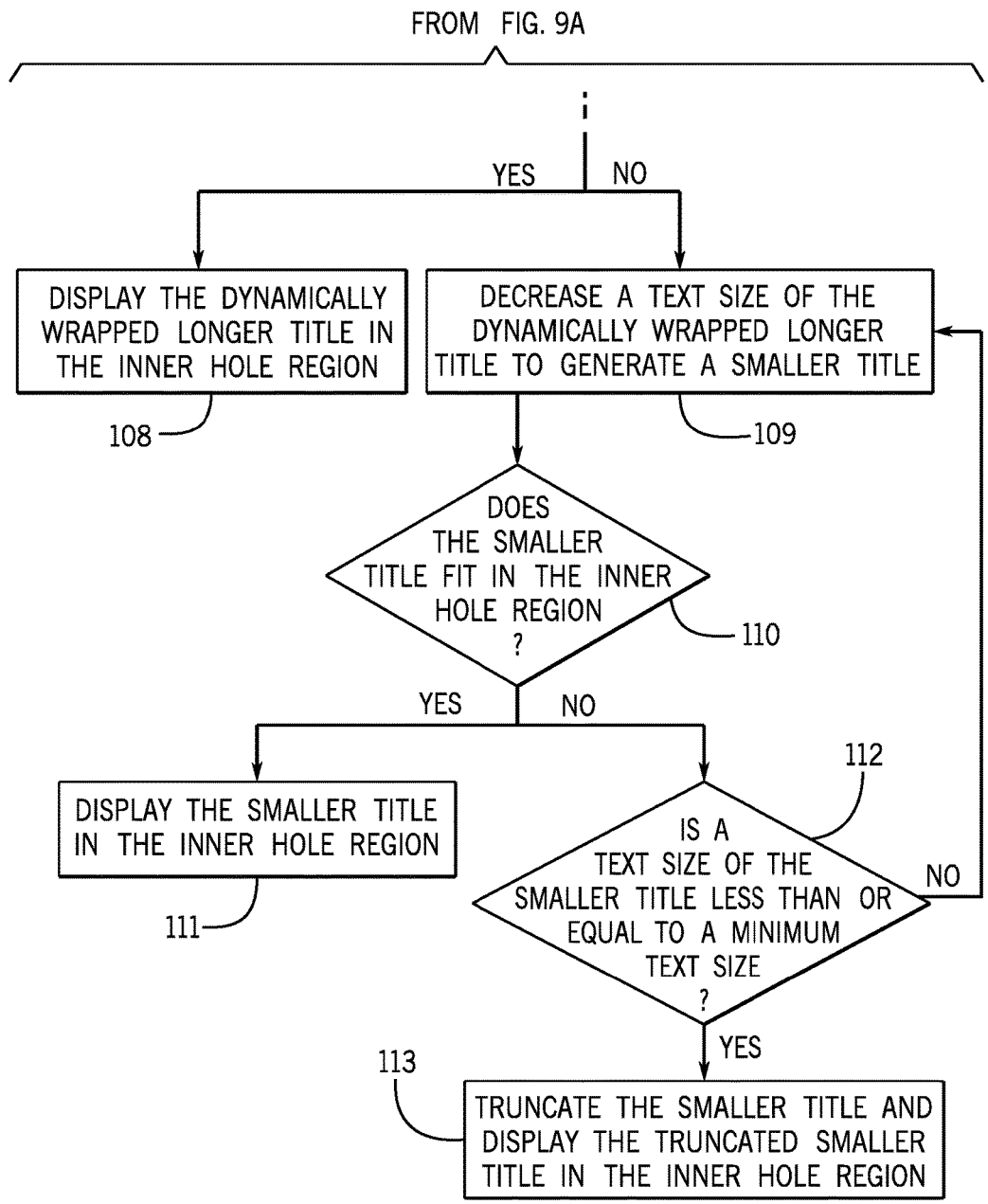

Keeping the process 80 of FIG. 8 in mind, FIGS. 9A-B are a flow diagram of a more specific process 100 for dynamically adjusting the title 58 based on adding text to the title 58 of the donut chart 52 of FIG. 7, according to embodiments of the present disclosure. The process 100 may be in the form of an application (e.g., the software application 50) that includes instructions that are executed by at least one suitable processor of a computer system, such as the processor core complex 12 of the electronic device 10. The illustrated process 100 is merely provided as an example, and in other embodiments, certain illustrated steps of the process 100 may be performed in other orders, skipped, or repeated, according to embodiments of the present disclosure.

Figure 10A:
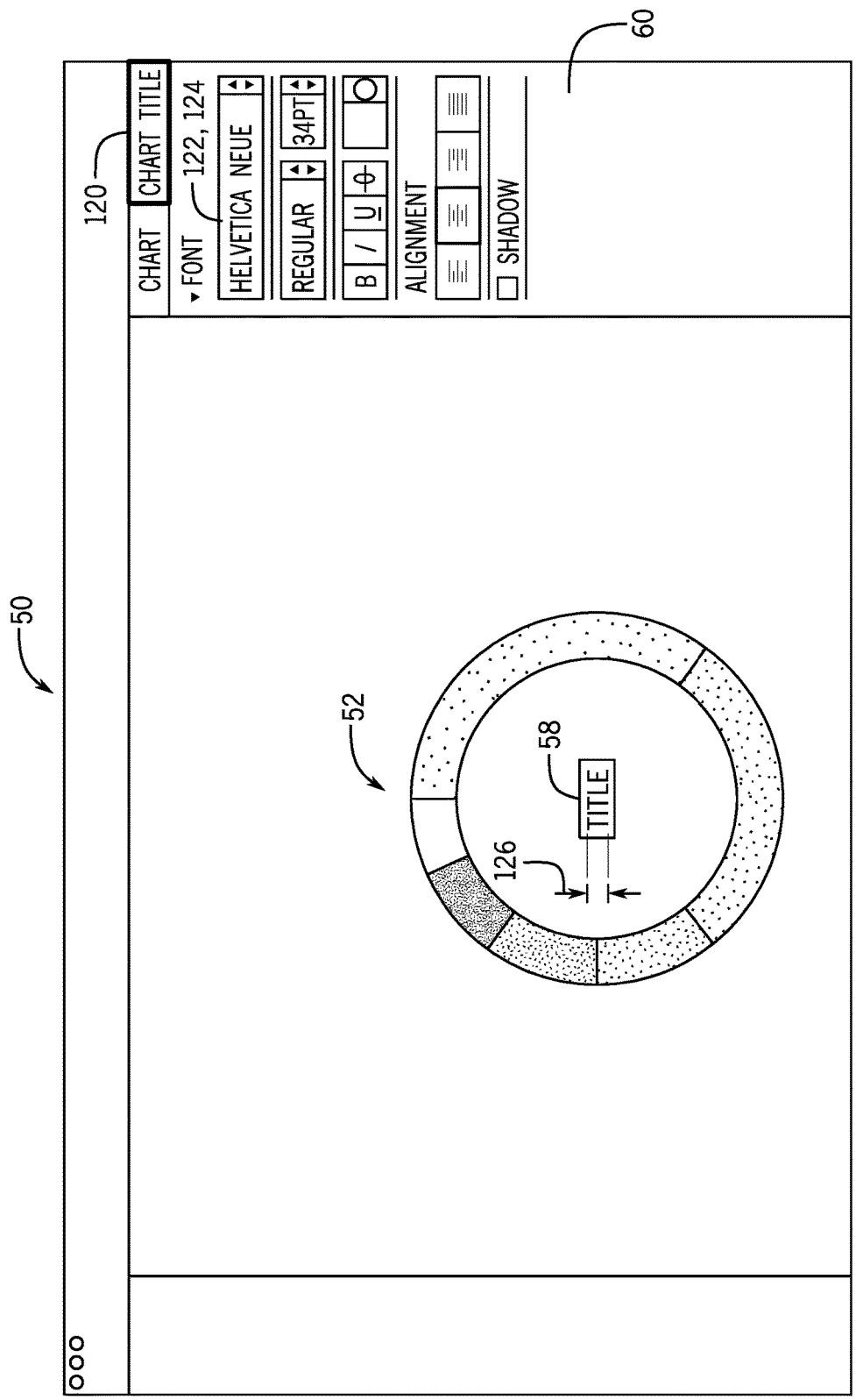
FIGS. 10A-D illustrate dynamically adjusting the title based on adding text to the title of the donut chart of FIG. 7, according to embodiments of the present disclosure.

As illustrated, in process block 101, the processor core complex 12 may display the donut chart 52. For example, FIGS. 10A-D illustrate dynamically adjusting the title 58 based on adding text to the title 58 of the donut chart 52 of FIG. 7, according to embodiments of the present disclosure. FIG. 10A illustrates the processor core complex 12 displaying the title 58 of the donut chart 52 having placeholder text and having been selected by the user (e.g., via a mousing device, touch using a touchscreen, a stylus device, or the like). Moreover, a title tab 120 of the formatting panel 60 may be selected, e.g., by the user or automatically when the title 58 is selected by the user. The title tab 120 may include one or more title controls 122 that enable adjustment to at least some properties associated with the title 58. For example, a font size control 124, which shows an initial font size 126 of the title 58 to be 34 points, may enable adjustment of the font size of the title 58. The initial font size 126 of the title 58 may be set by the user or by default (e.g., when first opening the software application 50).

Figure 10B:
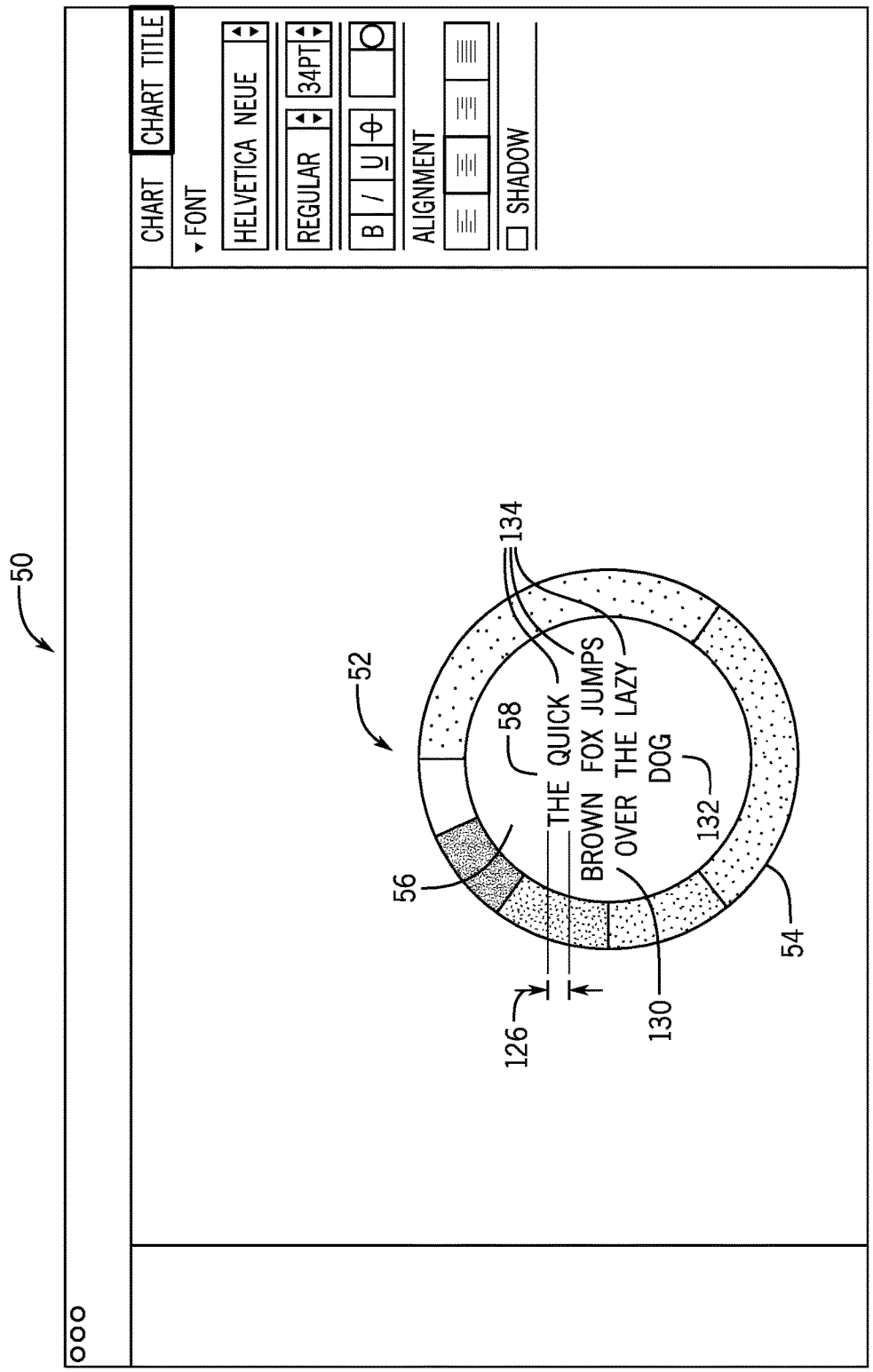

In process block 102, the processor core complex 12 may detect user input of adding text to the title 58 of the donut chart 52. For example, FIG. 10B illustrates the user adding text 130 (e.g., via a keyboard or other suitable text entry device or technique) to the title 58 after selecting the title 58. The text 130 is then detected and/or received by the processor core complex 12.

In process block 103, the processor core complex 12 may add the text 130 to the title 58 to generate a longer title. In FIG. 10B, the processor core complex 12 adds the text 130 to the title 58 in response to the detecting the user input of adding the text 130, generating a longer title 132.

In decision block 104, the processor core complex 12 may determine whether the longer title 132 fits in the inner hole region 56 of the donut chart 52 on a single line. That is, the processor core complex 12 may determine whether the longer title 132 fits within a bounding area (e.g., a surface area) of the inner hole region 56 as a single line of text, such that the longer title 132 does not overlap the outer ring portion 54 of the donut chart 52.

Figure 11A:
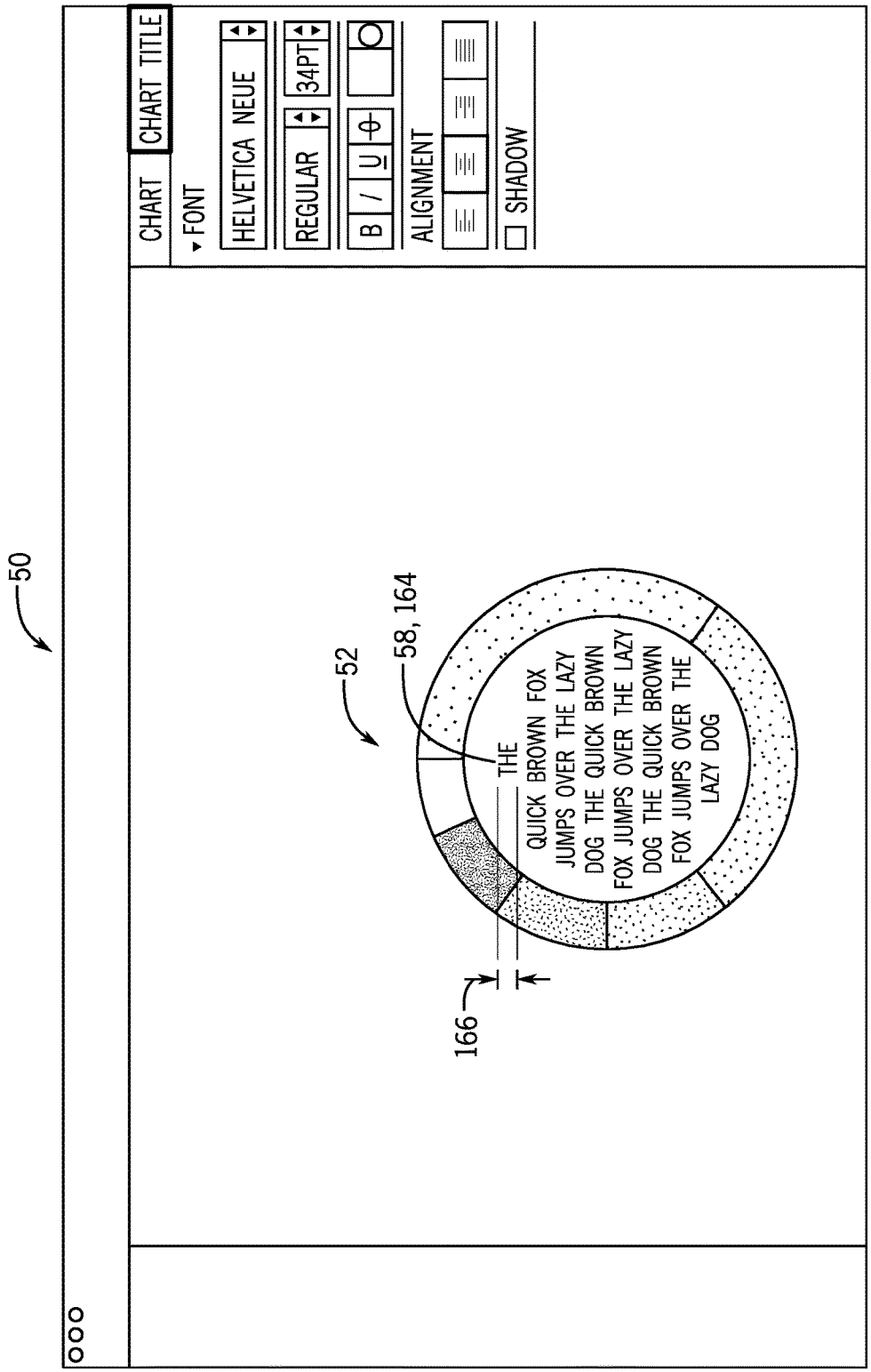
FIGS. 11A-D illustrate dynamically adjusting the title based on deleting text from the title of the donut chart of FIG. 10D, according to embodiments of the present disclosure.
Figure 11B:
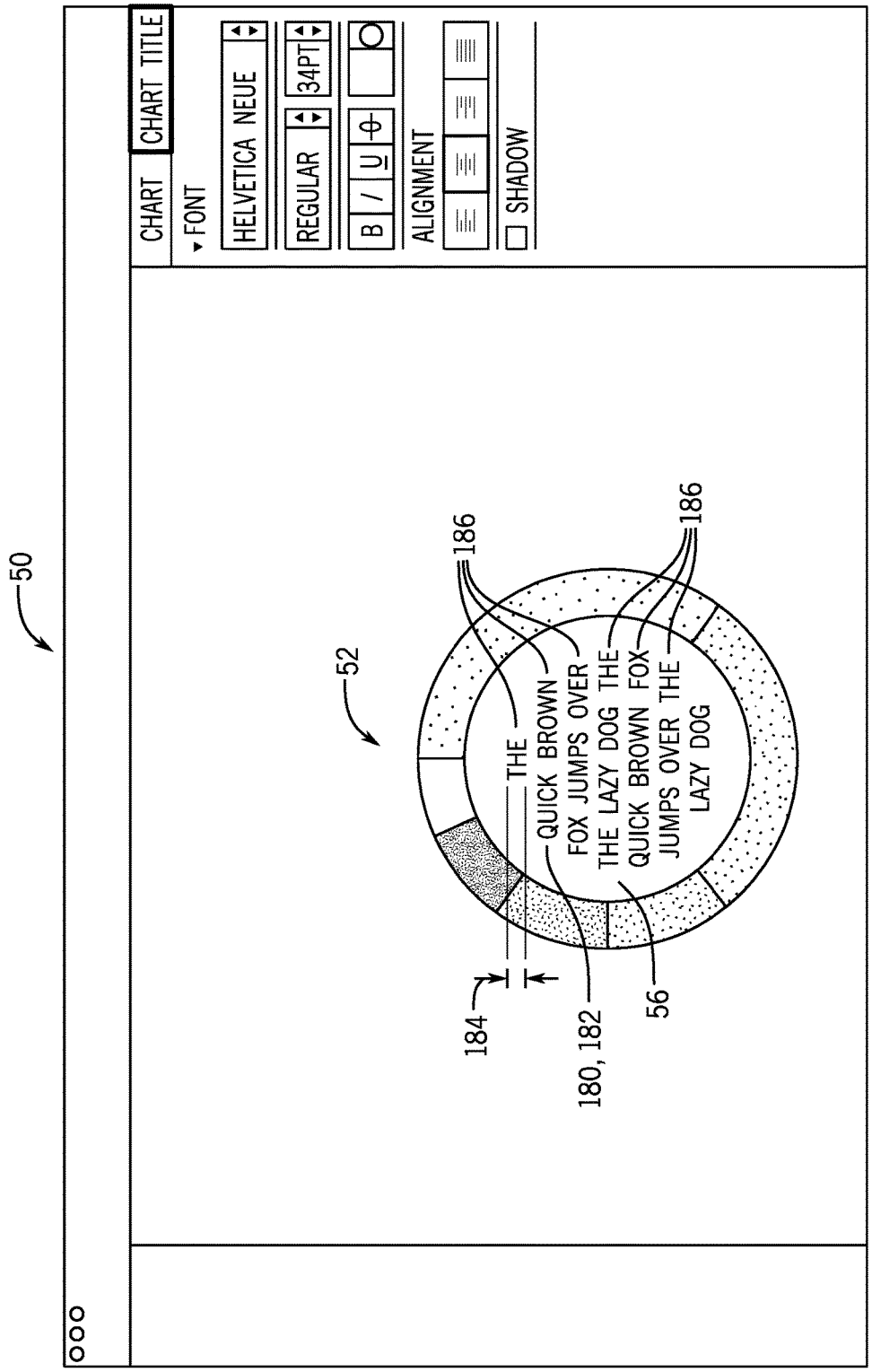

In process block 105, if the longer title 132 fits within the bounding area of the inner hole region 56 as a single line of text, such that the longer title 132 does not overlap the outer ring portion 54 of the donut chart 52, then the processor core complex 12 may display the longer title 132 in the inner hole region 56 as a single line of text. As an example, FIG. 11D illustrates the processor core complex 12 displaying a title 210 in the inner hole region 56 as a single line of text.

However, in process block 106, if the longer title 132 does not fit within the bounding area of the inner hole region 56 as a single line of text, such that the longer title 132 overlaps the outer ring portion 54 of the donut chart 52, then the processor core complex 12 may dynamically wrap the longer title 132 to attempt to fit the longer title 132 in the inner hole region 56. Specifically, the processor core complex 12 may dynamically position the line breaks 134 of the longer title 132 to attempt to fit the longer title 132 in the inner hole region 56 and/or center the longer title 132 in the inner hole region 56. For example, for the longer title 132 shown in FIG. 10B, the processor core complex 12 determines that the longer title 132 overlaps the outer ring portion 54 as a single line of text, and thus does not fit in the inner hole region 56. As such, the processor core complex 12 dynamically wraps the longer title 132 with line breaks 134 to attempt to fit the longer title 132 in the inner hole region 56.

In decision block 107, the processor core complex 12 may determine whether the dynamically wrapped longer title 132 fits in the inner hole region 56. If so, in process block 108, the processor core complex 12 may display the dynamically wrapped longer title 132 in the inner hole region 56. For example, as shown in FIG. 10B, the processor core complex 12 displays the dynamically wrapped longer title 132 in the inner hole region 56. As illustrated, the font size of the dynamically wrapped longer title 132 is the initial font size 126 (of the title 58 in FIG. 10A). This may be because the processor core complex 12 determines that the dynamically wrapped longer title 132 fits in the inner hole region 56 with the line breaks 134 (and so decreasing the size of the dynamically wrapped longer title 132 is unnecessary).

However, in process block 109, if the dynamically wrapped longer title 132 does not fit in the inner hole region 56, the processor core complex 12 may decrease a text size of the dynamically wrapped longer title 132 to generate a smaller title. For example, in FIG. 10C, the processor core complex 12 adds text 140 to the longer title 132 of FIG. 10B to generate an even longer title 142 (e.g., as a result of the user selecting the longer title 132 and adding the text 140 via a keyboard). The processor core complex 12 determines that the longer title 142 overlaps the outer ring portion 54, and thus does not fit in the inner hole region 56. As such, the processor core complex 12 dynamically decreases a text size of the longer title 142 to generate a smaller title 144. In particular, the processor core complex 12 may dynamically decrease a font size of the longer title 142 to generate the smaller title 144 having a smaller font size 146 smaller than the initial font size 126 (as shown in FIG. 10B). In some cases, other suitable techniques may be used to decrease the text size of the longer title 142 to generate the smaller title 144, such as decreasing space between text characters of the longer title 142, changing a font of the longer title 142, and the like. Additionally, in some embodiments, after decreasing the text size of a title (e.g., the longer title 142), the processor core complex 12 may dynamically rewrap the title to better fit and/or center the title in an inner hole region (e.g., the inner hole region 56).

In decision block 110, the processor core complex 12 may determine whether the smaller title 144 fits in the inner hole region 56. If so, in process block 111, the processor core complex 12 may display the smaller title 144 in the inner hole region 56 as shown in, for example, FIG. 10C.

Figure 10C:
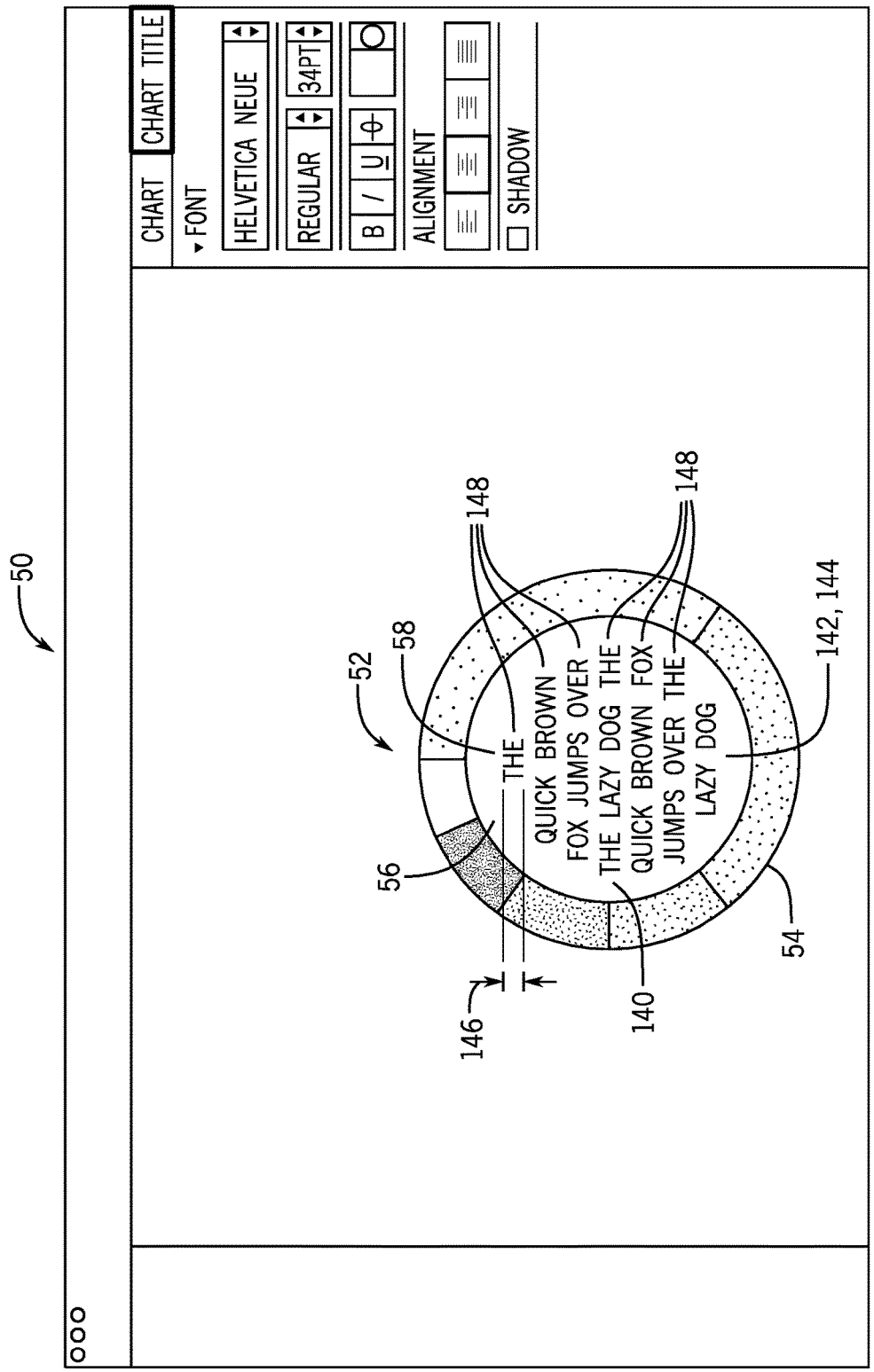
Figure 10D:
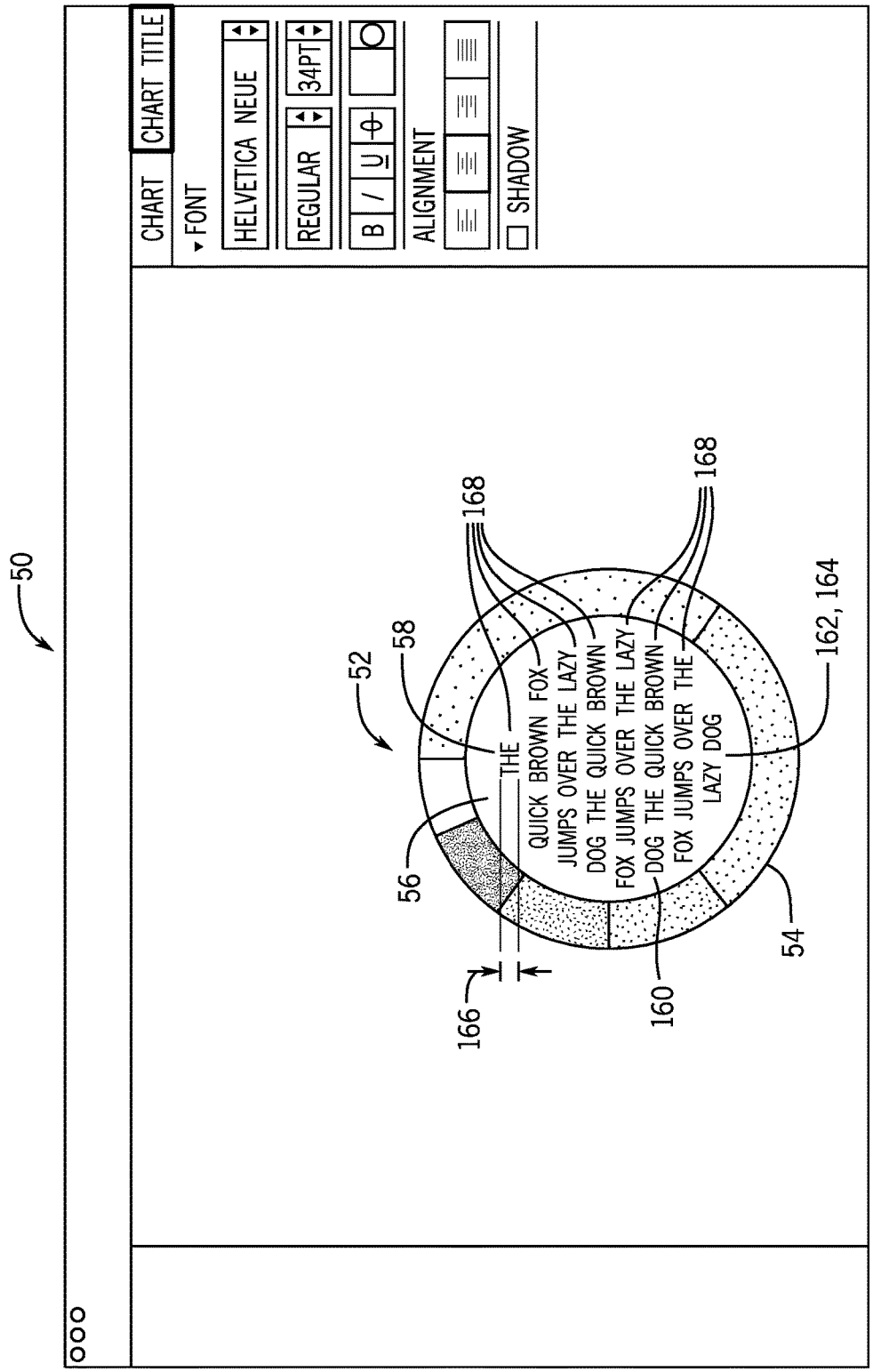

FIG. 10D provides another example of the processor core complex 12 adding text to the title 58 to generate a longer title 58. For example, the processor core complex 12 adds the text 160 to the longer title 142 of FIG. 10C to generate an even longer title 162 (e.g., as a result of the user selecting the longer title 142 and adding the text 160 via a keyboard). The processor core complex 12 determines that the longer title 162 overlaps the outer ring portion 54, and thus does not fit in the inner hole region 56. As such, the processor core complex 12 dynamically decreases a text size of the longer title 162 (e.g., by decreasing a font size of the longer title 162) to generate a smaller title 164 that fits in the inner hole region 56. The smaller title 164 thus has a smaller font size 166 than the font size 146 (as shown in FIG. 10C). Additionally, in some embodiments, after decreasing the text size of a title (e.g., the longer title 162), the processor core complex 12 may dynamically rewrap the title to better fit and/or center the title in an inner hole region (e.g., the inner hole region 56).

In decision block 112, if the processor core complex 12 determines that the smaller title (e.g., 144 of FIG. 10C) does not fit in the inner hole region 56, then the processor core complex 12 may determine whether the text size 146 of the smaller title 144 is less than or equal to a minimum text size. The minimum text size may be associated with a readability threshold. That is, the minimum text size may be sufficiently small to be considered unreadable or at least difficult to read. The minimum text size may be any suitable font size that may be considered unreadable or at least difficult to read, such as under 12 point font, under 10 point font, under 6 point font, or the like. If the processor core complex 12 determines that the text size 146 of the smaller title 144 is greater than the minimum text size, the processor core complex 12 may decrease the text size of the smaller title 144 (e.g., by returning to process block 109). Otherwise, if the processor core complex 12 determines that the text size 146 of the smaller title 144 is less than or equal to the minimum text size, in process block 113, the processor core complex 12 may truncate the smaller title 144 and display the truncated smaller title 144 in the inner hole region 56. That is, the processor core complex 12 may remove a portion of the smaller title 144 and display a unique text character indicating that the smaller title 144 has been truncated. The unique text character may be any suitable text character that may indicate that at least a portion of the smaller title 144 has been removed, such as an ellipsis. FIGS. 21C and 22B illustrate examples of truncated titles 582, 610. Additionally, in some embodiments, after truncating a title (e.g., the smaller title 144), the processor core complex 12 may dynamically rewrap the title to better fit and/or center the truncated title in an inner hole region (e.g., the inner hole region 56).

The processor core complex 12 may also dynamically adjust the title 58 based on deleting text from the title 58. For example, FIGS. 11A-D illustrate dynamically adjusting the title 58 based on deleting text from the title 58 of the donut chart 52 of FIG. 10D, according to embodiments of the present disclosure. In particular, FIG. 11A illustrates the donut chart 52 having the title 58 (e.g., the smaller title 164) that has been previously decreased in size. The smaller title 164 has the font size 166 shown in FIG. 10D.

The processor core complex 12 may detect user input of deleting text from the title 58, generating a shorter title 180. For example, FIG. 11B illustrates the donut chart 52 having the shorter title 180. If the title 58 was previously decreased in size, then the processor core complex 12 may increase the size of the shorter title 180 (e.g., to a size that enables the shorter title 180 to better fit in the inner hole region 56), but not beyond an initial or original size of the smaller title 164. In particular, FIG. 10A provides an initial size 126 (e.g., the size 126 of the title 58) of the smaller title 164 before it was decreased in size at 34 points, according to the font size control 124. Because the title 58 (e.g., the smaller title 164) was previously decreased in size, the processor core complex 12 increases the size of the shorter title 180 to generate a larger title 182 having a larger font size 184, but not beyond the initial or original size 126 of the title 58 (e.g., the size 126 of the title 58 in FIG. 10A). This way, the size 184 of the larger title 182 may not exceed a size 126 initially set by the user or by default. Additionally or alternatively, the processor core complex 12 may increase the size of the shorter title 180 without limit.

The processor core complex 12 may then determine whether the larger title 182 fits in the inner hole region 56 on a single line of text. If so, the processor core complex 12 may display the larger title 182 in the inner hole region 56 as a single line of text. If the larger title 182 does not fit in the inner hole region 56 on a single line of text, then the processor core complex 12 may dynamically wrap the larger title 182. Specifically, the processor core complex 12 may dynamically position line breaks 186 of the larger title 182 to attempt to fit the larger title 182 in the inner hole region 56 and/or center the larger title 182 in the inner hole region 56. For example, FIG. 11B illustrates the larger title 182 that has been dynamically wrapped by the processor core complex 12 with the line breaks 186.

Figure 11C:
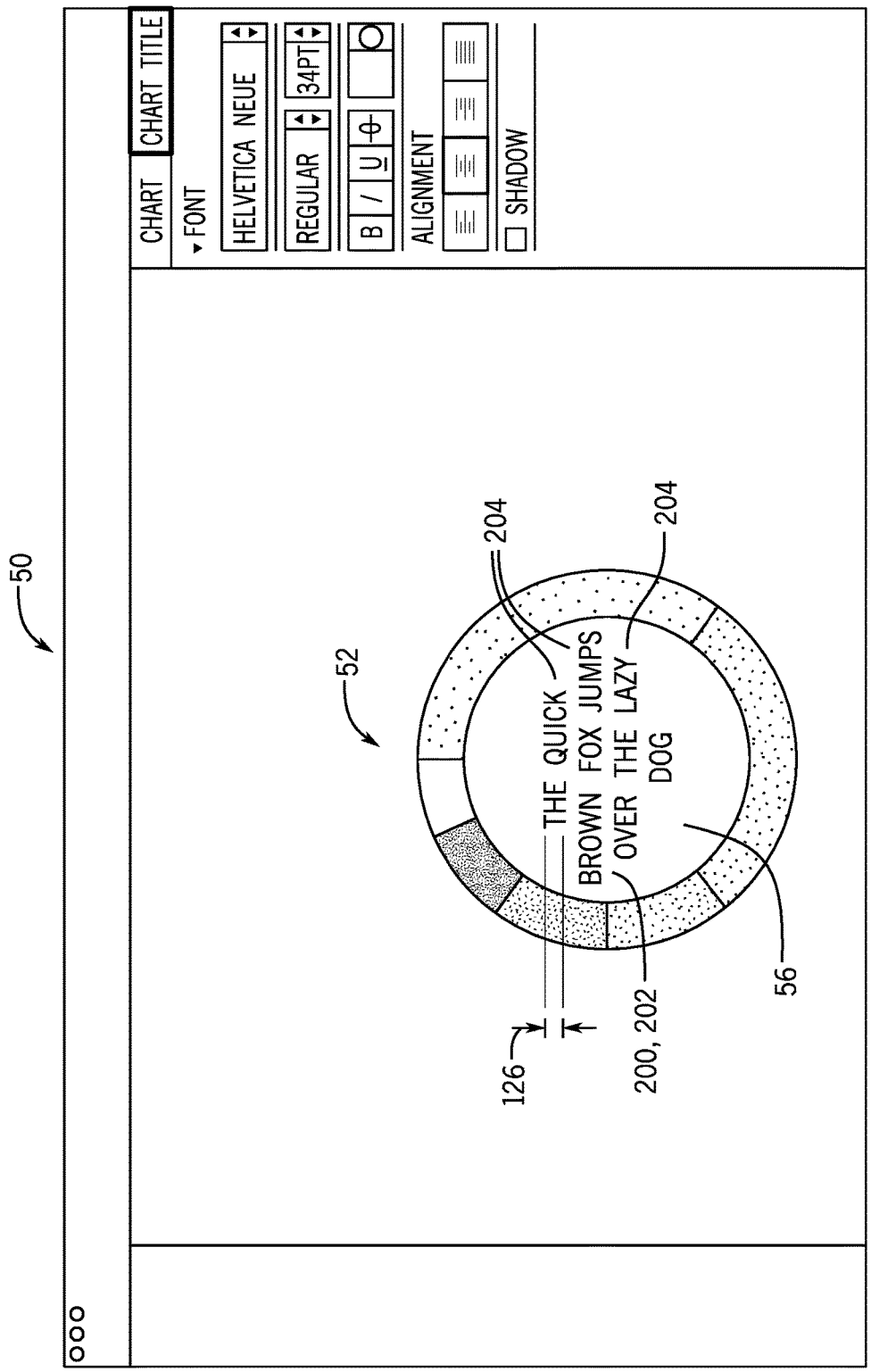
Figure 11D:
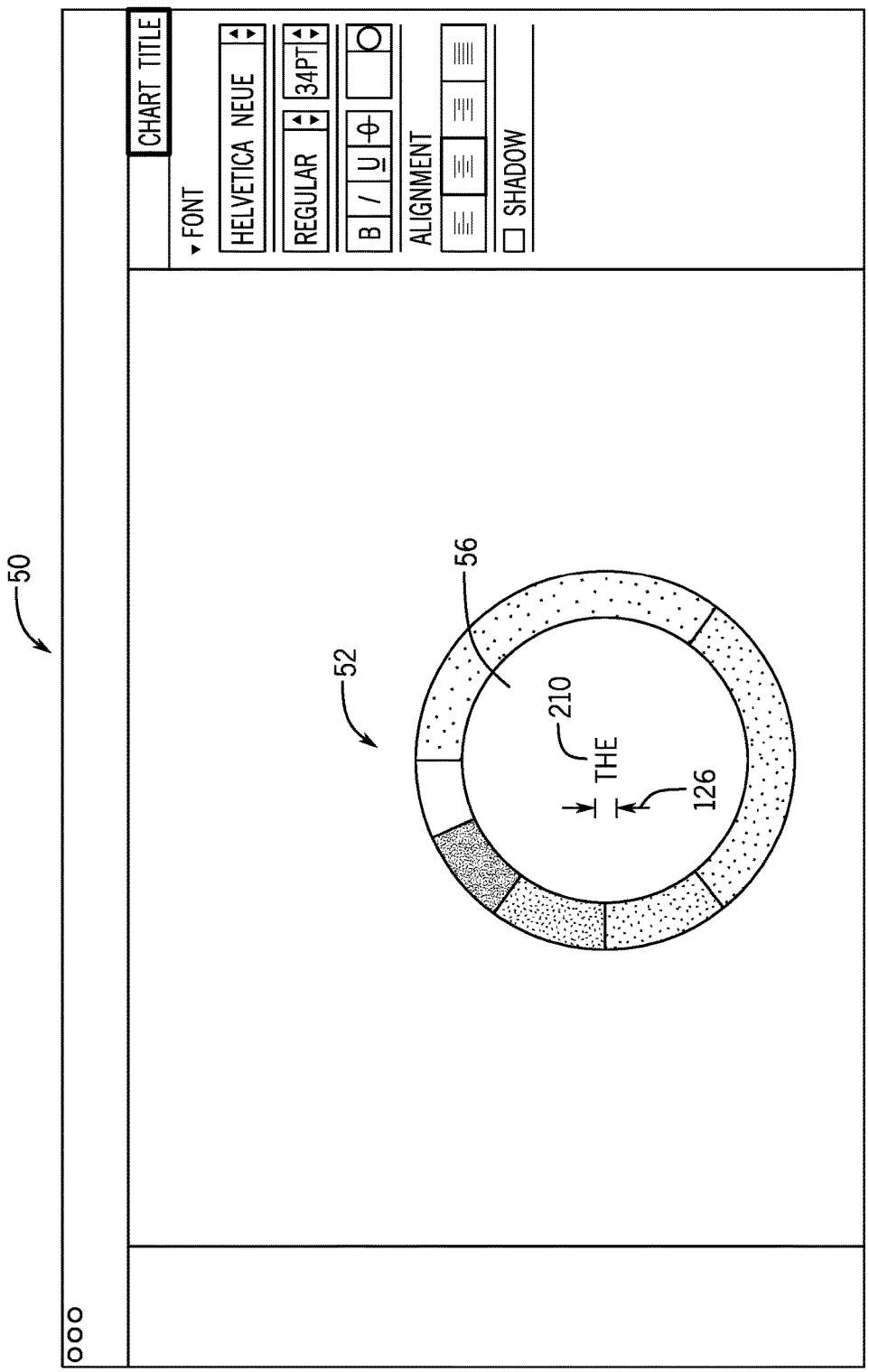

In FIG. 11C, the processor core complex 12 may detect user input of deleting text from the larger title 182, generating a shorter title 200. The processor core complex 12 increases the size of the shorter title 200 to generate an even larger title 202 having a larger font size 126. In some embodiments, the larger font size 126 may be limited, such that it does not exceed the initial or original size 126 of the title 58 (e.g., the size 126 of the title 58 in FIG. 10A). As illustrated, the processor core complex 12 increases the size of the shorter title 200 to the initial size 126 of the title 58 to better fit in the inner hole region 56. As such, the processor core complex 12 may not increase the size 126 of the larger title 202 any further. Additionally or alternatively, the processor core complex 12 may increase the size of the shorter title 200 without limit.

The processor core complex 12 may then determine whether the larger title 202 fits in the inner hole region 56 on a single line of text. If so, the processor core complex 12 may display the larger title 202 in the inner hole region 56 as a single line of text. If the larger title 202 does not fit in the inner hole region 56 on a single line of text, then the processor core complex 12 may dynamically wrap the larger title 202. Specifically, the processor core complex 12 may dynamically position line breaks 204 of the larger title 202 to attempt to fit the larger title 202 it in the inner hole region 56 and/or center the larger title 202 in the inner hole region 56. For example, FIG. 11C illustrates the larger title 202 that has been dynamically wrapped by the processor core complex 12 with the line breaks 204.

In FIG. 11D, the processor core complex 12 may detect user input of deleting text from the larger title 202, generating a shorter title 210. Because the larger title 202 was previously decreased in size, but is already the initial or original size 126 of the title 58 (e.g., the size 126 of the title 58 in FIG. 10A), the processor core complex 12 may not increase the size 126 of the shorter title 210 any further. Additionally or alternatively, the processor core complex 12 may increase the size of the shorter title 210 without limit.

The processor core complex 12 may then determine whether the shorter title 210 fits in the inner hole region 56 on a single line of text. If so, the processor core complex 12 may display the shorter title 210 in the inner hole region 56 as a single line of text. If the shorter title 210 does not fit in the inner hole region 56 on a single line of text, then the processor core complex 12 may dynamically wrap the shorter title 210. Specifically, the processor core complex 12 may dynamically position line breaks of the shorter title 210 to attempt to fit the shorter title 210 in the inner hole region 56 and/or center the shorter title 210 in the inner hole region 56. FIG. 11D does not illustrate the line breaks since the shorter title 210 only has one line of text.

Dynamically wrapping and/or resizing the title 58 may be performed in real-time as, for example, any text character is added or removed from the title 58. As such, for multi-character text entered one character at a time (e.g., via a keyboard), the title 58 may be dynamically wrapped and/or dynamically resized each time a character is added. Additionally, if multi-character text is entered more than one character at a time (e.g., via a paste operation), the title 58 may be dynamically wrapped and/or resized after the paste operation is performed. For example, FIGS. 12A-C illustrate dynamically adjusting the title 58 based on pasting text to the title 164 of the donut chart 52 of FIG. 10B, according to embodiments of the present disclosure.

Figure 12A:
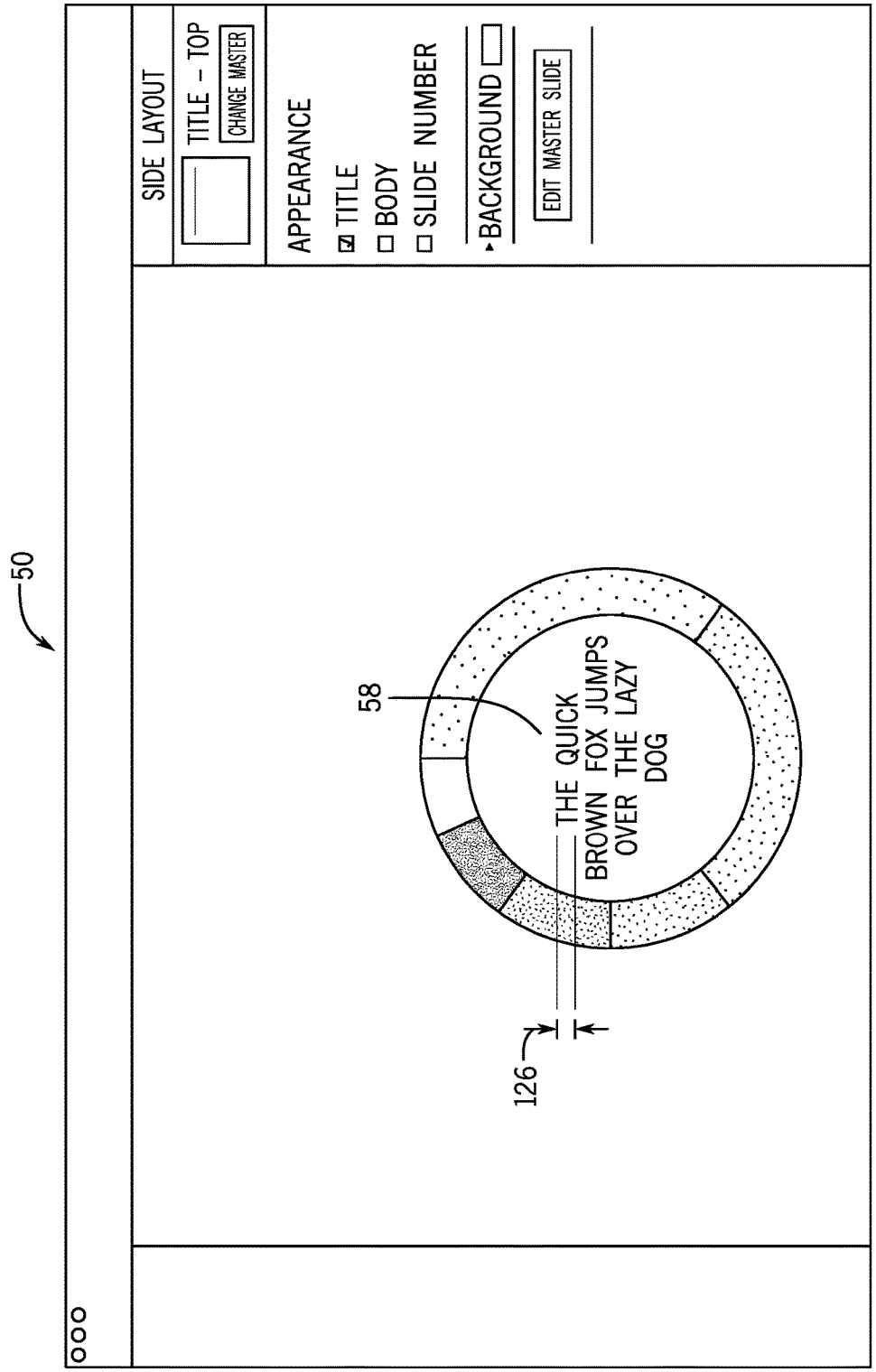
FIGS. 12A-C illustrate dynamically adjusting the title based on pasting text to the title of the donut chart of FIG. 10B, according to embodiments of the present disclosure.
Figure 12B:
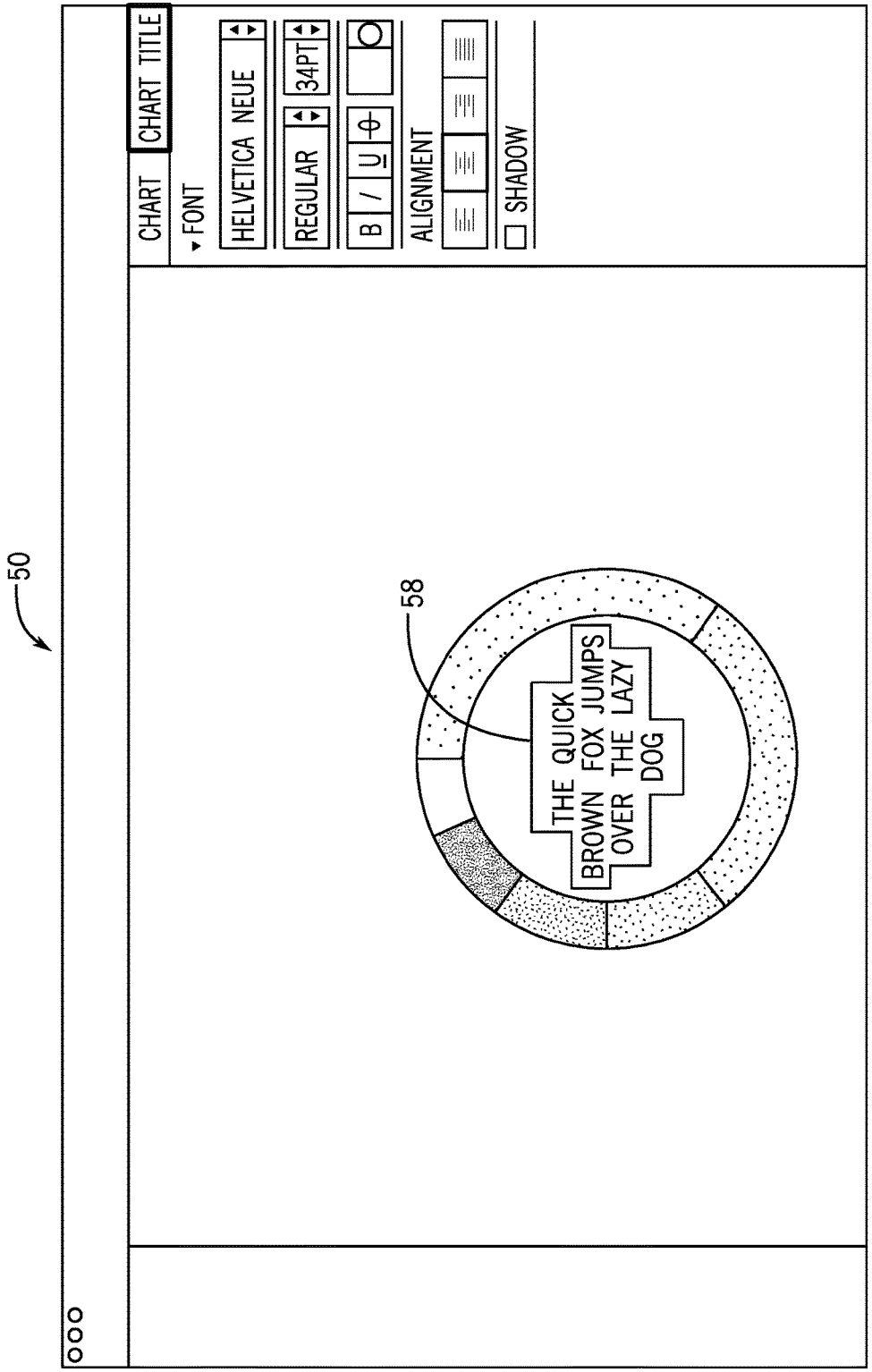
Figure 12C:
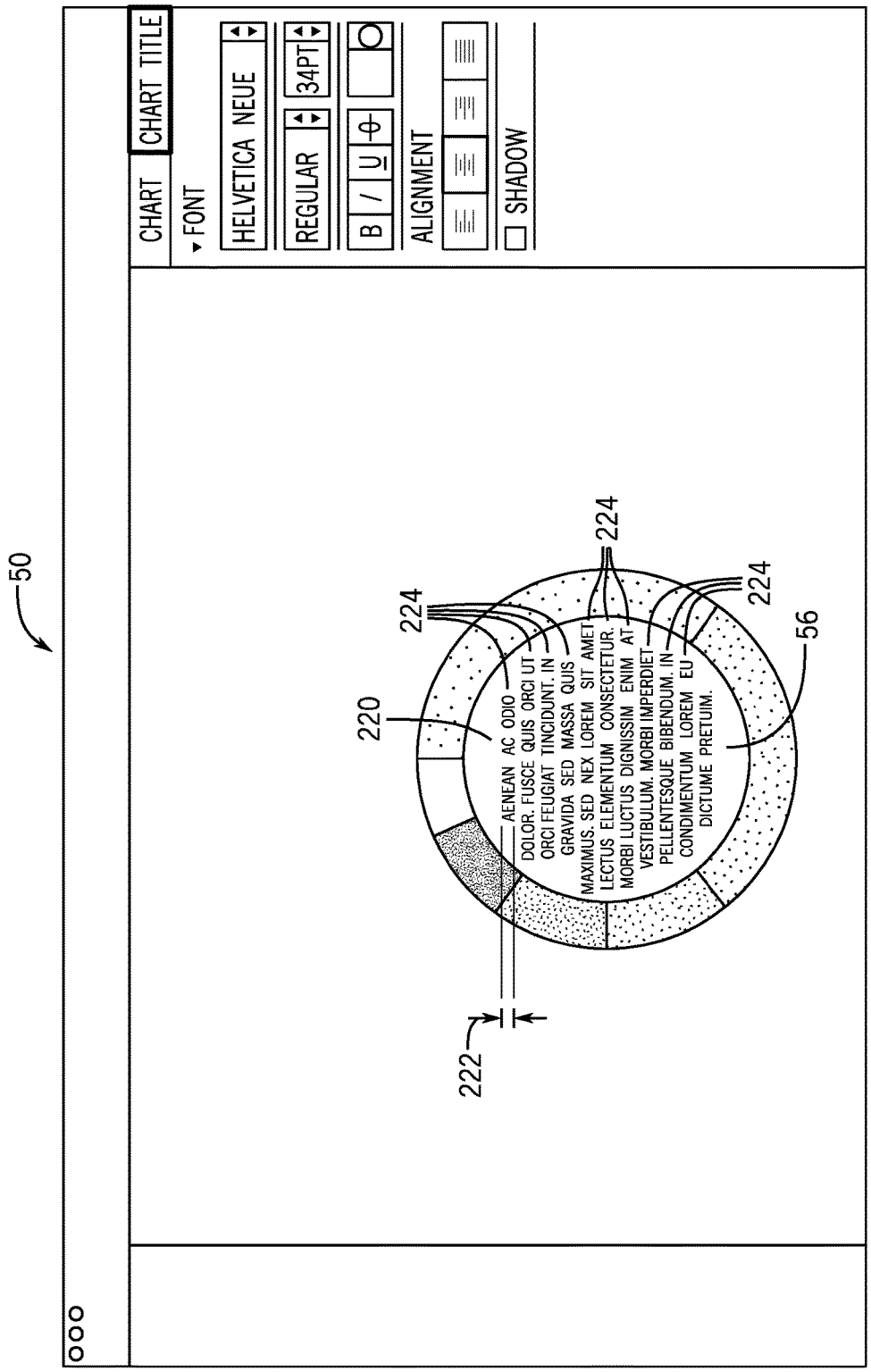

In particular, FIG. 12A illustrates the donut chart 52 having the title 58 (e.g., the longer title 132 of FIG. 10B) having the initial text size of 126. FIG. 12B illustrates selection of the title 58. For example, the user may select the title 58 by clicking on the title 58 using a mousing device, highlighting the text of the title 58 using the mousing device or a keyboard, and the like. As a result, the processor core complex 12 may detect the user input of selecting the title 58. The user may then perform a paste operation to replace at least a portion of the title 58 with pasted text, generating a pasted title 220, as shown in FIG. 12C. The paste operation may be performed by the user using the mousing device, the keyboard, and the like. As such, the processor core complex 12 may detect the user input of adding the pasted text to the title 58 (or replacing the title 58 with the pasted title 220). If the pasted title 220 is longer than the title 58, the processor core complex 12 may dynamically decrease a size of the pasted title 220 (from the size 126 of the title 58) and/or dynamically wrap the pasted title 220, as described in the process 100 of FIGS. 9A-B above. If the pasted title 220 is shorter than the title 58, the processor core complex 12 may dynamically increase a size of the pasted title 220 (but not beyond the initial size 126 of the title 58) and/or dynamically wrap the pasted title 220, as discussed above.

As illustrated, because the processor core complex 12 determines that the pasted title 220 does not fit in the inner hole portion 56, the processor core complex 12 decreases the font size 126 of the title 58 to a font size 222 of the pasted title 220 and dynamically wraps the shorter title 210. In particular, the processor core complex 12 may dynamically position line breaks 224 of the pasted title 220 to attempt to fit the pasted title 220 in the inner hole region 56 and/or center the pasted title 220 in the inner hole region 56.

In this manner, the process 100 of FIGS. 9A-B and the techniques described with respect FIGS. 10A-D, 11A-D, and 12A-C, may dynamically adjust the title 58 based on adding text to or removing text from the title 58 of the donut chart 52 to generate a more visually pleasing donut chart 52, without having a user manually adjust the title 58.

2. Adjusting the Size of the Inner Hole Region of the Donut Chart

Figure 13A:
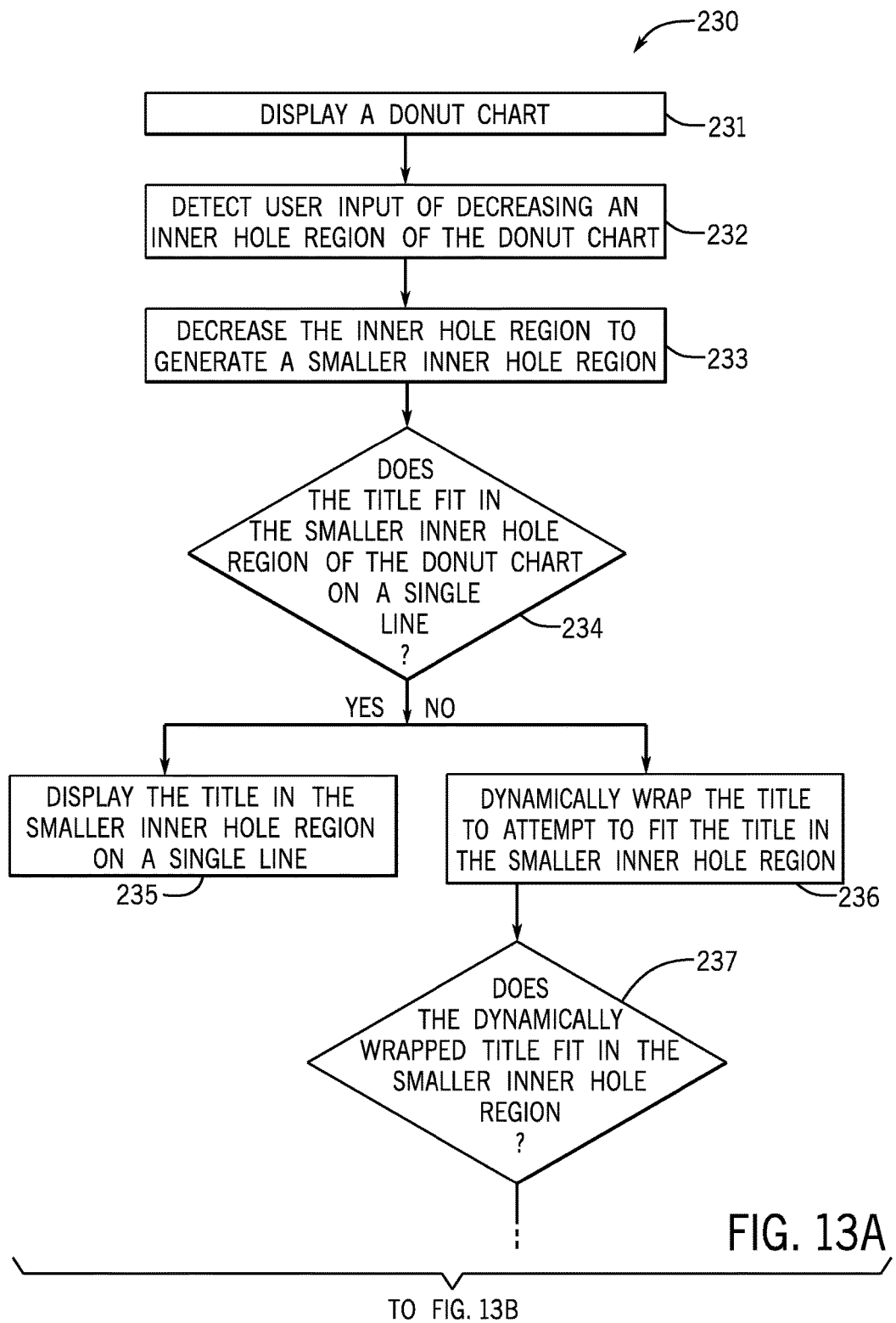
FIGS. 13A-B are a flow diagram of a more specific process for dynamically adjusting the title based on decreasing the inner hole region of the donut chart of FIG. 7, according to embodiments of the present disclosure.
Figure 13B:
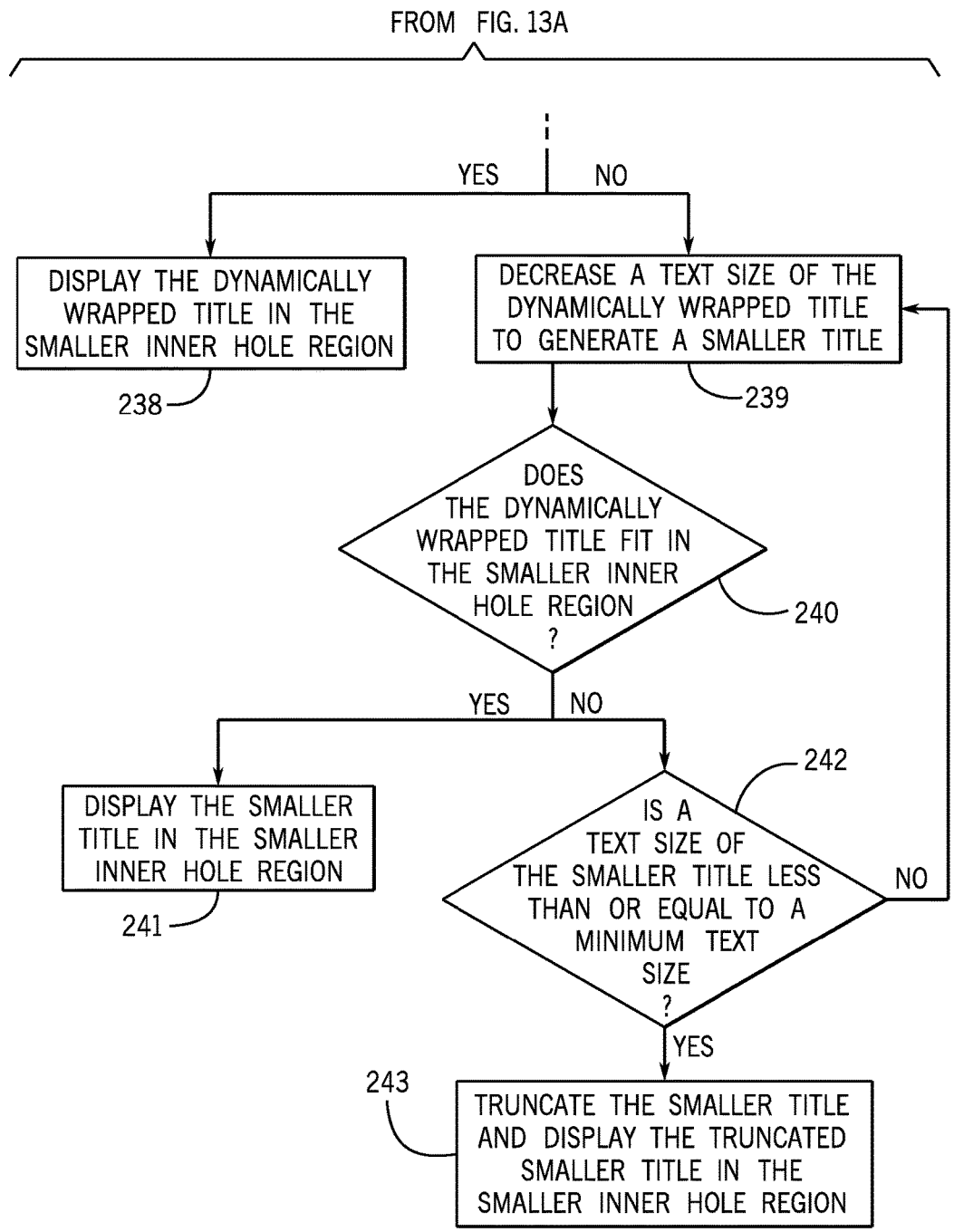

With the process 80 of FIG. 8 in mind as a more general technique, FIGS. 13A-B are a flow diagram of a more specific process 230 for dynamically adjusting the title 58 based on decreasing the inner hole region 56 of the donut chart 52 of FIG. 7, according to embodiments of the present disclosure. The process 230 may be in the form of an application (e.g., the software application 50) that includes instructions that are executed by at least one suitable processor of a computer system, such as the processor core complex 12 of the electronic device 10. The illustrated process 230 is merely provided as an example, and in other embodiments, certain illustrated steps of the process 230 may be performed in other orders, skipped, or repeated, according to embodiments of the present disclosure.

Figure 14A:
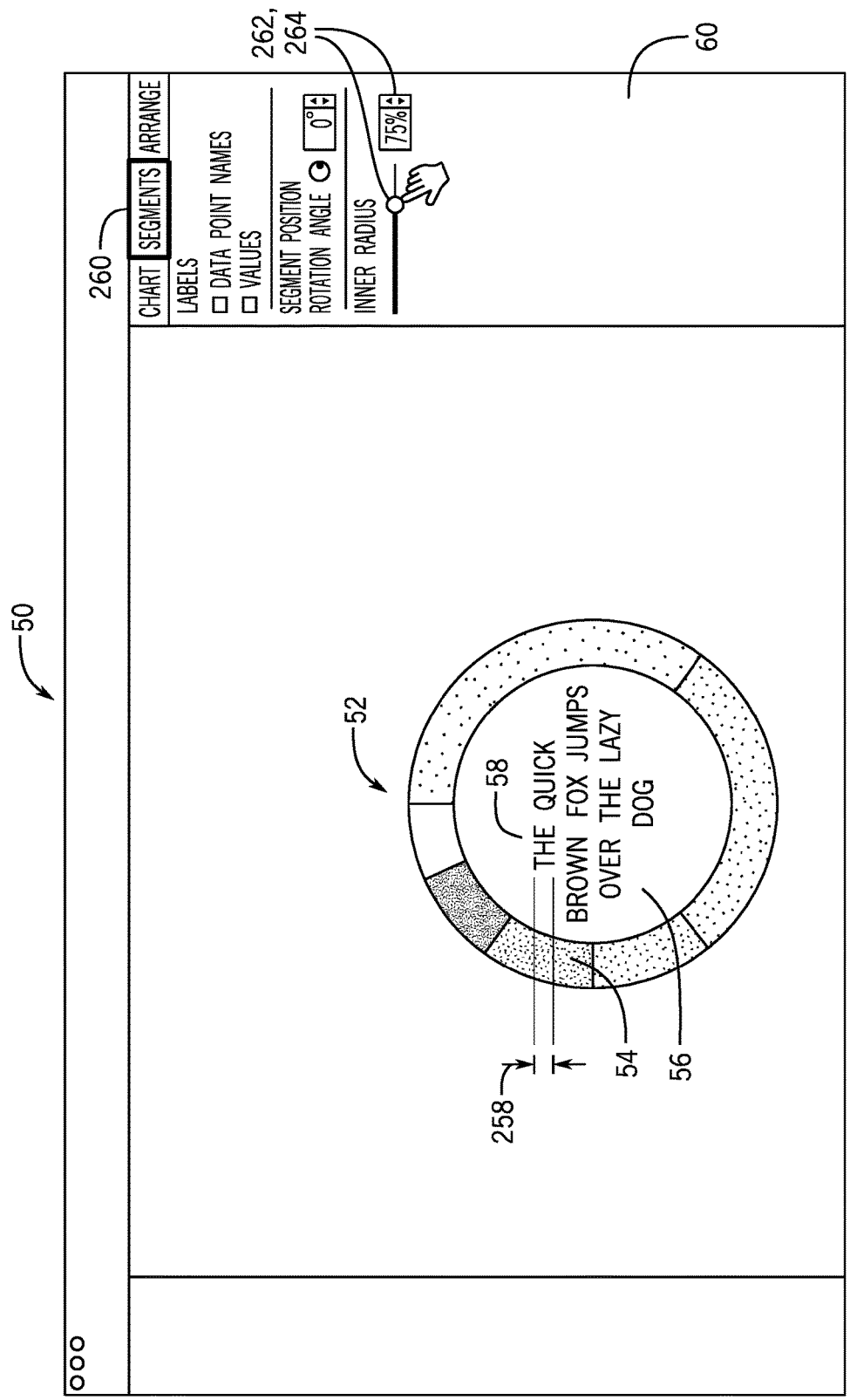
FIGS. 14A-D illustrate dynamically adjusting the title based on decreasing the inner hole region of the donut chart of FIG. 7, according to embodiments of the present disclosure.

As illustrated, in process block 231, the processor core complex 12 may display the donut chart 52. For example, FIGS. 14A-D illustrate dynamically adjusting the title 58 based on decreasing the inner hole region 56 of the donut chart 52 of FIG. 7, according to embodiments of the present disclosure. FIG. 14A illustrates the processor core complex 12 displaying the donut chart 52 having the inner hole region 56 and the title 58, which has been selected by the user (e.g., via a mousing device, touch using a touchscreen, a stylus device, or the like). The title 58 may have an initial text size 258 as illustrated. Moreover, an outer ring portion tab 260 (titled "Segments") of the formatting panel 60 may be selected, e.g., by the user or automatically when the donut chart 52 or a portion of the donut chart 52 (such as the inner hole region 56 or the outer ring portion 54) is selected by the user. The outer ring portion tab 260 may include one or more outer ring portion controls 262 that enable adjustment to at least some properties associated with the outer ring portion 54 and/or the inner hole region 56. For example, an inner radius control 264, which shows an inner radius of the inner hole region 56 to be 75%, may enable adjustment of the inner radius of the inner hole region 56. As illustrated, the inner radius control 264 may be provided by one or more control elements, such as a dial, incrementing and decrementing buttons, a text box, and/or any other suitable control element. The inner radius of the inner hole region 56 may be set by the user or by default (e.g., when first opening the software application 50).

Figure 14B:
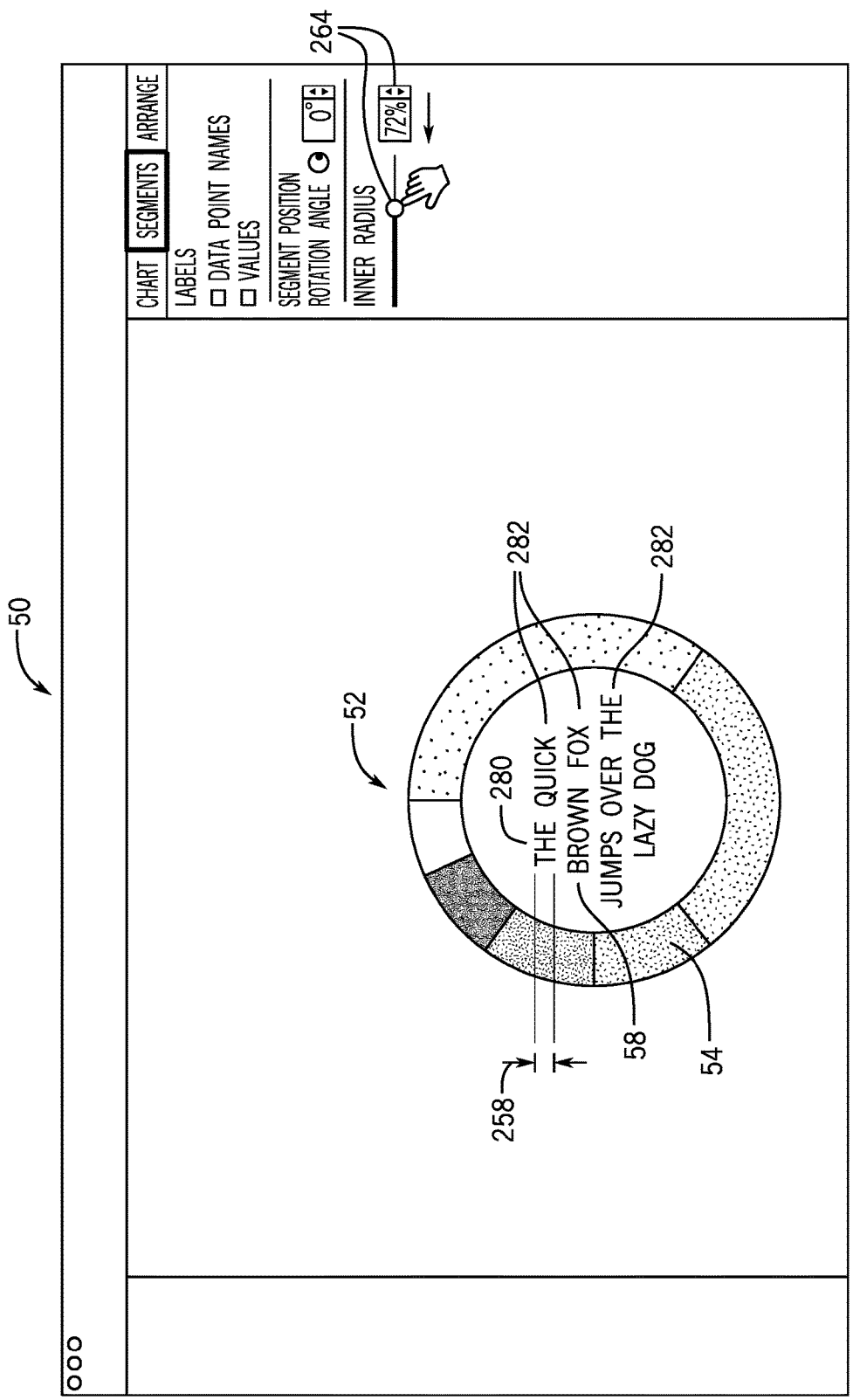
Figure 14C:
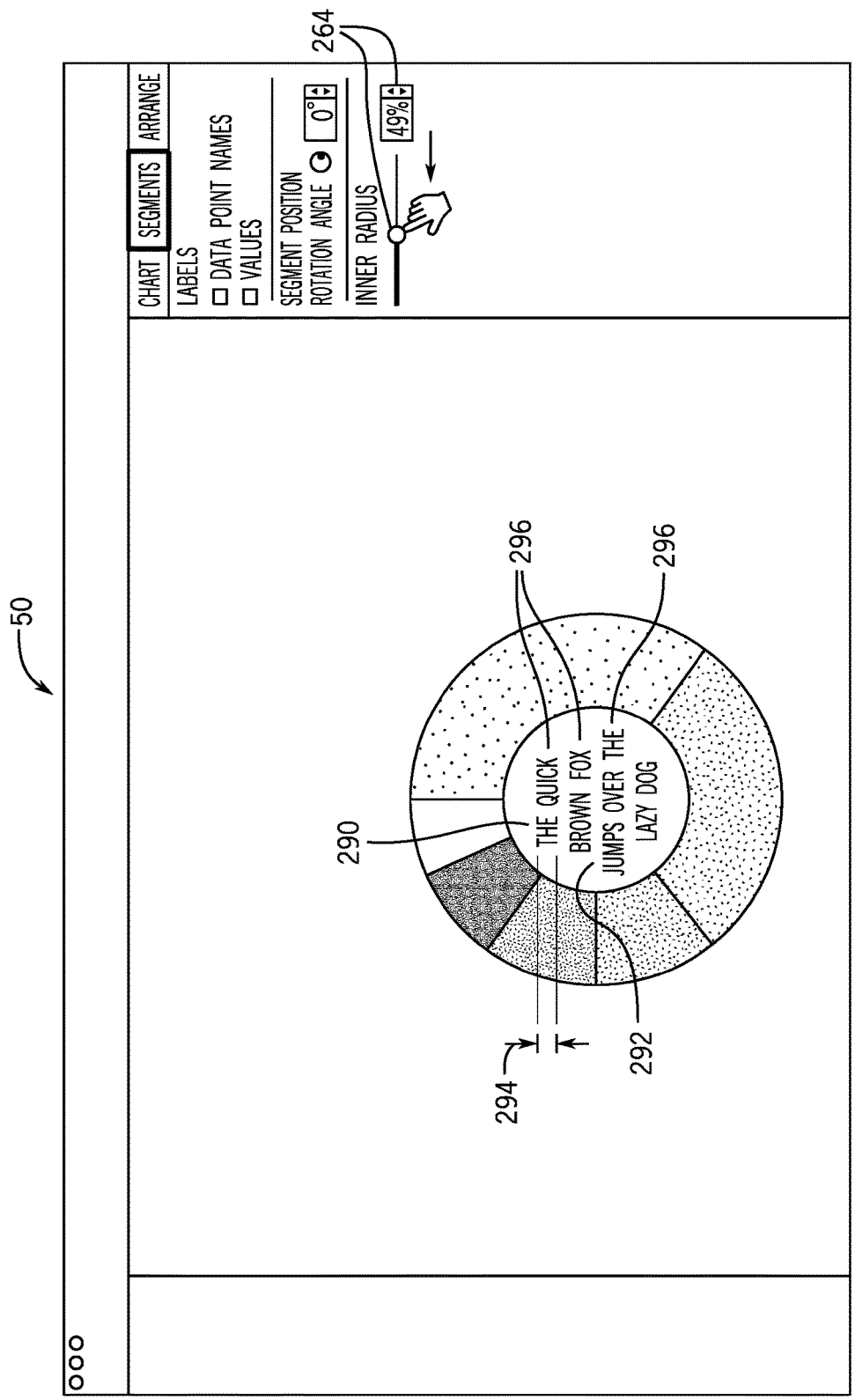

In process block 232, the processor core complex 12 may detect user input of decreasing the inner hole region 56 of the donut chart 52. For example, FIG. 14B illustrates the user adjusting the inner radius control 264 to decrease the inner radius of the inner hole region 56 from 75% to 62%. The processor core complex 12 may detect and/or receive the smaller inner radius (e.g., 62%).

In process block 233, the processor core complex 12 may decrease the inner hole region 56 to generate a smaller inner hole region. In FIG. 14B, the processor core complex 12 decreases the inner hole region 56 in response to the detecting the user input of decreasing the inner hole region 56, generating a smaller inner hole region 280.

In decision block 234, the processor core complex 12 may determine whether the title 58 fits in the smaller inner hole region 280 on a single line. That is, the processor core complex 12 may determine whether the title 58 fits within a bounding area (e.g., a surface area) of the smaller inner hole region 280 as a single line of text, such that the title 58 does not overlap the outer ring portion 54 of the donut chart 52.

In process block 235, if the title 58 fits within the bounding area of the smaller inner hole region 280 as a single line of text, such that the title 58 does not overlap the outer ring portion 54 of the donut chart 52, then the processor core complex 12 may display the title 58 in the smaller inner hole region 280 as a single line of text. As an example, FIG. 11D illustrates the processor core complex 12 displaying a title 210 in the inner hole region 56 as a single line of text.

However, in process block 236, if the title 58 does not fit within the bounding area of the smaller inner hole region 280 as a single line of text, such that the title 58 overlaps the outer ring portion 54 of the donut chart 52, then the processor core complex 12 may dynamically wrap the title 58 to attempt to fit the title 58 in the smaller inner hole region 280. Specifically, the processor core complex 12 may dynamically position the line breaks 282 of the title 58 to attempt to fit the title 58 in the smaller inner hole region 280 and/or center the title 58 in the smaller inner hole region 280. For example, for the title 58 shown in FIG. 14B, the processor core complex 12 determines that the title 58 overlaps the outer ring portion 54 as a single line of text, and thus does not fit in the smaller inner hole region 280. As such, the processor core complex 12 dynamically wraps the title 58 with line breaks 282 to attempt to fit the title 58 in the smaller inner hole region 280.

In decision block 237, the processor core complex 12 may determine whether the dynamically wrapped title 58 fits in the smaller inner hole region 280. If so, in process block 238, the processor core complex 12 may display the dynamically wrapped title 58 in the smaller inner hole region 280. For example, as shown in FIG. 14B, the processor core complex 12 displays the dynamically wrapped title 58 in the smaller inner hole region 280. As illustrated, the font size of the dynamically wrapped title 58 is the initial font size 258 (of the title 58 in FIG. 14A). This may be because the processor core complex 12 determines that the dynamically wrapped title 58 fits in the smaller inner hole region 280 with the line breaks 282 (and so decreasing the size of the dynamically wrapped title 58 is unnecessary).

However, in process block 239, if the dynamically wrapped title 58 does not fit in the smaller inner hole region 280, the processor core complex 12 may decrease a text size of the dynamically wrapped title 58 to generate a smaller title. For example, in FIG. 14C, the processor core complex 12 decreases the smaller inner hole region 280 of FIG. 14B to generate an even smaller inner hole region 290 (e.g., as a result of the user setting the inner hole radius to 49% via the inner hole radius control 264). The processor core complex 12 determines that the title 58 overlaps the outer ring portion 54, and thus does not fit in the smaller inner hole region 290. As such, the processor core complex 12 dynamically decreases a text size of the title 58 to generate a smaller title 292. In particular, the processor core complex 12 may dynamically decrease the initial font size 258 of the title 58 in FIG. 14B to generate the smaller title 292 having a smaller font size 294. In some cases, other suitable techniques may be used to decrease the text size of the title 58 to generate the smaller title 292 having the smaller font size 294, such as decreasing space between text characters of the title 58, changing a font of the title 58, and the like. Additionally, in some embodiments, after decreasing the text size of a title (e.g., the title 58), the processor core complex 12 may dynamically rewrap the title to better fit and/or center the title in an inner hole region (e.g., the smaller inner hole region 290).

In decision block 240, the processor core complex 12 may determine whether the smaller title 292 fits in the smaller inner hole region 290. If so, in process block 241, the processor core complex 12 may display the smaller title 292 in the smaller inner hole region 290 as shown in, for example, FIG. 14C.

Figure 14D:
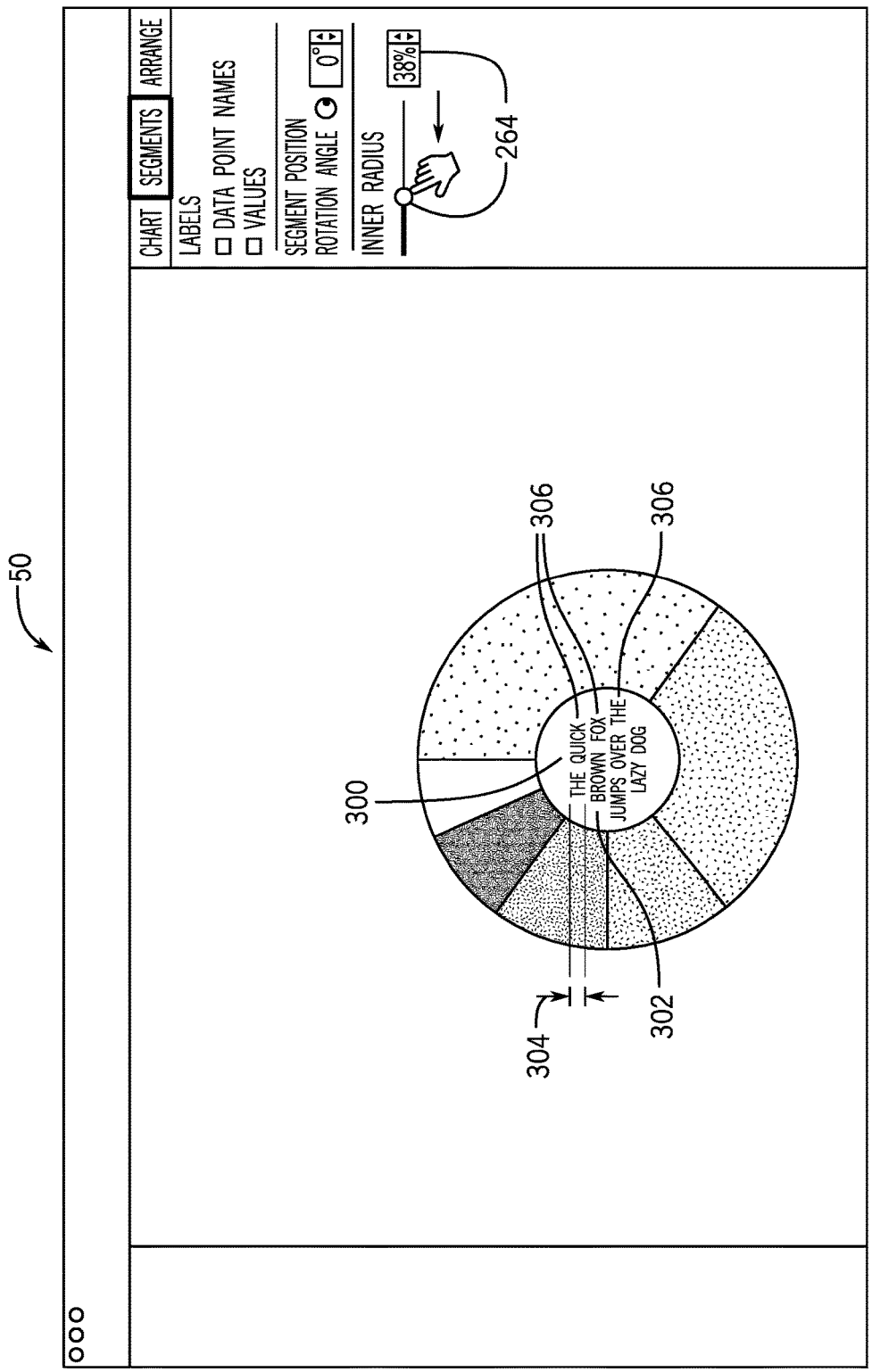

FIG. 14D provides another example of the processor core complex 12 dynamically adjusting the title 58 based on decreasing the inner hole region 56. For example, the processor core complex 12 decreases the smaller inner hole region 290 of FIG. 14C to generate an even smaller inner hole region 300 (e.g., as a result of the user setting the inner hole radius to 38% via the inner hole radius control 264). The processor core complex 12 determines that the smaller title 292 overlaps the outer ring portion 54, and thus does not fit in the smaller inner hole region 300. As such, the processor core complex 12 dynamically decreases the text size 294 of the smaller title 292 in FIG. 14C (e.g., by decreasing a font size of the smaller title 292) to generate an even smaller title 302 having an even smaller font size 304 that fits in the smaller inner hole region 300. Additionally, in some embodiments, after decreasing the text size of a title (e.g., the smaller title 292), the processor core complex 12 may dynamically rewrap the title to better fit and/or center the title in an inner hole region (e.g., the smaller inner hole region 300).

In decision block 242, if the processor core complex 12 determines that the smaller title (e.g., 292 of FIG. 14C) does not fit in the smaller inner hole region 290, then the processor core complex 12 may determine whether the text size 294 of the smaller title 292 is less than or equal to a minimum text size. The minimum text size may be associated with a readability threshold. That is, the minimum text size may be sufficiently small to be considered unreadable or at least difficult to read. The minimum text size may be any suitable font size that may be considered unreadable or at least difficult to read, such as under 12 point font, under 10 point font, under 6 point font, or the like. If the processor core complex 12 determines that the text size 294 of the smaller title 292 is greater than the minimum text size, the processor core complex 12 may decrease the text size of the smaller title 292 (e.g., by returning to process block 239). Otherwise, if the processor core complex 12 determines that the text size 294 of the smaller title 292 is less than or equal to the minimum text size, in process block 243, the processor core complex 12 may truncate the smaller title 292 and display the truncated smaller title 292 in the smaller inner hole region 290. That is, the processor core complex 12 may remove a portion of the smaller title 292 and display a unique text character indicating that the smaller title 292 has been truncated. The unique text character may be any suitable text character that may indicate that at least a portion of the smaller title 292 has been removed, such as an ellipsis. FIGS. 21C and 22B illustrate examples of truncated titles 582, 610. Additionally, in some embodiments, after truncating a title (e.g., the smaller title 292), the processor core complex 12 may dynamically rewrap the title to better fit and/or center the truncated title in an inner hole region (e.g., the smaller inner hole region 290).

Figure 15A:
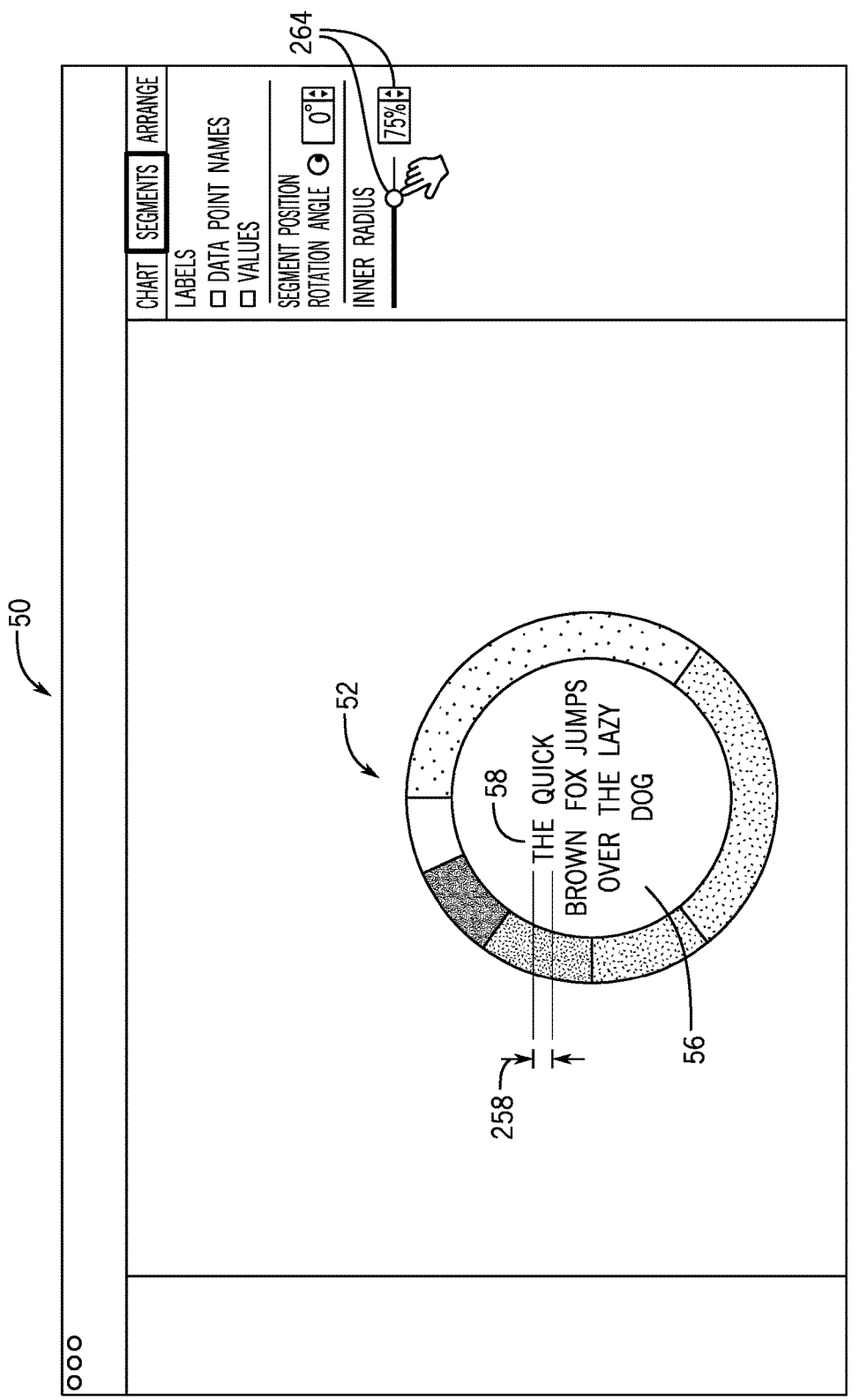
FIGS. 15A-D illustrate dynamically adjusting the title based on increasing the inner hole region of the donut chart of FIG. 7, according to embodiments of the present disclosure.

The processor core complex 12 may also dynamically adjust the title 58 based on increasing the inner hole region 56. For example, FIGS. 15A-D illustrate dynamically adjusting the title 58 based on increasing the inner hole region 56 of the donut chart 52 of FIG. 7, according to embodiments of the present disclosure. In particular, FIG. 15A illustrates the donut chart 52 having the inner hole region 56 and the title 58. As illustrated, the title 58 has the initial text size 258 of FIG. 14A.

Figure 15B:
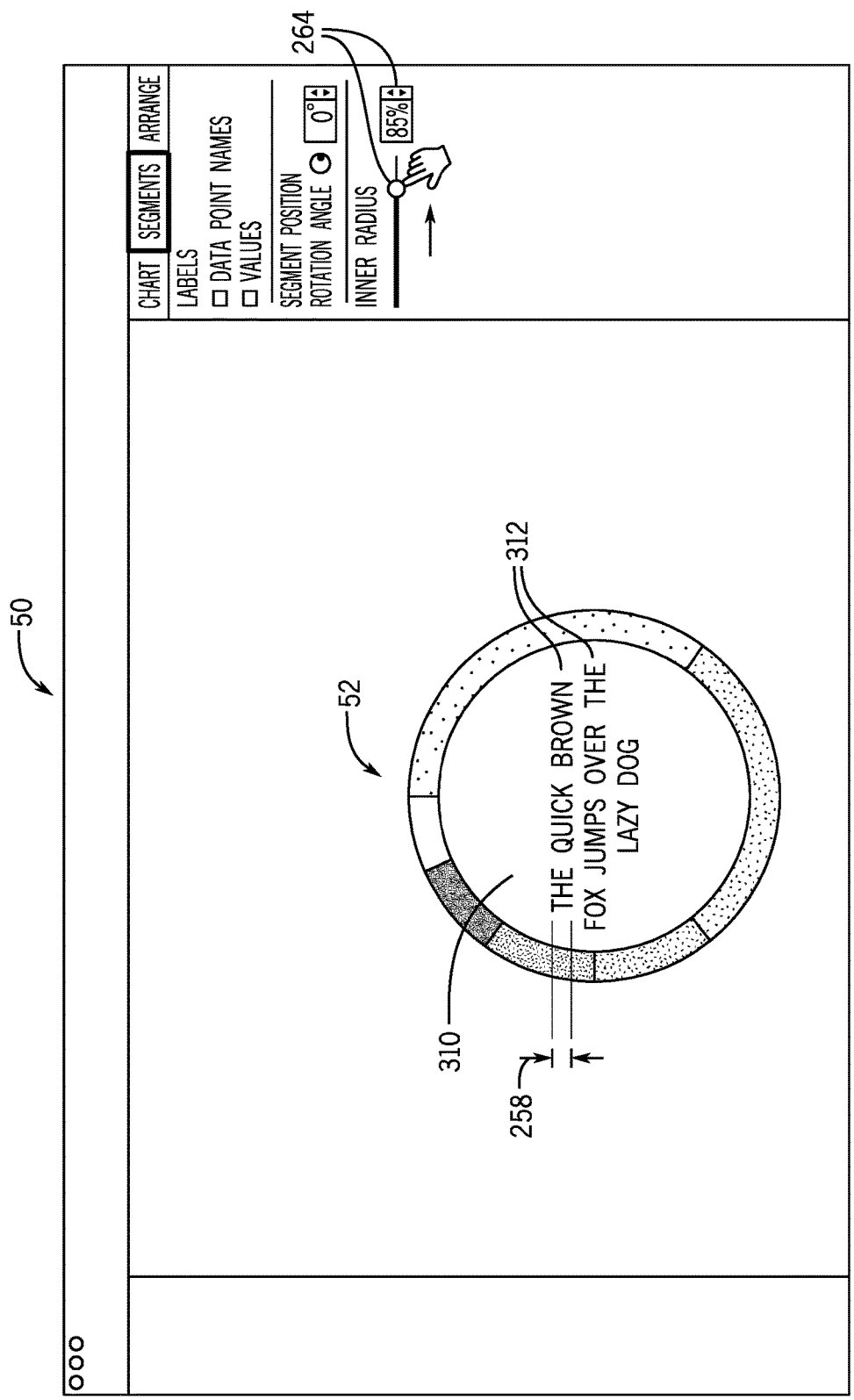

The processor core complex 12 may detect user input of increasing the inner hole region 56, generating a larger inner hole region. For example, FIG. 15B illustrates the user adjusting the inner radius control 264 to increase the inner radius of the inner hole region 56 from 75% to 85%. The processor core complex 12 detects and/or receives the larger inner radius (e.g., 85%) and increases the inner hole region 56 to generate a larger inner hole region 310.

The processor core complex 12 may then determine whether the title 58 fits in the larger inner hole region 310 on a single line of text. If so, the processor core complex 12 may display the title 58 in the larger inner hole region 310 as a single line of text. If the title 58 does not fit in the larger inner hole region 310 on a single line of text, then the processor core complex 12 may dynamically wrap the title 58. Specifically, the processor core complex 12 may dynamically position line breaks 312 of the title 58 to attempt to fit the title 58 in the larger inner hole region 310 and/or center the title 58 in the larger inner hole region 310. For example, FIG. 15B illustrates the title 58 that has been dynamically wrapped by the processor core complex 12 with the line breaks 312. In some embodiments, the title 58 may be increased with a larger inner hole region 310. For example, if the title 58 had been previously decreased in size, then the processor core complex 12 may dynamically increase the size of the title 58 (but not beyond the initial size 258 of the title 58). In the illustrated example, because the title 58 had not been previously decreased in size and/or because the title 58 is already the initial size 258 of the title 58 shown in FIG. 14A, the processor core complex 12 does not dynamically increase the size 258 of the title 58 (e.g., beyond the initial size 258). Additionally or alternatively, the processor core complex 12 may increase the size of the title 58 without limit.

Figure 15C:
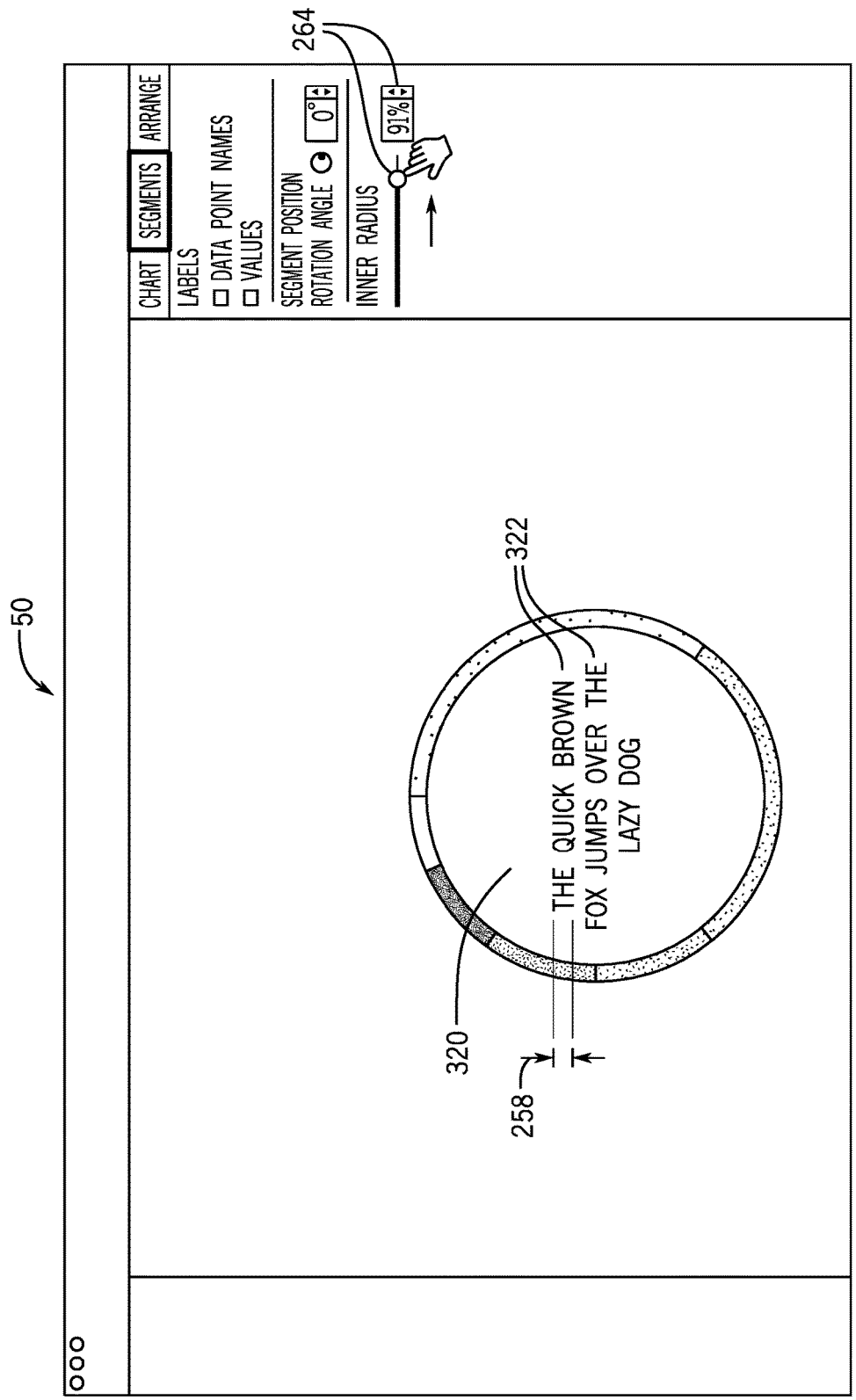

In FIG. 15C, the processor core complex 12 may detect user input of increasing the larger inner hole region 310, generating an even larger inner hole region 320. For example, the user may adjust the inner radius control 264 to increase the inner radius of the larger inner hole region 310 from 85% to 91%. The processor core complex 12 detects and/or receives the larger inner radius (e.g., 91%) and increases the larger inner hole region 310 to generate the even larger inner hole region 320.

The processor core complex 12 may then determine whether the title 58 fits in the larger inner hole region 310 on a single line of text. If so, the processor core complex 12 may display the title 58 in the larger inner hole region 310 as a single line of text. If the title 58 does not fit in the larger inner hole region 310 on a single line of text, then the processor core complex 12 may dynamically wrap the title 58. Specifically, the processor core complex 12 may dynamically position line breaks 322 of the title 58 to attempt to fit the title 58 fit in the larger inner hole region 322 and/or center the title 58 in the larger inner hole region 320. For example, FIG. 15C illustrates the title 58 that has been dynamically wrapped by the processor core complex 12 with the line breaks 322. If the title 58 had been previously decreased in size, then the processor core complex 12 may dynamically increase the size of the title 58 (but not beyond the initial size 258 of the title 58). In the illustrated example, because the title 58 had not been previously decreased in size and/or because the title 58 is already the initial size 258 of the title 58 shown in FIG. 14A, the processor core complex 12 does not dynamically increase the size 258 of the title 58 (e.g., beyond the initial size 258). Additionally or alternatively, the processor core complex 12 may increase the size of the title 58 without limit.

Figure 15D:
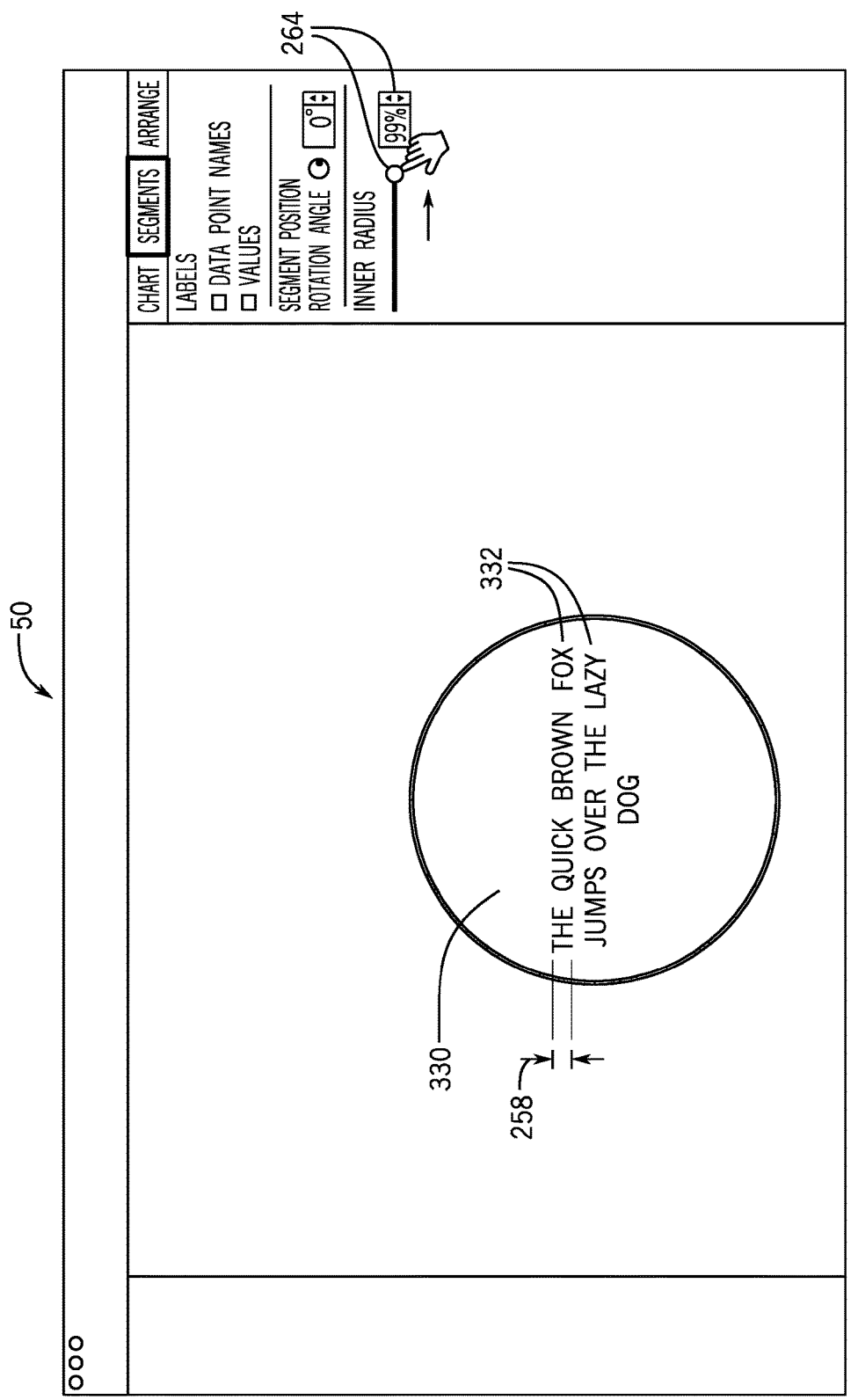

In FIG. 15D, the processor core complex 12 may detect user input of increasing the larger inner hole region 320, generating an even larger inner hole region 330. For example, the user may adjust the inner radius control 264 to increase the inner radius of the larger inner hole region 320 from 91% to 99%. The processor core complex 12 detects the larger inner radius (e.g., 99%) and increases the larger inner hole region 320 to generate the even larger inner hole region 330.

The processor core complex 12 may then determine whether the title 58 fits in the larger inner hole region 330 on a single line of text. If so, the processor core complex 12 may display the title 58 in the larger inner hole region 330 as a single line of text. If the title 58 does not fit in the larger inner hole region 330 on a single line of text, then the processor core complex 12 may dynamically wrap the title 58. Specifically, the processor core complex 12 may dynamically position line breaks 332 of the title 58 to attempt to fit the title 58 in the larger inner hole region 330 and/or center the title 58 in the larger inner hole region 330. For example, FIG. 15D illustrates the title 58 that has been dynamically wrapped by the processor core complex 12 with the line breaks 332. If the title 58 had been previously decreased in size, then the processor core complex 12 may dynamically increase the size of the title 58 (but not beyond the initial size 258 of the title 58). In the illustrated example, because the title 58 had not been previously decreased in size and/or because the title 58 is already the initial size 258 of the title 58 shown in FIG. 14A, the processor core complex 12 does not dynamically increase the size 258 of the title 58 (e.g., beyond the initial size 258). Additionally or alternatively, the processor core complex 12 may increase the size of the title 58 without limit.

In this manner, the process 230 of FIGS. 13A-B and the techniques described with respect FIGS. 14A-D and 15A-D may dynamically adjust the title 58 based on adjusting the size of the inner hole region 56 of the donut chart 52 to generate a more visually pleasing donut chart 52, without having a user manually adjust the title 58.

3. Adjusting the Size of the Donut Chart

Figure 16A:
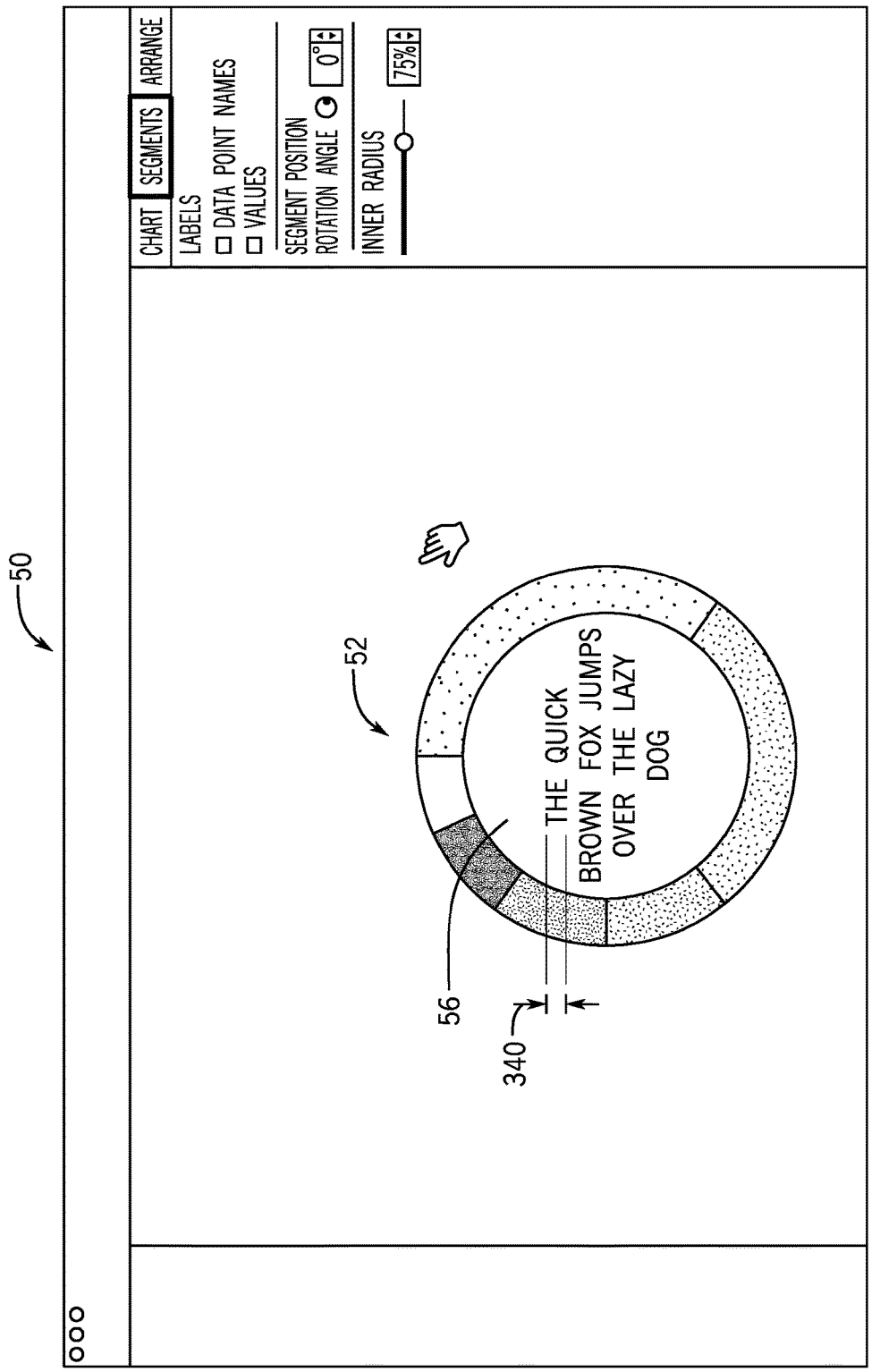
FIGS. 16A-D illustrate dynamically adjusting the title based on decreasing the donut chart of FIG. 7 (which proportionally decreases the inner hole region of the donut chart), according to embodiments of the present disclosure.

When the size of the donut chart 52 is adjusted, the size of the inner hole region 56 may be adjusted proportionally. For example, FIGS. 16A-D illustrate dynamically adjusting the title 58 based on decreasing the donut chart 52 of FIG. 7 (which proportionally decreases the inner hole region 56 of the donut chart 52), according to embodiments of the present disclosure. In particular, FIG. 16A illustrates the donut chart 52 having the inner hole region 56 and the title 58. The title 58 may have an initial text size 340 as illustrated.

Figure 16B:
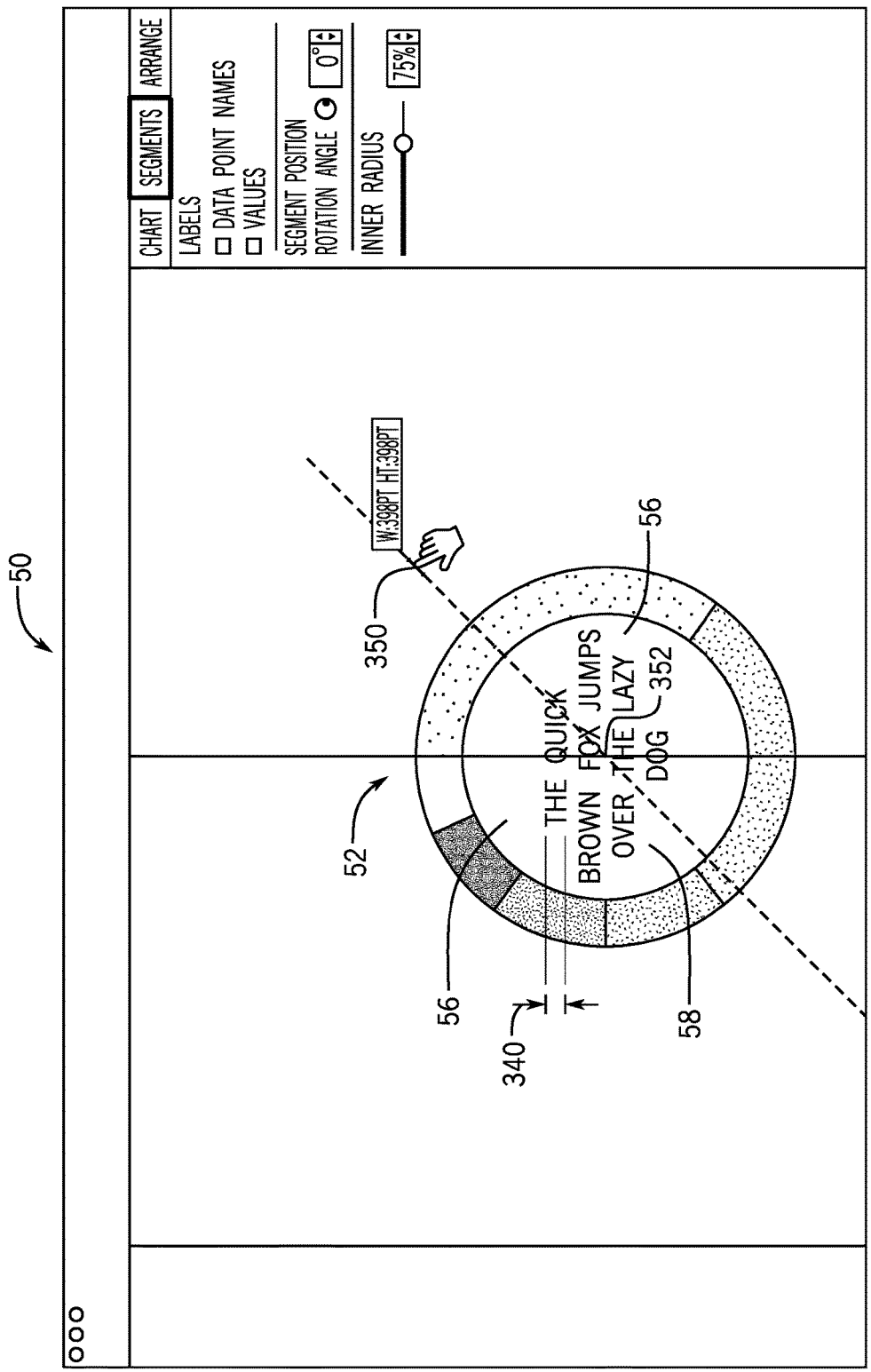

FIG. 16B illustrates the user selecting the donut chart 52. As such, the processor core complex 12 may detect user input indicating the selection, and provide resizing functionality for the donut chart 52. In particular, the processor core complex 12 may display a resizing control 350 that enables resizing the donut chart 52. As illustrated, the resizing control 350, when selected, displays a current size of the donut chart 52 at a length of 398 points and a width of 398 points. In some embodiments, a user may drag the resizing control 350 to change the size of the donut chart 52. For example, the user may drag or move the resizing control 350 toward the center 352 to decrease the size of the donut chart 52 and drag or move the resizing control 350 away from the center 352 to increase the size of the donut chart 52.

Figure 16C:
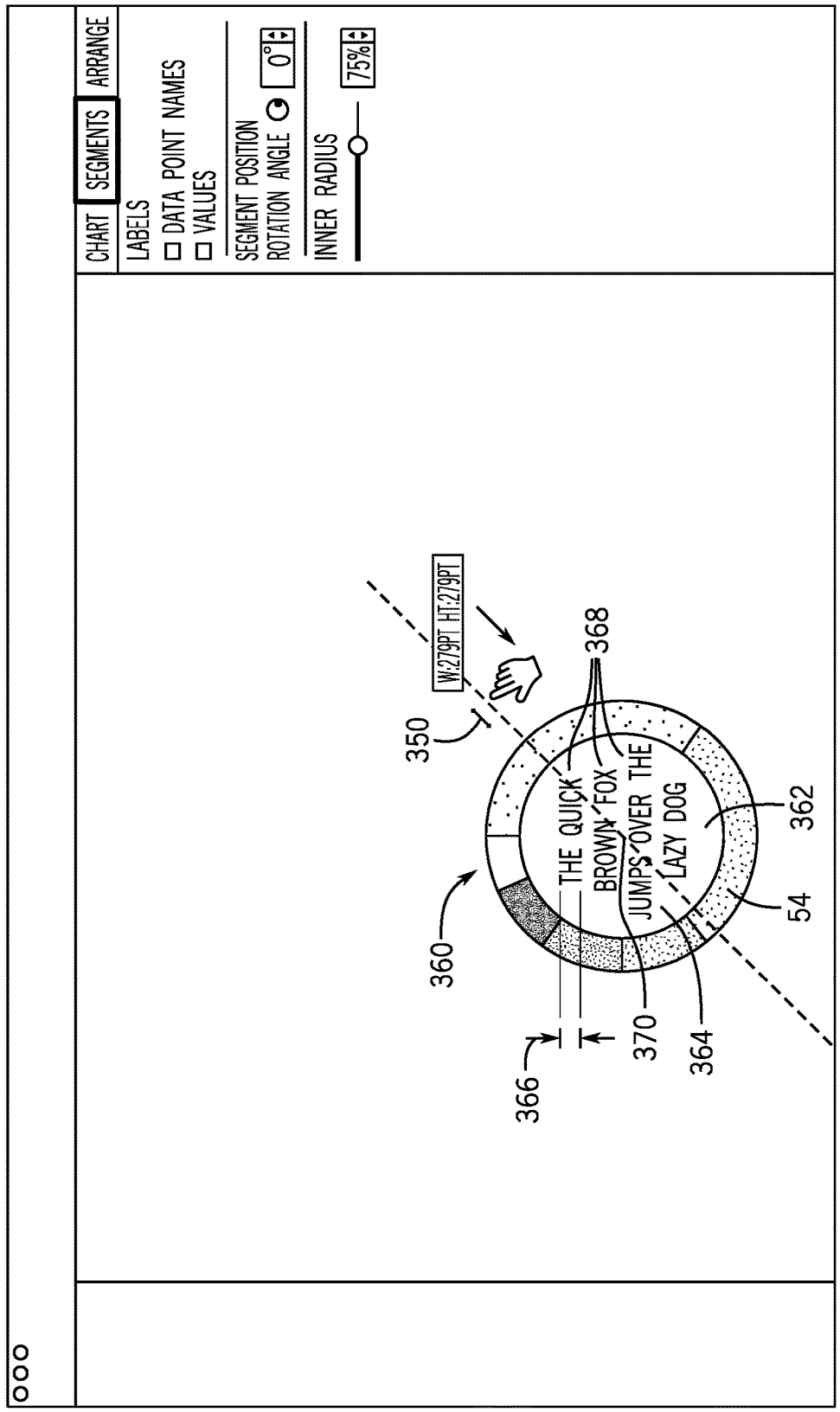

The processor core complex 12 may detect user input of decreasing the size of the donut chart 52, generating a smaller donut chart. For example, FIG. 16C illustrates the user moving the resizing control 350 toward the center 352 of the donut chart 52 of FIG. 16B to decrease the size of the donut chart 52 and generate a smaller donut chart 360. As illustrated, the resizing control 350 displays the size of the smaller donut chart 360 at a length of 279 points and a width of 279 points. The processor core complex 12 detects and/or receives the decreased size of the smaller donut chart 360 and may decrease (e.g., proportionally decrease) the inner hole region 56 (of the donut chart 52 in FIG. 16B) to generate a smaller inner hole region 362.

The processor core complex 12 may then determine whether the title 58 fits in the smaller inner hole region 362 on a single line of text. If so, the processor core complex 12 may display the title 58 in the smaller inner hole region 362 as a single line of text. If the title 58 does not fit in the smaller inner hole region 362 on a single line of text, then the processor core complex 12 may dynamically wrap the title 58. Specifically, the processor core complex 12 may dynamically position line breaks of the title 58 to attempt to fit the title 58 in the smaller inner hole region 362 and/or center the title 58 in the smaller inner hole region 362.

The processor core complex 12 may then determine whether the dynamically wrapped title 58 overlaps the outer ring portion 54, and thus whether the dynamically wrapped title 58 fits in the smaller inner hole region 362. If so, the processor core complex 12 may display the dynamically wrapped title 58 in the smaller inner hole region 362. If the dynamically wrapped title 58 does not fit in the smaller inner hole region 362, then the processor core complex 12 may dynamically decrease a text size of the dynamically wrapped title 58 in FIG. 16B to generate a smaller title 364 that may fit in the smaller inner hole region 362, as shown in FIG. 16C. In particular, the processor core complex 12 may dynamically decrease the initial font size 340 of the title 58 in FIG. 16B to generate the smaller title 364 having a smaller font size 366. In some cases, other suitable techniques may be used to decrease the text size of the title 58 to generate the smaller title 364 having the smaller font size 366, such as decreasing space between text characters of the title 58, changing a font of the title 58, and the like. Additionally, in some embodiments, after decreasing the text size of a title (e.g., the title 58), the processor core complex 12 may dynamically rewrap the title to better fit and/or center the title in an inner hole region (e.g., the smaller inner hole region 362) by, for example, dynamically positioning the line breaks 368 of the smaller title 364.

Figure 16D:
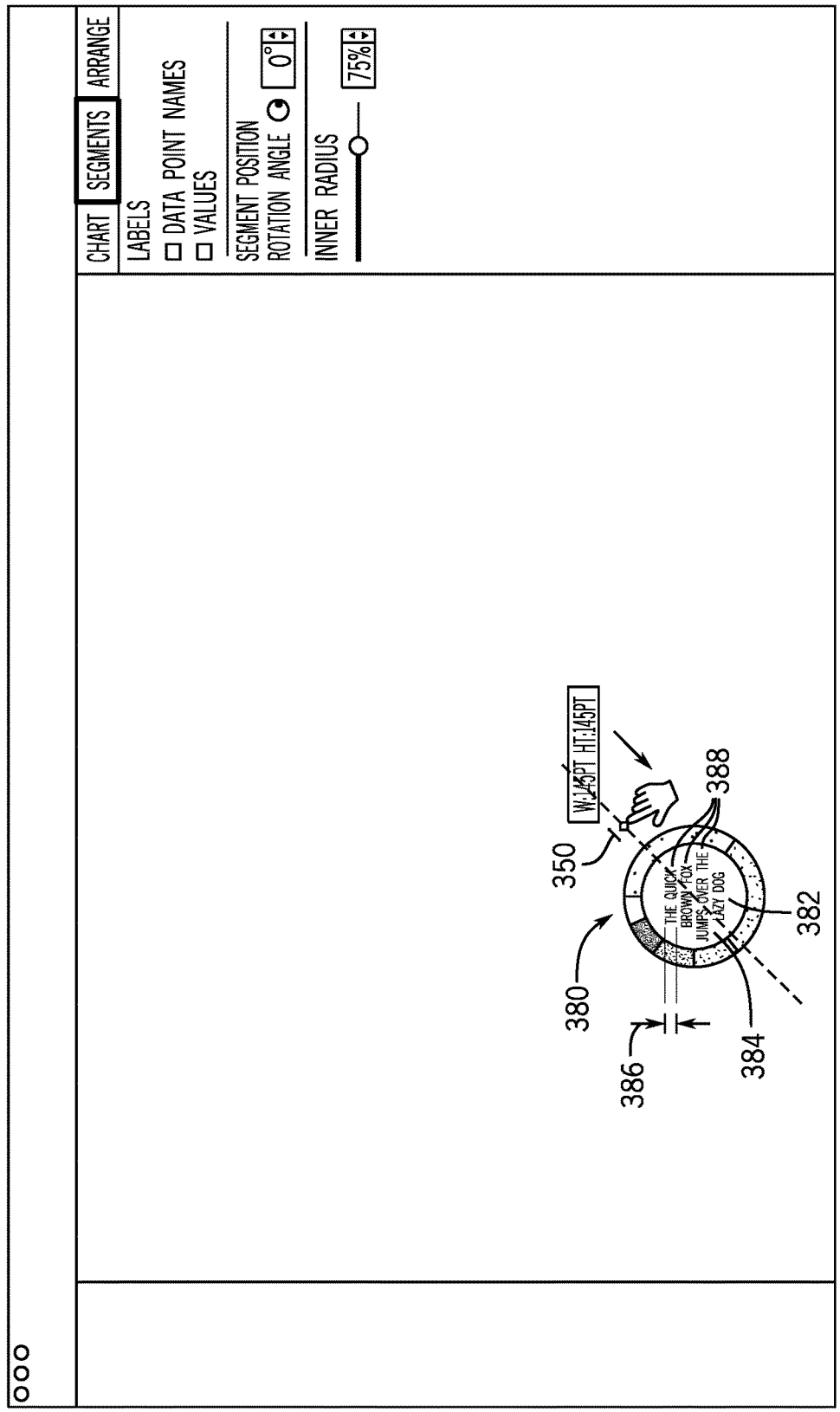

In FIG. 16D, the processor core complex 12 may detect user input of decreasing the smaller donut chart 360, generating an even smaller donut chart 380. For example, the user may move the resizing control 350 toward the center 370 of the smaller donut chart 360 in FIG. 16C to decrease the size of the smaller donut chart 360 to generate the even smaller donut chart 380. As illustrated, the resizing control 350 displays the size of the smaller donut chart 380 at a length of 145 points and a width of 145 points. The processor core complex 12 detects and/or receives the decreased size of the smaller donut chart 380 and may decrease (e.g., proportionally decrease) the smaller inner hole region 362 (of the smaller donut chart 360 in FIG. 16C) to generate the even smaller inner hole region 382.

The processor core complex 12 may then determine whether the smaller title 364 fits in the smaller inner hole region 382 on a single line of text. If so, the processor core complex 12 may display the smaller title 364 in the smaller inner hole region 382 as a single line of text. If the smaller title 364 does not fit in the smaller inner hole region 382 on a single line of text, then the processor core complex 12 may dynamically wrap the smaller title 364. Specifically, the processor core complex 12 may dynamically position line breaks 368 of the smaller title 364 to attempt to fit the smaller title 364 in the smaller inner hole region 382 and/or center the smaller title 364 in the smaller inner hole region 382.

The processor core complex 12 may then determine whether the dynamically wrapped smaller title 364 (of the smaller donut chart 360 in FIG. 16C) overlaps the outer ring portion 54, and thus does not fit in the smaller inner hole region 382. If the dynamically wrapped title smaller title 364 fits in the smaller inner hole region 382, then the processor core complex 12 may display the dynamically wrapped smaller title 364 in the smaller inner hole region 382. If the dynamically wrapped title smaller title 364 does not fit in the smaller inner hole region 382, then the processor core complex 12 may dynamically decrease a text size of the smaller title 364 to generate an even smaller title 384 that may fit in the smaller inner hole region 382. In particular, the processor core complex 12 may dynamically decrease the font size 366 of the smaller title 364 in FIG. 16C to generate the smaller title 384 having a smaller font size 386 as shown in FIG. 16D. Additionally, in some embodiments, after decreasing the text size of a title (e.g., the smaller title 364), the processor core complex 12 may dynamically rewrap the title to better fit and/or center the title in an inner hole region (e.g., the smaller inner hole region 382) by, for example, dynamically positioning the line breaks 388 of the smaller title 384.

Figure 17A:
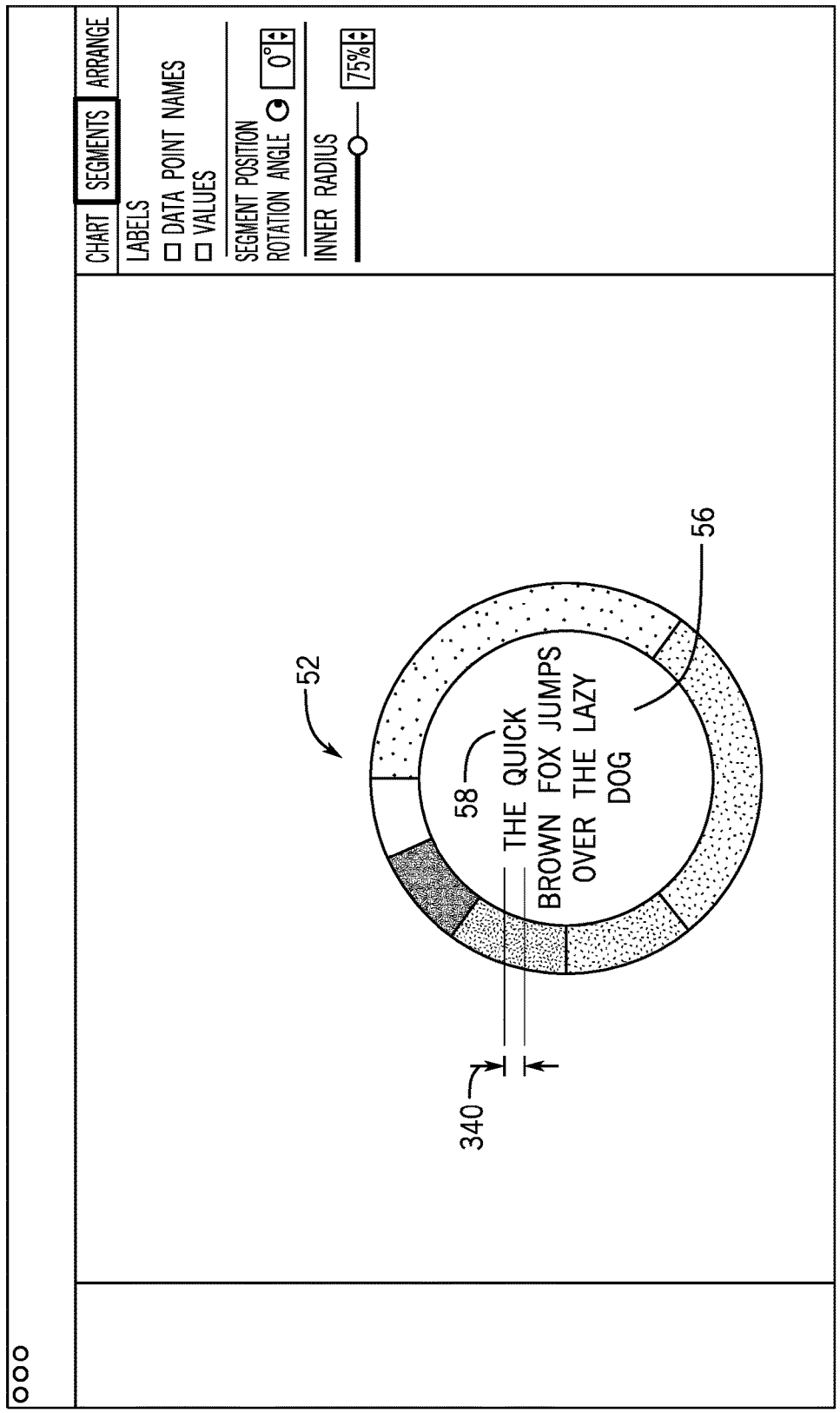
FIGS. 17A-D illustrate dynamically adjusting the title based on increasing the size of the donut chart of FIG. 7 (which proportionally increases the inner hole region of the donut chart), according to embodiments of the present disclosure.

The processor core complex 12 may also dynamically adjust the title 58 based on increasing the size of the donut chart 52. For example, FIGS. 17A-D illustrate dynamically adjusting the title 58 based on increasing the size of the donut chart 52 of FIG. 7 (which proportionally increases the inner hole region 56 of the donut chart 52), according to embodiments of the present disclosure. In particular, FIG. 17A illustrates the donut chart 52 having the inner hole region 56 and the title 58. As illustrated, the title 58 has the initial text size 340 of FIG. 16A.

Figure 17B:
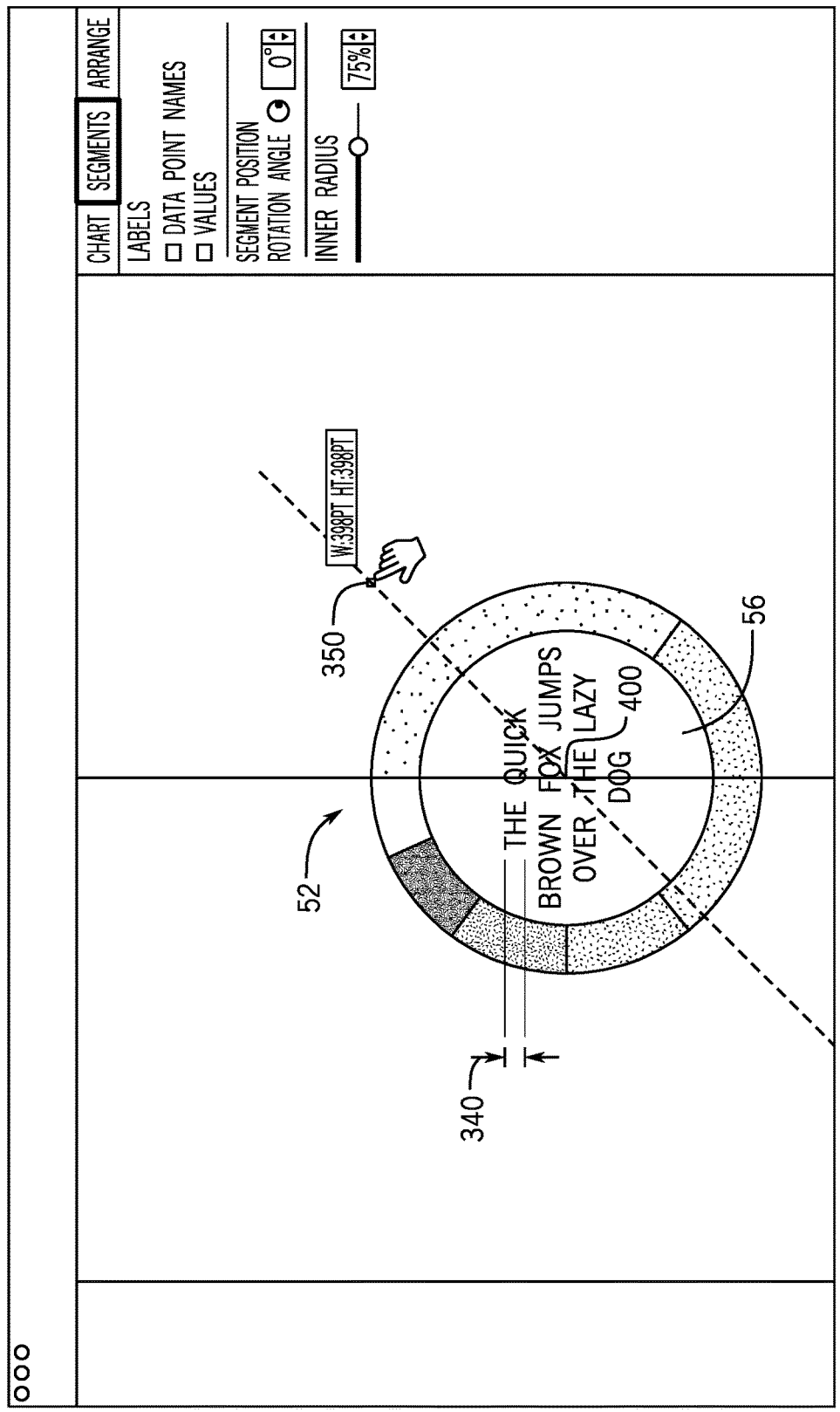

FIG. 17B illustrates the user selecting the donut chart 52. As such, the processor core complex 12 may detect user input indicating the selection, and provide the resizing control 350 that enables resizing the donut chart 52. As illustrated, the resizing control 350, when selected, displays a current size of the donut chart 52 at a length of 398 points and a width of 398 points.

Figure 17C:
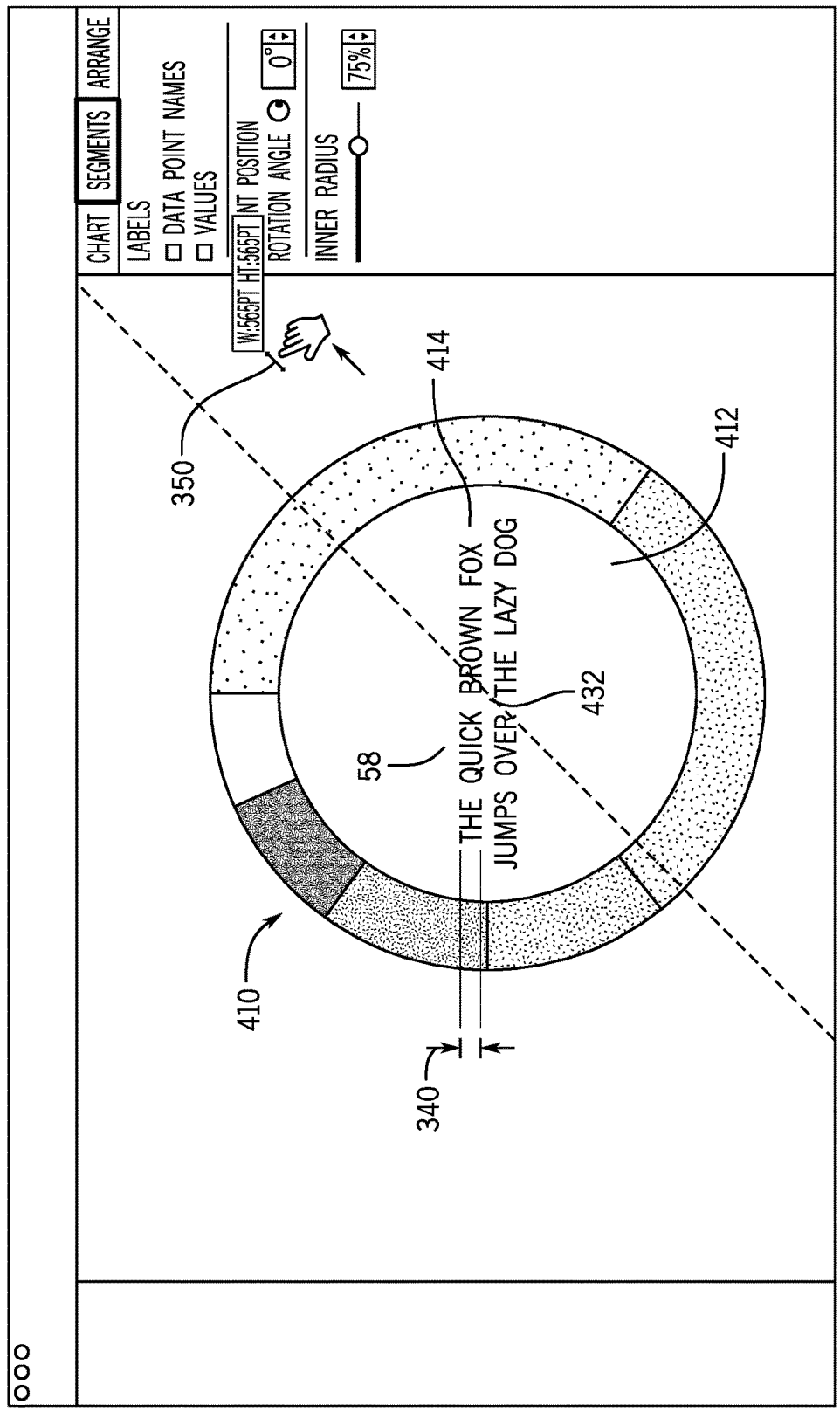

The processor core complex 12 may detect user input of increasing the size of the donut chart 52, generating a larger donut chart. For example, FIG. 17C illustrates the user moving the resizing control 350 away from the center 400 of the donut chart 52 of FIG. 17B to increase the size of the donut chart 52 and generate a larger donut chart 410. As illustrated, the resizing control 350 displays the size of the larger donut chart 410 at a length of 565 points and a width of 565 points. The processor core complex 12 detects and/or receives the increased size of the larger donut chart 410 and may increase (e.g., proportionally increase) the inner hole region 56 (of the donut chart 52 in FIG. 17B) to generate a larger inner hole region 412.

The processor core complex 12 may then determine whether the title 58 fits in the larger inner hole region 412 on a single line of text. If so, the processor core complex 12 may display the title 58 in the larger inner hole region 412 as a single line of text. If the title 58 does not fit in the larger inner hole region 412 on a single line of text, then the processor core complex 12 may dynamically wrap the title 58. Specifically, the processor core complex 12 may dynamically position line breaks 414 of the title 58 to attempt to fit the title 58 in the larger inner hole region 412 and/or center the title 58 in the larger inner hole region 412. For example, FIG. 17C illustrates the title 58 that has been dynamically wrapped by the processor core complex 12 with the line breaks 414. In some embodiments, the font size for the title 58 may be increased. For example, if the title 58 had been previously decreased in size, then the processor core complex 12 may dynamically increase the size of the title 58 (but not beyond the initial size 340 of the title 58). In the illustrated example, because the title 58 had not been previously decreased in size and/or because the title 58 is already the initial size 340 of the title 58 shown in FIG. 17B, the processor core complex 12 does not dynamically increase the size 340 of the title 58 (e.g., beyond the initial size 340). Additionally or alternatively, the processor core complex 12 may increase the size of the title 58 without limit.

Figure 17D:
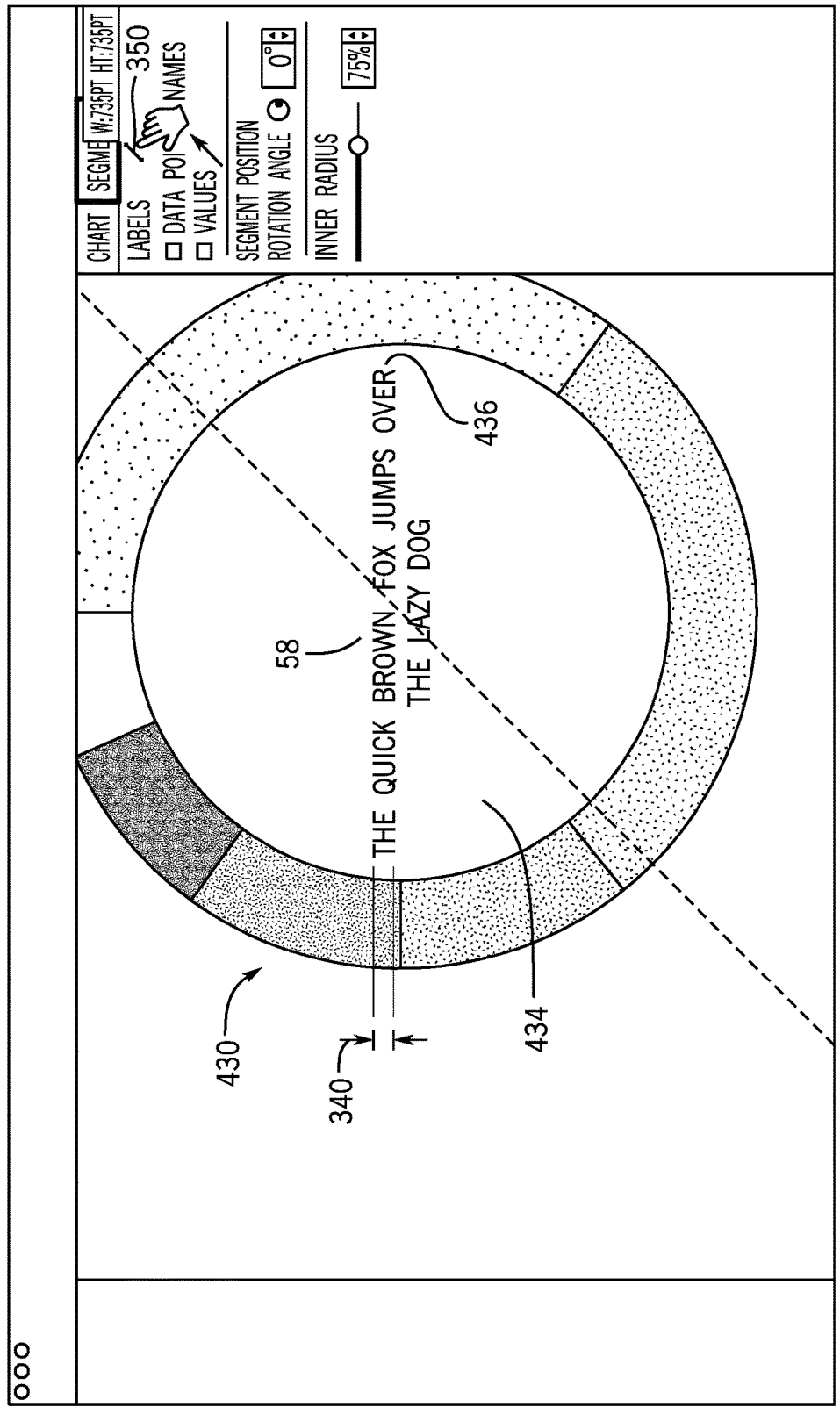

In FIG. 17D, the processor core complex 12 may detect user input of increasing the size of the larger donut chart 410, generating an even larger donut chart 430. For example, the user may move the resizing control 350 away from the center 432 of the larger donut chart 410 of FIG. 17C to increase the size of the larger donut chart 410 and generate the larger donut chart 430. As illustrated, the resizing control 350 displays the size of the larger donut chart 430 at a length of 735 points and a width of 735 points. The processor core complex 12 detects and/or receives the increased size of the larger donut chart 430 and may increase (e.g., proportionally increase) the larger inner hole region 412 (of the larger donut chart 410 in FIG. 17C) to generate an even larger inner hole region 434.

The processor core complex 12 may then determine whether the title 58 fits in the larger inner hole region 434 on a single line of text. If so, the processor core complex 12 may display the title 58 in the larger inner hole region 434 as a single line of text. If the title 58 does not fit in the larger inner hole region 434 on a single line of text, then the processor core complex 12 may dynamically wrap the title 58. Specifically, the processor core complex 12 may dynamically position line breaks 436 of the title 58 to attempt to fit the title 58 in the larger inner hole region 434 and/or center the title 58 in the larger inner hole region 434. For example, FIG. 17D illustrates the title 58 that has been dynamically wrapped by the processor core complex 12 with the line breaks 434. If the title 58 had been previously decreased in size, then the processor core complex 12 may dynamically increase the size of the title 58 (but not beyond the initial size 340 of the title 58). In the illustrated example, because the title 58 had not been previously decreased in size and/or because the title 58 is already the initial size 340 of the title 58 shown in FIG. 17B, the processor core complex 12 does not dynamically increase the size 340 of the title 58 (e.g., beyond the initial size 340). Additionally or alternatively, the processor core complex 12 may increase the size of the title 58 without limit.

In this manner, the process 230 of FIGS. 13A-B and the techniques described with respect FIGS. 16A-D and 17A-D may dynamically adjust the title 58 based on adjusting the size of the donut chart 52 to generate a more visually pleasing donut chart 52, without having a user manually adjust the title 58.

4. Adjusting a Font Property of the Title of the Donut Chart

Figure 18A:
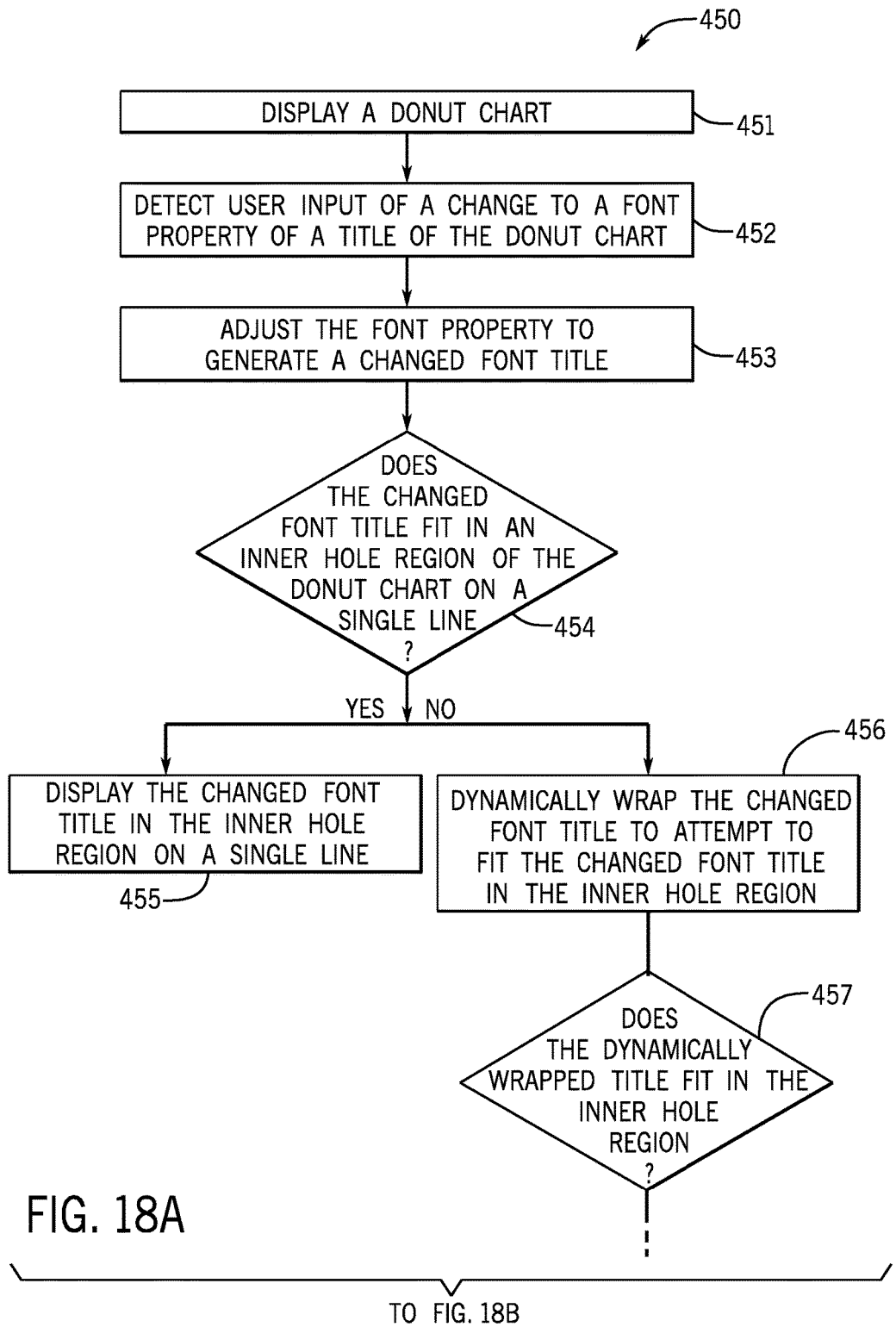
FIGS. 18A-B are a flow diagram of a more specific process for dynamically adjusting the title based on adjusting a font property of the title of the donut chart of FIG. 7, according to embodiments of the present disclosure.
Figure 18B:
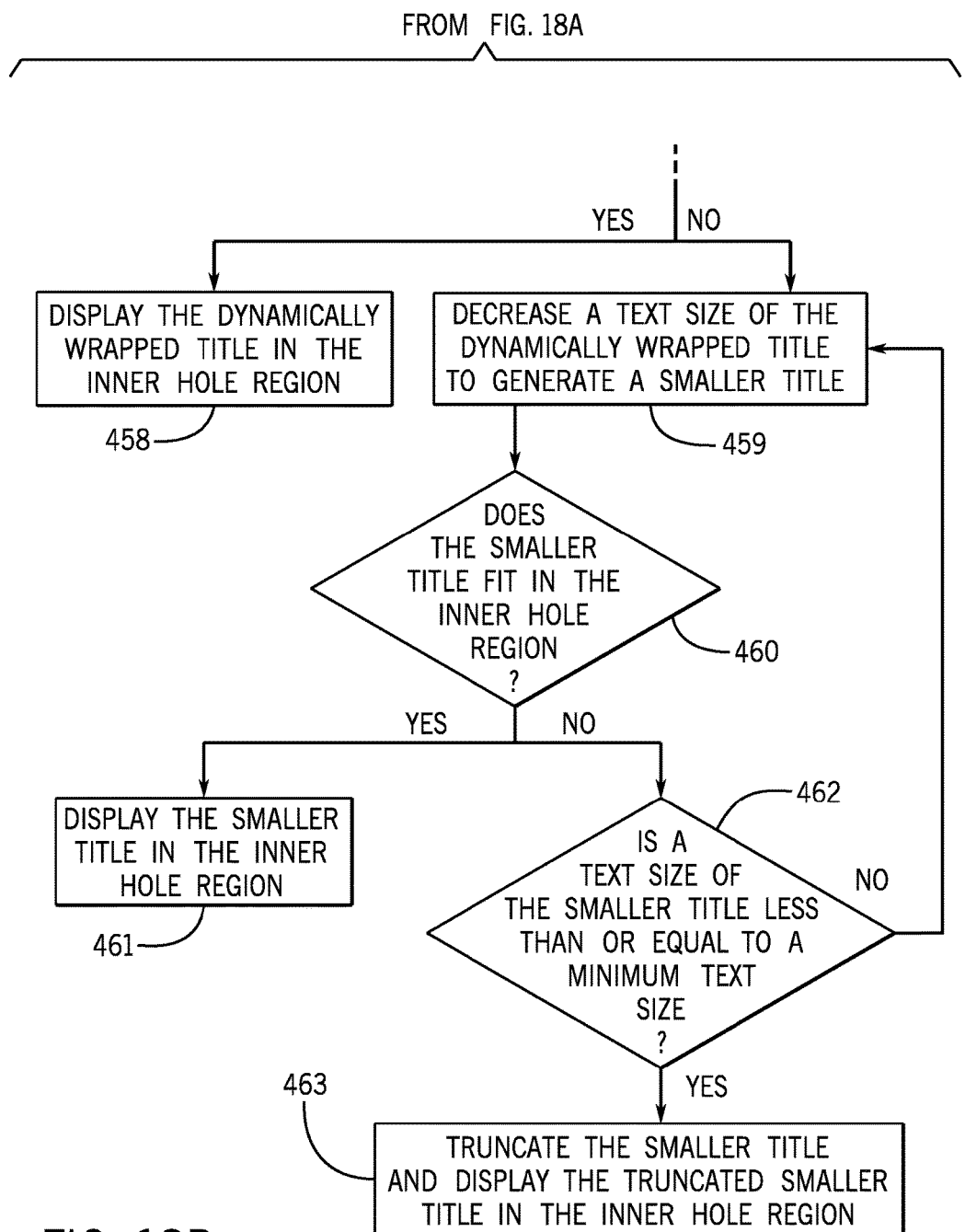

With the process 80 of FIG. 8 in mind as a more general technique, FIGS. 18A-B are a flow diagram of a more specific process 450 for dynamically adjusting the title 58 based on adjusting a font property of the title 58 of the donut chart 52 of FIG. 7, according to embodiments of the present disclosure. The process 450 may be in the form of an application (e.g., the software application 50) that includes instructions that are executed by at least one suitable processor of a computer system, such as the processor core complex 12 of the electronic device 10. The illustrated process 450 is merely provided as an example, and in other embodiments, certain illustrated steps of the process 450 may be performed in other orders, skipped, or repeated, according to embodiments of the present disclosure.

Figure 19A:
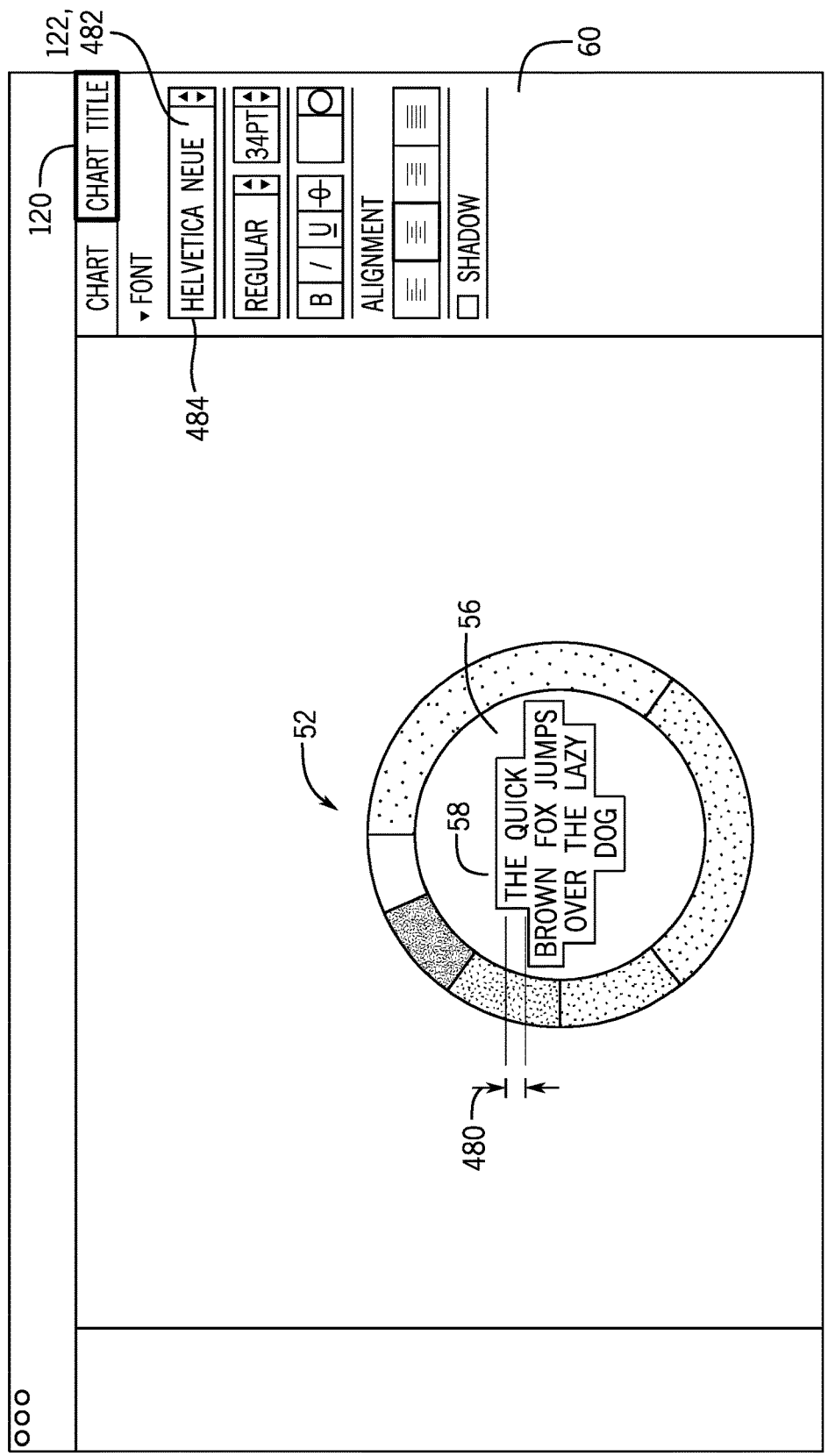
FIGS. 19A-E illustrate dynamically adjusting the title based on adjusting a font property of the title of the donut chart of FIG. 7, according to embodiments of the present disclosure.

As illustrated, in process block 451, the processor core complex 12 may display the donut chart 52. For example, FIGS. 19A-E illustrate dynamically adjusting the title 58 based on adjusting a font property of the title 58 of the donut chart 52 of FIG. 7, according to embodiments of the present disclosure. FIG. 19A illustrates the processor core complex 12 displaying the donut chart 52 having the inner hole region 56 and the title 58, which has been selected by the user (e.g., via a mousing device, touch using a touchscreen, a stylus device, or the like). The title 58 may have an initial text size 480 as illustrated. Moreover, the title tab 120 of the formatting panel 60 may be selected, e.g., by the user or automatically when the title 58 is selected by the user. The title tab 120 may include the one or more title controls 122 that enable adjustment to at least some properties associated with the title 58. In particular, the one or more title controls 122 may enable adjustment of a font property of the title 58. A font property may include any suitable property of the title 58 relating to the font of the title 58, such as the font or font type (e.g., Times New Roman, Arial, and the like), font style or emphasis (e.g., bold, italic, underline, and the like), font spacing, font size, and the like. For example, a font control 482, which shows an initial font 484 of the title 58 to be Helvetica Neue, may enable adjustment of the font of the title 58. The initial font of the title 58 may be set by the user or by default in the font control 482 (e.g., when first opening the software application 50).

Figure 19B:
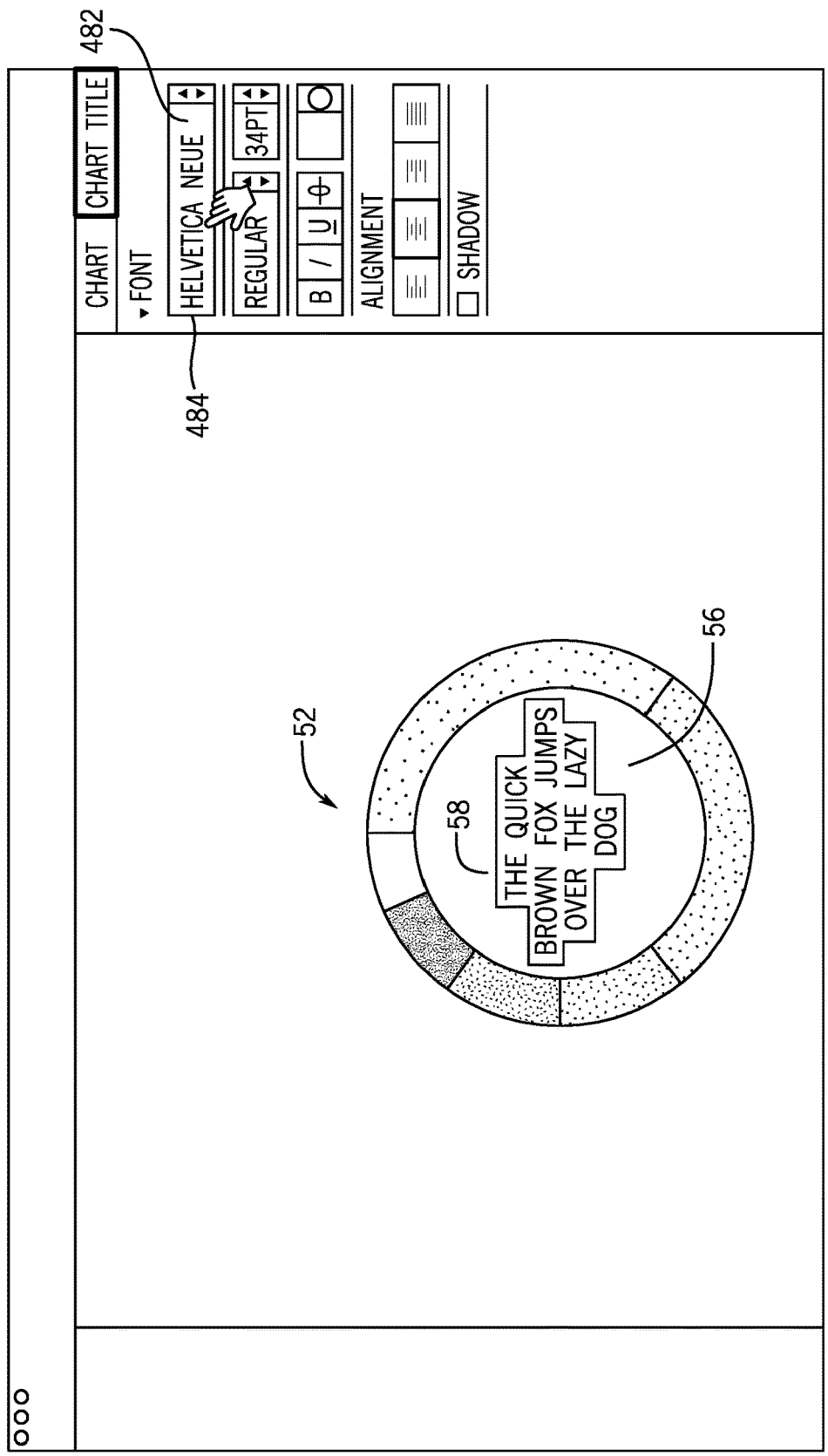
Figure 19C:
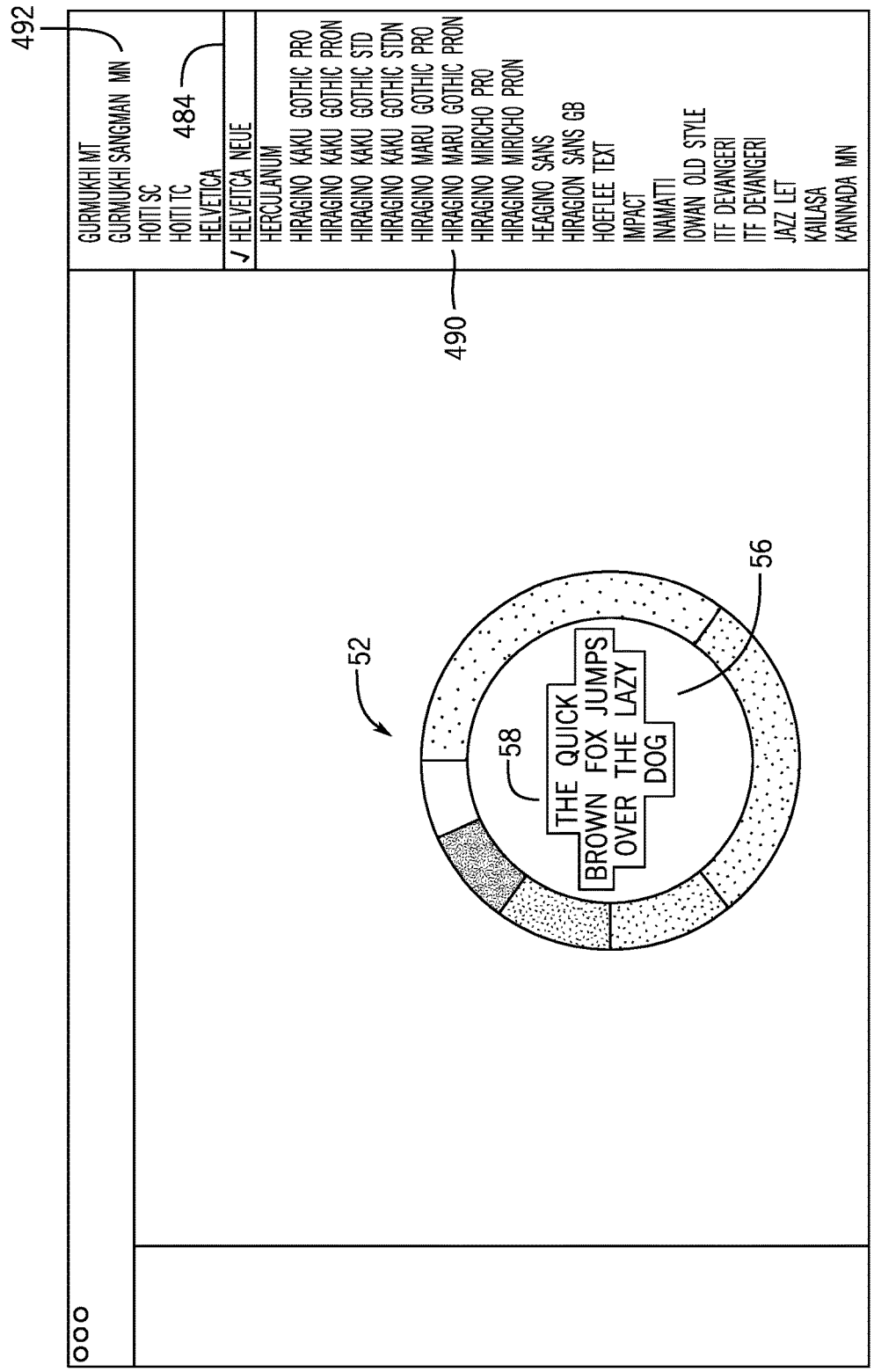
Figure 19D:
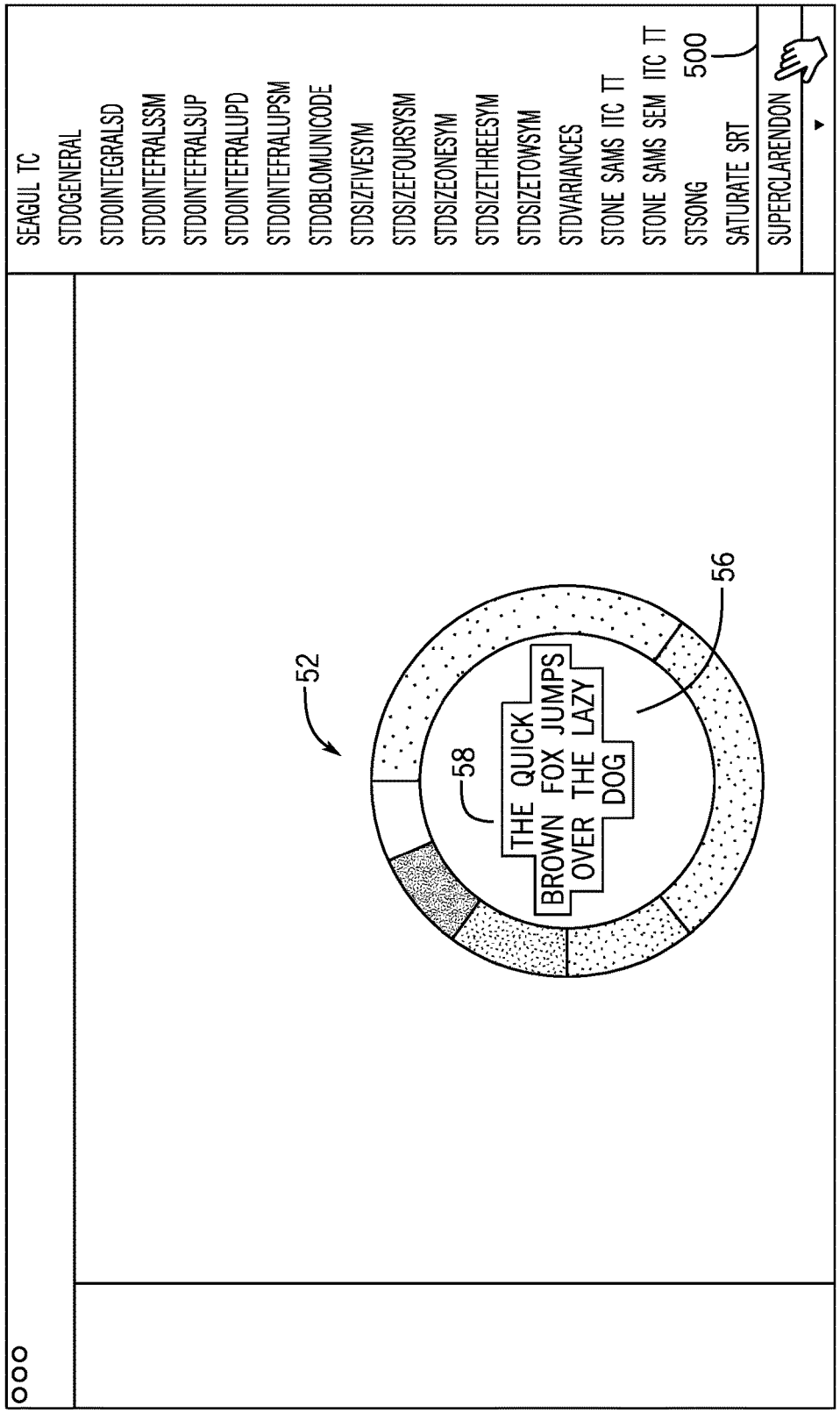

In process block 452, the processor core complex 12 may detect user input of a change to a font property of the title 58 of the donut chart 52. For example, FIG. 19B illustrates the user selecting the font control 482 (e.g., via a mousing device, touch using a touchscreen, a stylus device, or the like). In FIG. 19C, the processor core complex 12 displays a drop-down menu 490 providing multiple selectable fonts 492 as a result of the user selecting the font control 482. As illustrated, the current font 484 (Helvetica Neue) of the title 58 is pre-selected. In FIG. 19D, the user selects a different font 500 (Superclarendon). The processor core complex 12 may detect this user input of the change to the font of the title 58 from the current font 484 (Helvetica Neue) to the different font 500 (Superclarendon).

Figure 19E:
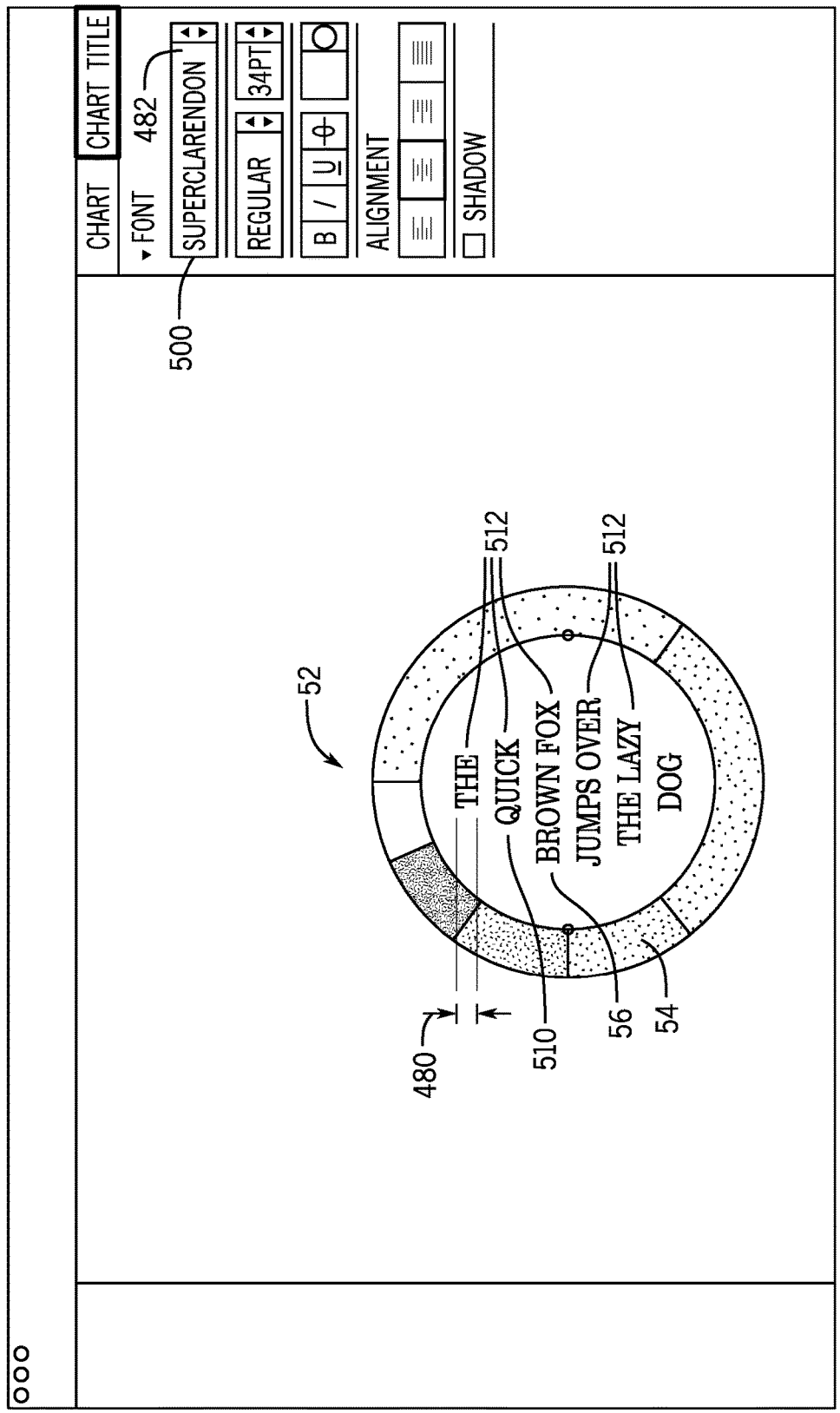

In process block 453, the processor core complex 12 may adjust the font property to generate a changed font title. As illustrated in FIG. 19E, the processor core complex 12 adjusts the font of the title 58 from the current font 484 (Helvetica Neue) to the different font 500 (Superclarendon) to generate a changed font title 510 in response to the detecting the user input of this change in font.

In decision block 454, the processor core complex 12 may determine whether the changed font title 510 fits in the inner hole region 56 of the donut chart 52 on a single line. That is, the processor core complex 12 may determine whether the changed font title 510 fits within a bounding area (e.g., a surface area) of the inner hole region 56 as a single line of text, such that the changed font title 510 does not overlap the outer ring portion 54 of the donut chart 52.

In process block 455, if the changed font title 510 fits within the bounding area of the inner hole region 56 as a single line of text, such that the changed font title 510 does not overlap the outer ring portion 54 of the donut chart 52, then the processor core complex 12 may display the changed font title 510 in the inner hole region 56 as a single line of text. As an example, FIG. 11D illustrates the processor core complex 12 displaying a title 210 in the inner hole region 56 as a single line of text.

However, in process block 456, if the changed font title 510 does not fit within the bounding area of the inner hole region 56 as a single line of text, such that the changed font title 510 overlaps the outer ring portion 54 of the donut chart 52, then the processor core complex 12 may dynamically wrap the changed font title 510 to attempt to fit the changed font title 510 in the inner hole region 56. Specifically, the processor core complex 12 may dynamically position the line breaks 512 of the changed font title 510 to attempt to fit the changed font title 510 in the inner hole region 56 and/or center the changed font title 510 in the inner hole region 56. For example, for the changed font title 510 shown in FIG. 19E, the processor core complex 12 determines that the changed font title 510 overlaps the outer ring portion 54 as a single line of text, and thus does not fit in the inner hole region 56. As such, the processor core complex 12 dynamically wraps the changed font title 510 with line breaks 512 to attempt to fit the changed font title 510 in the inner hole region 56.

In decision block 457, the processor core complex 12 may determine whether the dynamically wrapped changed font title 510 fits in the inner hole region 56. If so, in process block 458, the processor core complex 12 may display the dynamically wrapped changed font title 510 in the inner hole region 56. For example, as shown in FIG. 19E, the processor core complex 12 displays the dynamically wrapped changed font title 510 in the inner hole region 56. As illustrated, the font size of the dynamically wrapped changed font title 510 is the initial font size 480 (of the title 58 from FIG. 19A). This may be because the processor core complex 12 determines that the dynamically wrapped changed font title 510 fits in the inner hole region 56 with the line breaks 512 (and so decreasing the size of the dynamically wrapped changed font title 510 is unnecessary).

However, in process block 459, if the dynamically wrapped changed font title 510 does not fit in the inner hole region 56, the processor core complex 12 may decrease a text size of the dynamically wrapped changed font title 510 to generate a smaller title. In particular, the processor core complex 12 may dynamically decrease a font size of the changed font title 510 to generate a smaller title having a smaller font size than that of the initial font size 480 (as shown in FIG. 19A). In some cases, other suitable techniques may be used to decrease the text size of the changed font title 510 to generate the smaller title, such as decreasing space between text characters of the changed font title 510, changing a font of the changed font title 510, and the like. Additionally, in some embodiments, after decreasing the text size of a title (e.g., the changed font title 510), the processor core complex 12 may dynamically rewrap the title to better fit and/or center the title in an inner hole region (e.g., the inner hole region 56).

In decision block 460, the processor core complex 12 may determine whether the smaller title fits in the inner hole region 56. If so, in process block 461, the processor core complex 12 may display the smaller title in the inner hole region 56.

In decision block 462, if the processor core complex 12 determines that the smaller title does not fit in the inner hole region 56, then the processor core complex 12 may determine whether the text size of the smaller title is less than or equal to a minimum text size. The minimum text size may be associated with a readability threshold. That is, the minimum text size may be sufficiently small to be considered unreadable or at least difficult to read. The minimum text size may be any suitable font size that may be considered unreadable or at least difficult to read, such as under 12 point font, under 10 point font, under 6 point font, or the like. If the processor core complex 12 determines that the text size of the smaller title is greater than the minimum text size, the processor core complex 12 may decrease the text size of the smaller title (e.g., by returning to process block 459). Otherwise, if the processor core complex 12 determines that the text size of the smaller title is less than or equal to the minimum text size, in process block 463, the processor core complex 12 may truncate the smaller title and display the truncated smaller title in the inner hole region 56. That is, the processor core complex 12 may remove a portion of the smaller title and display a unique text character indicating that the smaller title has been truncated. The unique text character may be any suitable text character that may indicate that at least a portion of the smaller title has been removed, such as an ellipsis. FIGS. 21C and 22B illustrate examples of truncated titles 582, 610. Additionally, in some embodiments, after truncating a title (e.g., the smaller title), the processor core complex 12 may dynamically rewrap the title to better fit and/or center the truncated title in an inner hole region (e.g., the inner hole region 56).

Figure 20A:
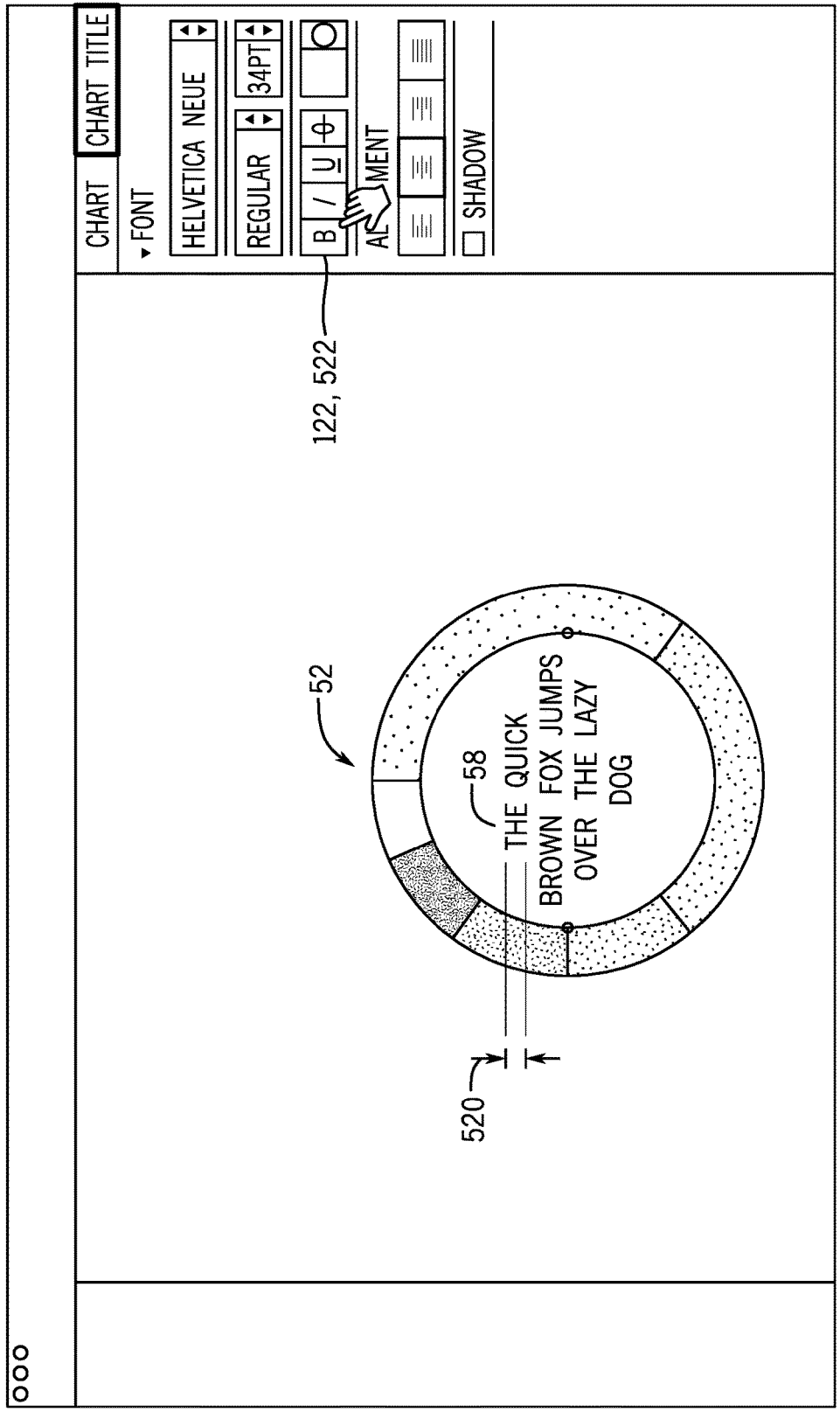
FIGS. 20A-B illustrate dynamically adjusting the title based on adjusting the font style of the title of the donut chart of FIG. 7, according to embodiments of the present disclosure.
Figure 20B:
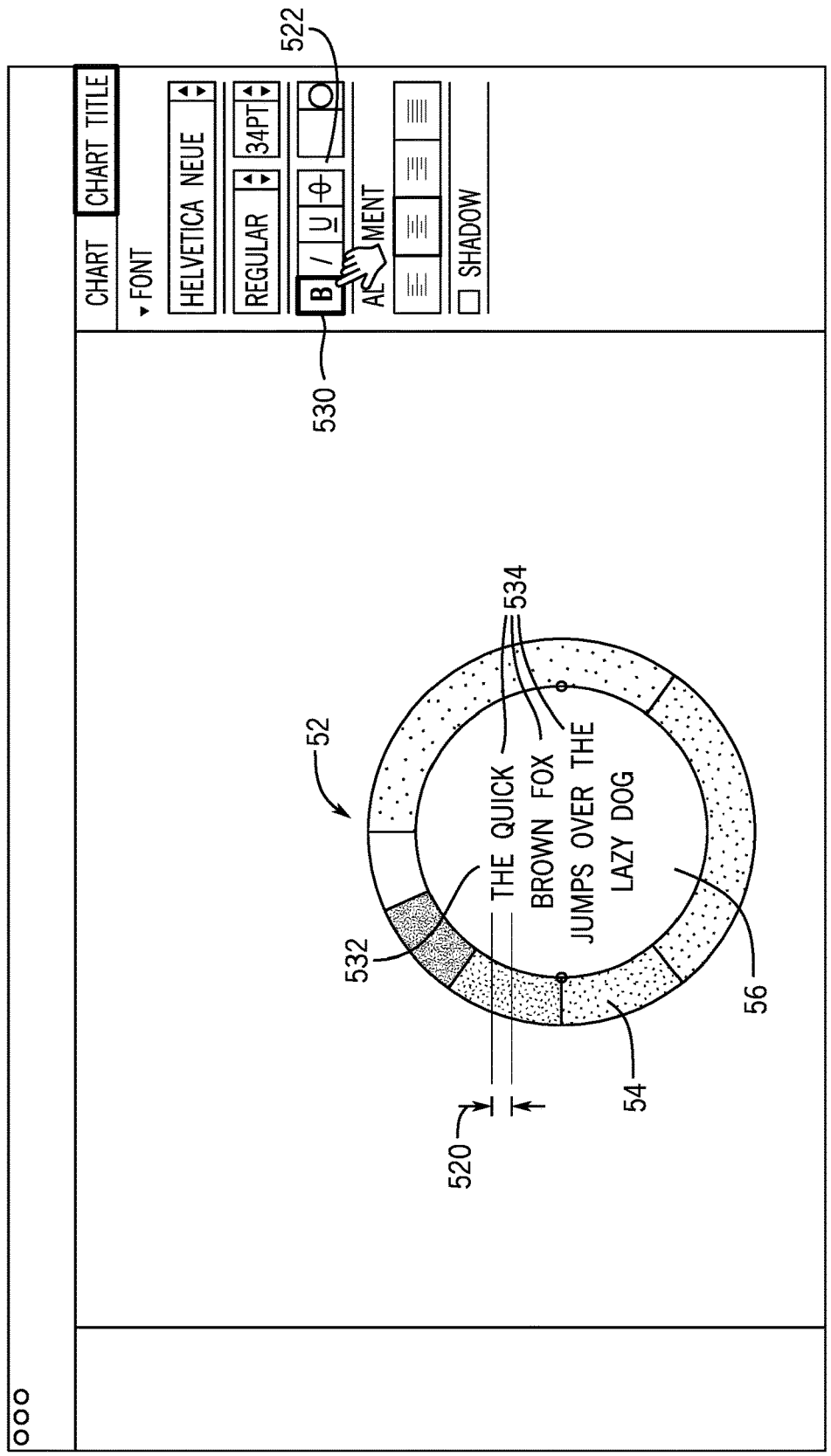

As another example, the processor core complex 12 may also dynamically adjust the title 58 based on adjusting the font style of the title 58. For example, FIGS. 20A-B illustrate dynamically adjusting the title 58 based on adjusting the font style of the title 58 of the donut chart 52 of FIG. 7, according to embodiments of the present disclosure. In particular, FIG. 20A illustrates the processor core complex 12 displaying the donut chart 52 having the inner hole region 56 and the title 58, which has been selected by the user (e.g., via a mousing device, touch using a touchscreen, a stylus device, or the like). The title 58 may have an initial text size 520 as illustrated. Moreover, the title tab 120 of the formatting panel 60 may be selected, e.g., by the user or automatically when the title 58 is selected by the user. The title tab 120 may include the one or more title controls 122 that enable adjustment to at least some properties associated with the title 58. For example, the one or more title controls 122 may include a font style control 522, which may enable a variety of font styles (e.g., bold, italic, underline, strikethrough, and the like) to be applied to the title 58. As illustrated, no font style is currently applied to the title 58. The initial application or lack of application of a font style to the title 58 may be set by the user or by default (e.g., when first opening the software application 50), and be indicated by the font style control 522.

FIG. 20B illustrates the user selecting a bold option 530 of the font style control 522 (e.g., via a mousing device, touch using a touchscreen, a stylus device, or the like). As illustrated, the font style control 522 may visually indicate that the bold option 530 was selected (e.g., by showing that the bold option 530 button was depressed, changing the color of the bold option 530, and the like). The processor core complex 12 may then adjust the font style of the title 58 to generate a changed font title. As illustrated in FIG. 20B, the processor core complex 12 adjusts the font style of the title 58 from not having a font style (e.g., not bolded, not italicized, not underlined, not struck through, and the like) to having a bold font style to generate a changed font style title 532 in response to the detecting the user input of this change in font style.

The processor core complex 12 may determine whether the changed font style title 532 fits in the inner hole region 56 as a single line of text. That is, the processor core complex 12 may determine whether the changed font style title 532 fits within a bounding area (e.g., a surface area) of the inner hole region 56 as a single line of text, such that the changed font style title 532 in a single line of text does not overlap the outer ring portion 54 of the donut chart 52. If so, then the processor core complex 12 may display the changed font style title 532 as a single line of text in the inner hole region 56. If the changed font style title 532 does not fit in the inner hole region 56 as a single line of text, then the processor core complex 12 may dynamically position line breaks 534 of the changed font style title 532 to attempt to fit the changed font style title 532 in the inner hole region 56 and/or center the changed font style title 532 in the inner hole region 56. For example, FIG. 20B illustrates the changed font style title 532 that has been dynamically wrapped by the processor core complex 12 with the line breaks 534 in the inner hole region 56. As illustrated, the font size of the dynamically wrapped changed font style title 532 is the initial font size 520 (of the title 58 from FIG. 20A). This may be because the processor core complex 12 determines that the changed font style title 532 fits in the inner hole region 56 (and so decreasing the size of the changed font style title 532 is unnecessary).

If the processor core complex 12 determines that the dynamically wrapped changed font style title 532 does not fit in the inner hole region 56, then the processor core complex 12 may dynamically decrease a text size of the changed font style title 532 to generate a smaller title that fits in the inner hole region 56. That is, the processor core complex 12 may determine that the changed font style title 532 overlaps the outer ring portion 54, and thus does not fit in the inner hole region 56. As such, the processor core complex 12 may dynamically decrease the initial font size 520 of the changed font style title 532 to generate a smaller title having a smaller font size. In some cases, other suitable techniques may be used to decrease the text size of the changed font style title 532 to generate the smaller title having the smaller font size, such as decreasing space between text characters of the changed font style title 532, changing a size of the changed font style title 532, and the like. Additionally, in some embodiments, after decreasing the text size of a title (e.g., the changed font style title 532), the processor core complex 12 may dynamically rewrap the title to better fit and/or center the title in an inner hole region (e.g., the inner hole region 56).

In this manner, the process 450 of FIGS. 18A-B and the techniques described with respect FIGS. 19A-D may dynamically adjust the title 58 based on adjusting a font property of the title 58 of the donut chart 52 to generate a more visually pleasing donut chart 52, without having a user manually adjust the title 58.

5. When Font Size of the Title is Too Small or Too Large

In some circumstances, dynamically decreasing the text size of the title 58 (e.g., as a result of decreasing the size of the inner hole region 56, the donut chart 52, and the like) may render the title 58 unreadable. In such cases, the title 58 may be truncated and a unique text character may be inserted to indicate that the title 58 has been truncated. The unique text character may be any suitable text character that may indicate that the title 58 has been truncated, such as an ellipsis.

Figure 21A:
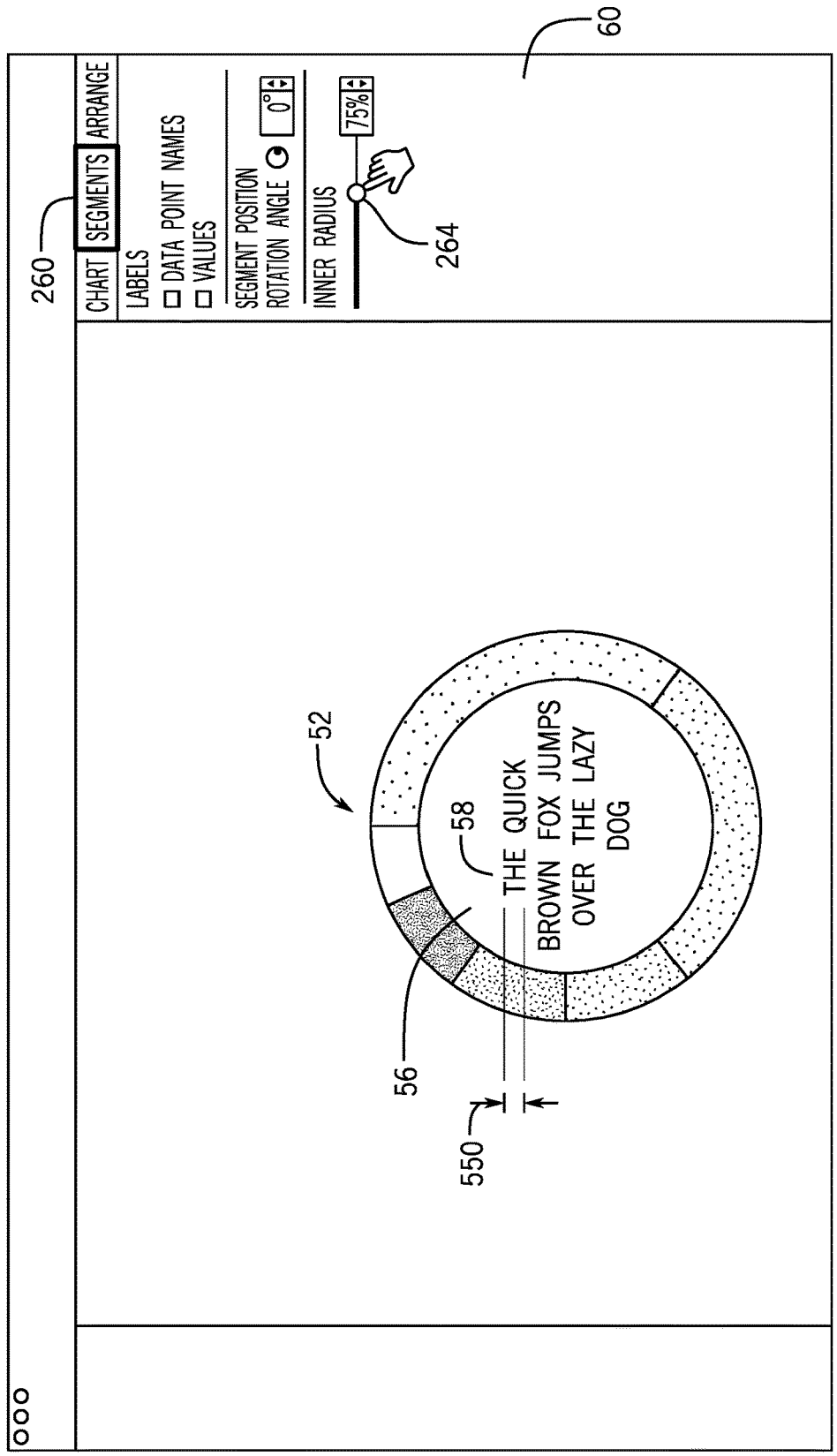
FIGS. 21A-C illustrate dynamically truncate the title when the title becomes sufficiently small based on a property adjustment to the donut chart of FIG. 7, according to embodiments of the present disclosure.
Figure 21B:
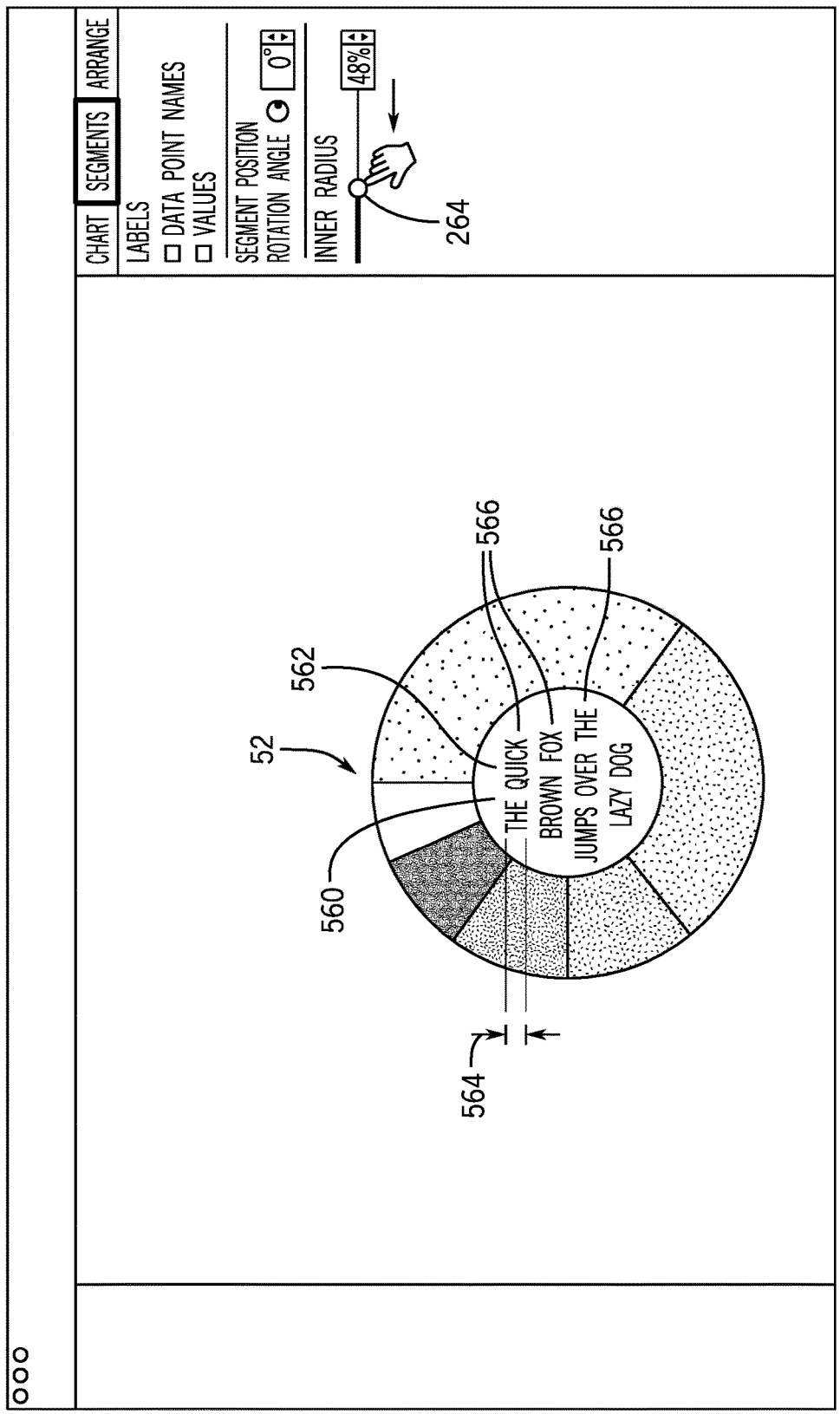
Figure 21C:
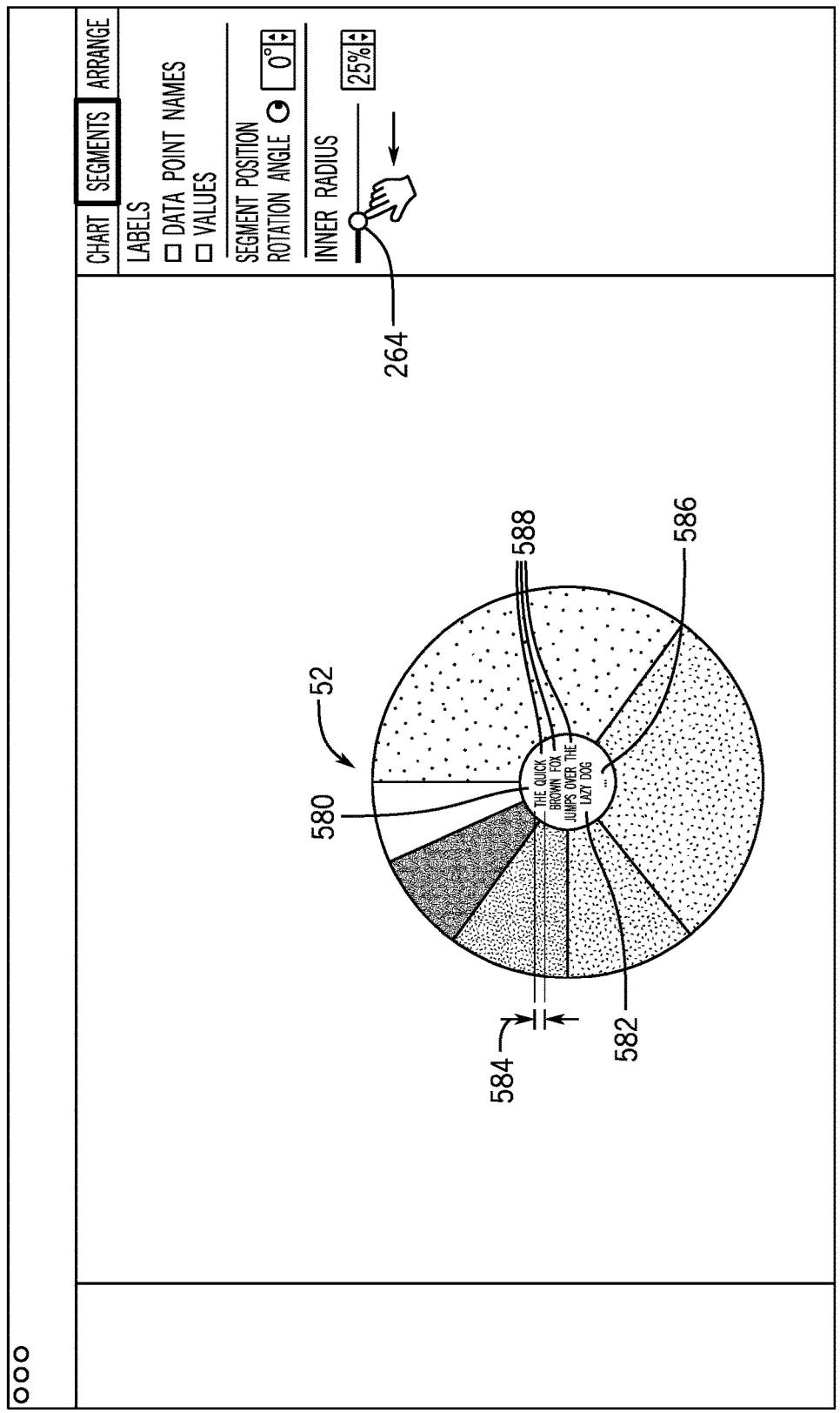

For example, FIGS. 21A-C illustrate dynamically truncating the title 58 when the title 58 becomes sufficiently small based on a property adjustment to the donut chart 52 of FIG. 7, according to embodiments of the present disclosure. FIG. 21A illustrates the processor core complex 12 displaying the donut chart 52 having the inner hole region 56 and the title 58, which has been selected by the user (e.g., via a mousing device, touch using a touchscreen, a stylus device, or the like). The title 58 may have an initial text size 550 as illustrated. As shown, the user may select the inner radius control 264 of the outer ring portion tab 260 (titled "Segments") of the formatting panel 60.

The processor core complex 12 may then detect user input of decreasing the inner hole region 56 of the donut chart 52. For example, FIG. 21B illustrates the user adjusting the inner radius control 264 to decrease the inner radius of the inner hole region 56 from 75% to 48%. The processor core complex 12 may detect and/or receive the smaller inner radius (e.g., 48%). As a result, the processor core complex 12 may decrease the inner hole region 56 to generate a smaller inner hole region. In FIG. 21B, the processor core complex 12 decreases the inner hole region 56 in response to the detecting the user input of decreasing the inner hole region 56, generating a smaller inner hole region 560. The processor core complex 12 may determine whether the title 58 in FIG. 21A fits in the smaller inner hole region 560 in FIG. 21B on a single line of text. If so, the processor core complex 12 may display the title 58 in the smaller inner hole region 560 as a single line of text. If the title 58 does not fit in the smaller inner hole region 560 on a single line of text, then the processor core complex 12 may dynamically wrap the title 58. Specifically, the processor core complex 12 may dynamically position line breaks of the title 58 to attempt to fit the title 58 in the smaller inner hole region 560 and/or center the title 58 in the smaller inner hole region 560. If the processor core complex 12 determines that the dynamically wrapped title 58 fits in the smaller inner hole region 560, then the processor core complex 12 may display the dynamically wrapped title 58 in the smaller inner hole region 560. If not, the processor core complex 12 may dynamically decrease a text size of the dynamically wrapped title 58 to generate a smaller title to attempt to fit the smaller title in the smaller inner hole region 560. As illustrated, the processor core complex 12 dynamically decreases a text size of the title 58 to generate a smaller title 562 to attempt to fit the smaller title 562 in the smaller inner hole region 560. In particular, the processor core complex 12 may dynamically decrease the initial font size 550 of the title 58 in FIG. 21A to generate the smaller title 562 having a smaller font size 564.

Additionally, the processor core complex 12 may detect user input of decreasing the smaller inner hole region 560 of the donut chart 52. For example, FIG. 21C illustrates the user adjusting the inner radius control 264 to decrease the inner radius of the smaller inner hole region 560 from 48% to 25%. The processor core complex 12 may detect and/or receive the smaller inner radius (e.g., 25%). As a result, the processor core complex 12 may decrease the smaller inner hole region 560 to generate a smaller inner hole region. In FIG. 21C, the processor core complex 12 decreases the smaller inner hole region 560 in response to the detecting the user input of decreasing the smaller inner hole region 560, generating an even smaller inner hole region 580. The processor core complex 12 may determine whether the smaller title 562 in FIG. 21B fits in the smaller inner hole region 580 in FIG. 21C on a single line of text. If so, the processor core complex 12 may display the smaller title 562 in the smaller inner hole region 580 as a single line of text. If the smaller title 562 does not fit in the smaller inner hole region 580 on a single line of text, then the processor core complex 12 may dynamically wrap the smaller title 562. Specifically, the processor core complex 12 may dynamically position line breaks 566 of the smaller title 562 to attempt to fit the smaller title 562 in the smaller inner hole region 580 and/or center the smaller title 562 in the smaller inner hole region 580. If the processor core complex 12 determines that the dynamically wrapped smaller title 562 fits in the smaller inner hole region 580, then the processor core complex 12 may display the dynamically wrapped smaller title 562 in the smaller inner hole region 580. If not, the processor core complex 12 may dynamically decrease a text size of the smaller title 562 to generate a smaller title that fits in the smaller inner hole region 580. As illustrated, the processor core complex 12 dynamically decreases a text size of the smaller title 562 to generate an even smaller title 582 that fits in the smaller inner hole region 580, as shown in FIG. 21C. In particular, the processor core complex 12 may dynamically decrease the font size 564 of the smaller title 562 in FIG. 21B to generate the even smaller title 582 having a smaller font size 584.

The processor core complex 12 may determine that the smaller font size 584 is below a readability threshold. That is, the smaller font size 584 may be sufficiently small to be considered unreadable or at least difficult to read. The readability threshold may be any suitable font size that may be considered unreadable or at least difficult to read, such as under 12 point font, under 10 point font, under 6 point font, or the like. Because the processor core complex 12 determines that the smaller font size 584 is below the readability threshold, the processor core complex 12 may dynamically truncate the smaller title 582 and insert a unique text character, such as an ellipsis 586, indicating that the smaller title 582 has been truncated. In some embodiments, the processor core complex 12 may determine the text of the smaller title 582 to be removed based on determining a target (e.g., maximum) quantity of text of the smaller title 582 that, when added to the ellipsis 586, may fit in the smaller inner hole region 580 (without going below the readability threshold).

In some embodiments, the processor core complex 12 may then dynamically wrap the smaller title 582 with the ellipsis 586. Specifically, the processor core complex 12 may dynamically position line breaks of the smaller title 582 to attempt to fit the smaller title 582 with the ellipsis 586 in the smaller inner hole region 580 and/or center the smaller title 582 with the ellipsis 586 in the smaller inner hole region 580. For example, FIG. 21C illustrates the smaller title 582 with the ellipsis 586 that has been dynamically wrapped by the processor core complex 12 with line breaks 588.

Figure 22A:
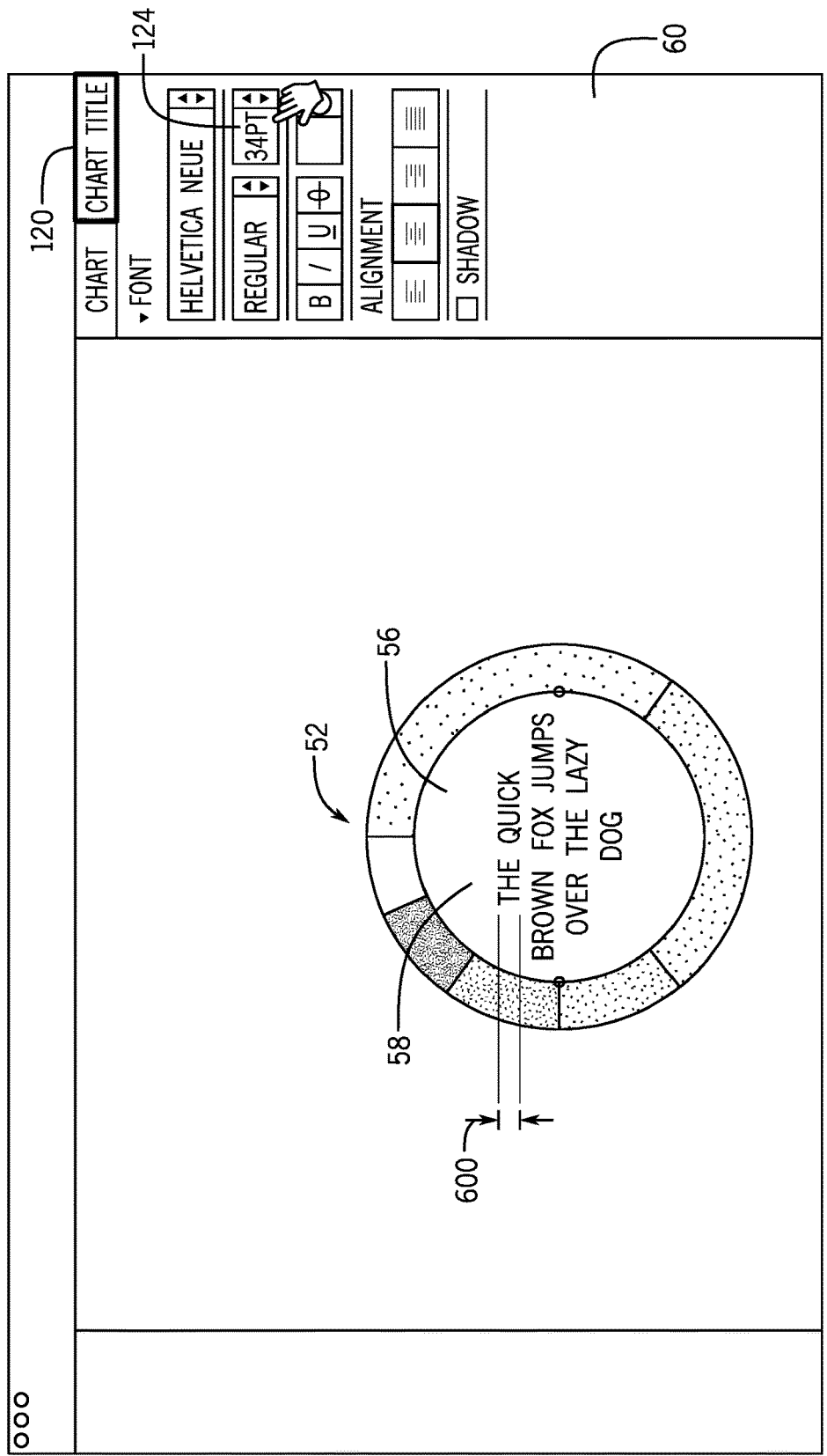
FIGS. 22A-B illustrate dynamically truncate the title of the donut chart of FIG. 7 based on setting the size of the title to a sufficiently large font size, according to embodiments of the present disclosure.
Figure 22B:
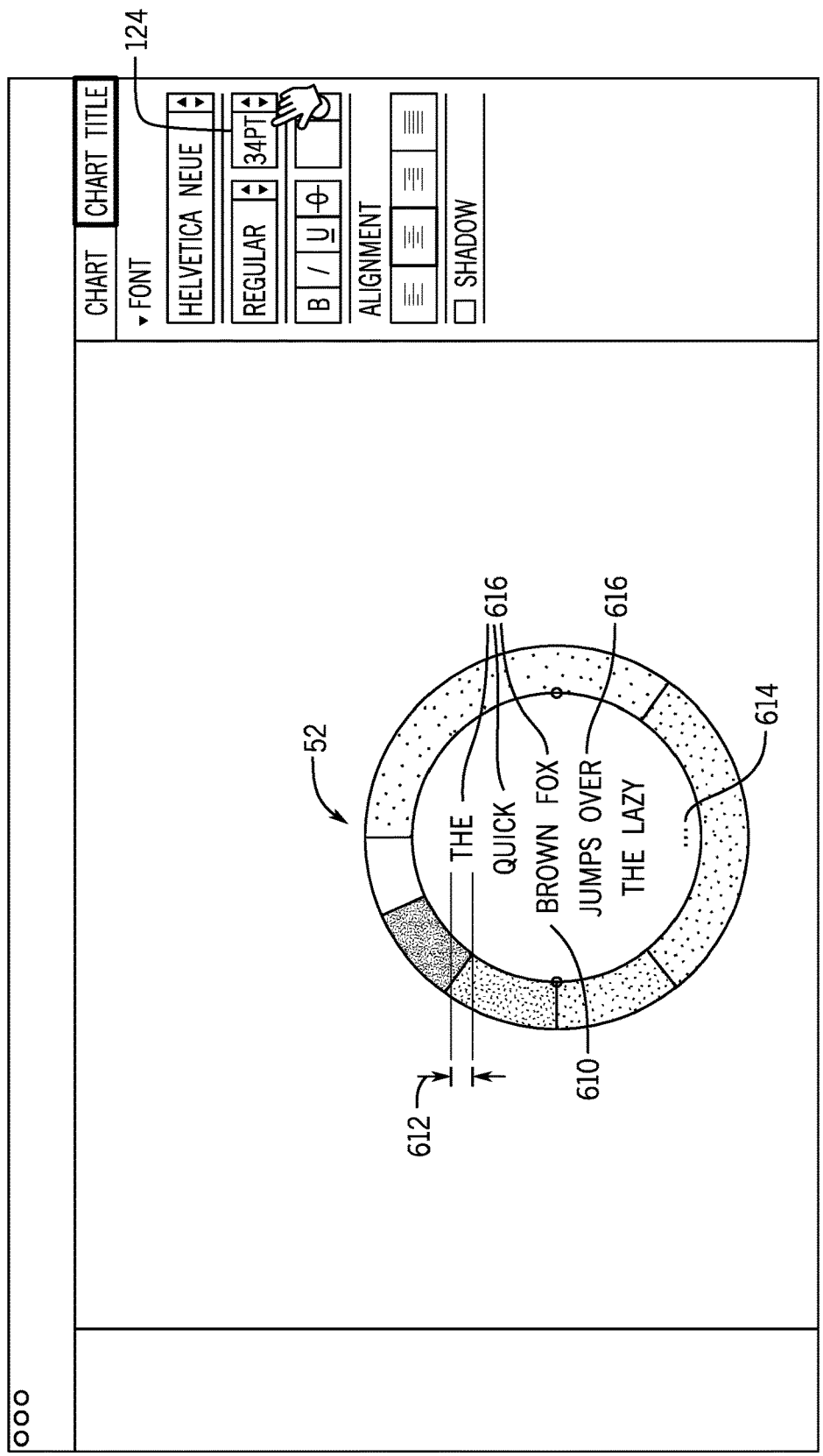

As another example, the processor core complex 12 may also dynamically truncate the title 58 when the size of the title 58 is set to be sufficiently large. For example, FIGS. 22A-B illustrate dynamically truncate the title 58 of the donut chart 52 of FIG. 7 based on setting the size of the title 58 to a sufficiently large font size, according to embodiments of the present disclosure. In particular, FIG. 22A illustrates the processor core complex 12 displaying the donut chart 52 having the inner hole region 56 and the title 58, which has been selected by the user (e.g., via a mousing device, touch using a touchscreen, a stylus device, or the like). The title 58 may have an initial text size 560 as illustrated. As shown, the user may select the font size control 124 of the title tab 120 of the formatting panel 60, which shows the initial text size as 64 points.

The processor core complex 12 may then detect user input of increasing the text size of the title 58. For example, FIG. 22B illustrates the user adjusting the font size control 124 to increase the font size of the title 58 from 64 points to a font size of 100 points. The processor core complex 12 may detect and/or receive the increased font size (e.g., 100%). As a result, the processor core complex 12 may increase the font size of the title 58 to generate a larger font size. In FIG. 22B, the processor core complex 12 increases the initial text size 560 of the title 58 of FIG. 22A in response to the detecting the user input of increasing the font size of the title 58, generating a larger title 610 having a font size 612 of 100 points. Because the processor core complex 12 may determine that the larger title 610 does not fit in the inner hole region 56, the processor core complex 12 may dynamically truncate the larger title 610 and insert a unique text character, such as an ellipsis 614, that indicated that the larger title 610 has been truncated. In particular, the processor core complex 12 may determine the text of the larger title 610 to be removed based on determining a target (e.g., maximum) quantity of text of the larger title 610 that, when added to the ellipsis 614, may fit in the inner hole region 56 (while maintaining the increased font size 612).

In some embodiments, the processor core complex 12 may then dynamically wrap the larger title 610 with the ellipsis 614. Specifically, the processor core complex 12 may dynamically position line breaks of the larger title 610 to attempt to fit the larger title 610 with the ellipsis 614 in the inner hole region 56 and/or center the larger title 610 with the ellipsis 614 in the inner hole region 56. For example, FIG. 22B illustrates the larger title 610 with the ellipsis 614 that has been dynamically wrapped by the processor core complex 12 with line breaks 616.

In this manner, the techniques described with respect FIGS. 21A-C and 22A-B may dynamically truncate the title 58 when the title 58 becomes sufficiently small or sufficiently large based on a property adjustment to the donut chart 52, without having a user manually adjust the title 58.

6. Adjusting a Location of the Title of the Donut Chart

Figure 23A:
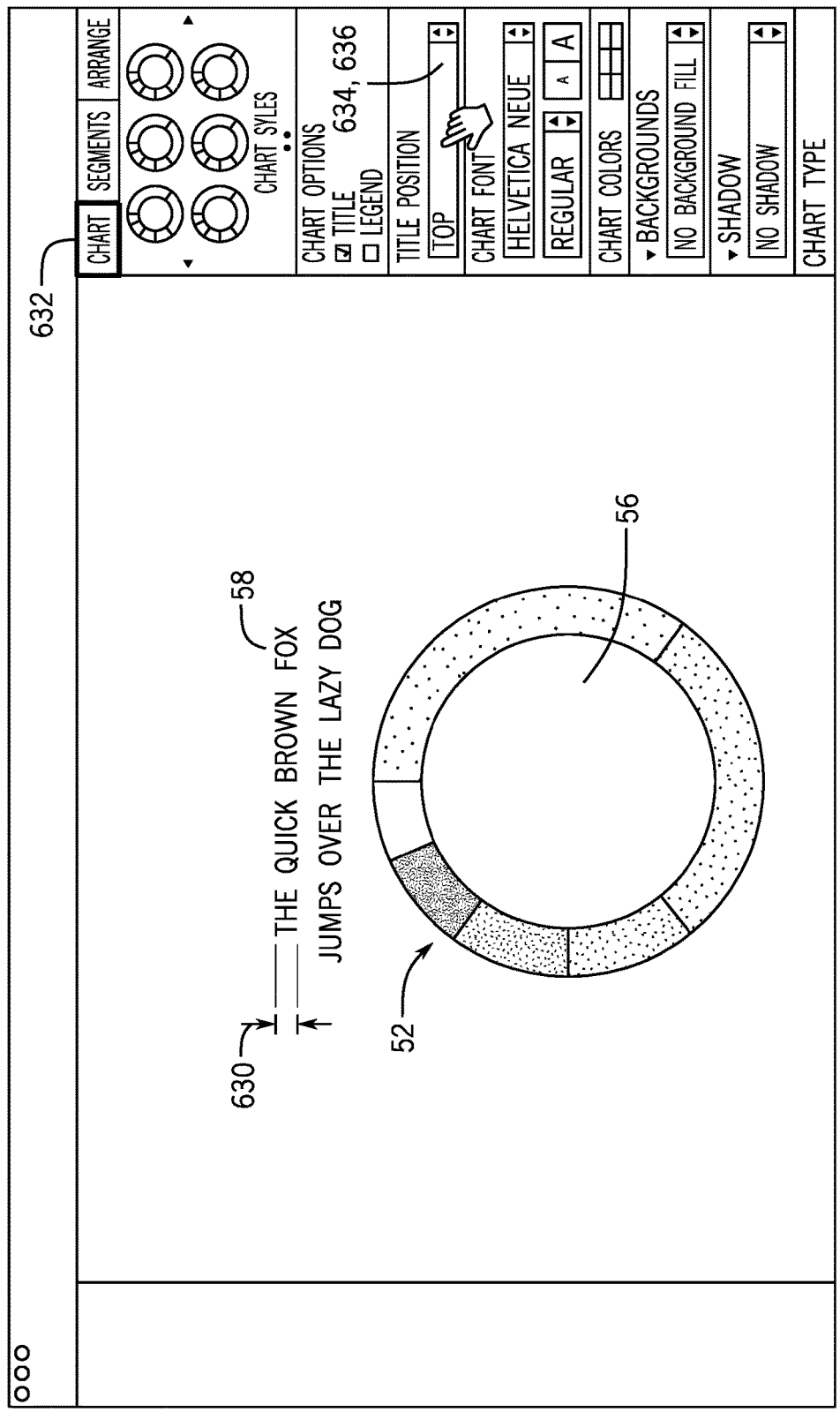
FIGS. 23A-D illustrate dynamically adjusting the title based on adjusting the location of the title of the donut chart of FIG. 7, according to embodiments of the present disclosure.

The processor core complex 12 may also dynamically adjust the title 58 based on adjusting a location of the title 58 of the donut chart 52. For example, FIGS. 23A-D illustrate dynamically adjusting the title 58 based on adjusting the location of the title 58 of the donut chart 52 of FIG. 7, according to embodiments of the present disclosure. In particular, FIG. 23A illustrates the processor core complex 12 displaying the donut chart 52 having the inner hole region 56 and the title 58 above the donut chart 52, which has been selected by the user (e.g., via a mousing device, touch using a touchscreen, a stylus device, or the like). The title 58 may have an initial text size 630 as illustrated. Moreover, a chart tab 632 of the formatting panel 60 may be selected, e.g., by the user or automatically when the donut chart 52 is selected by the user. The chart tab 632 may include the one or chart controls 634 that enable adjustment to at least some properties associated with the donut chart 52. For example, the one or more chart controls 634 may include a title location control 636, which may enable adjusting the location of the title 58 (e.g., above the donut chart 52, below the donut chart 52, to the right of the donut chart 52, to the left of the donut chart 52, in the inner hole region 56, and the like). As illustrated, the title 58 is located above the donut chart 52, and the title location control 636 indicates a top location 638 of the title 58. The initial location of the title 58 may be set by the user or by default (e.g., when first opening the software application 50), and be indicated by the title location control 636.

Figure 23B:
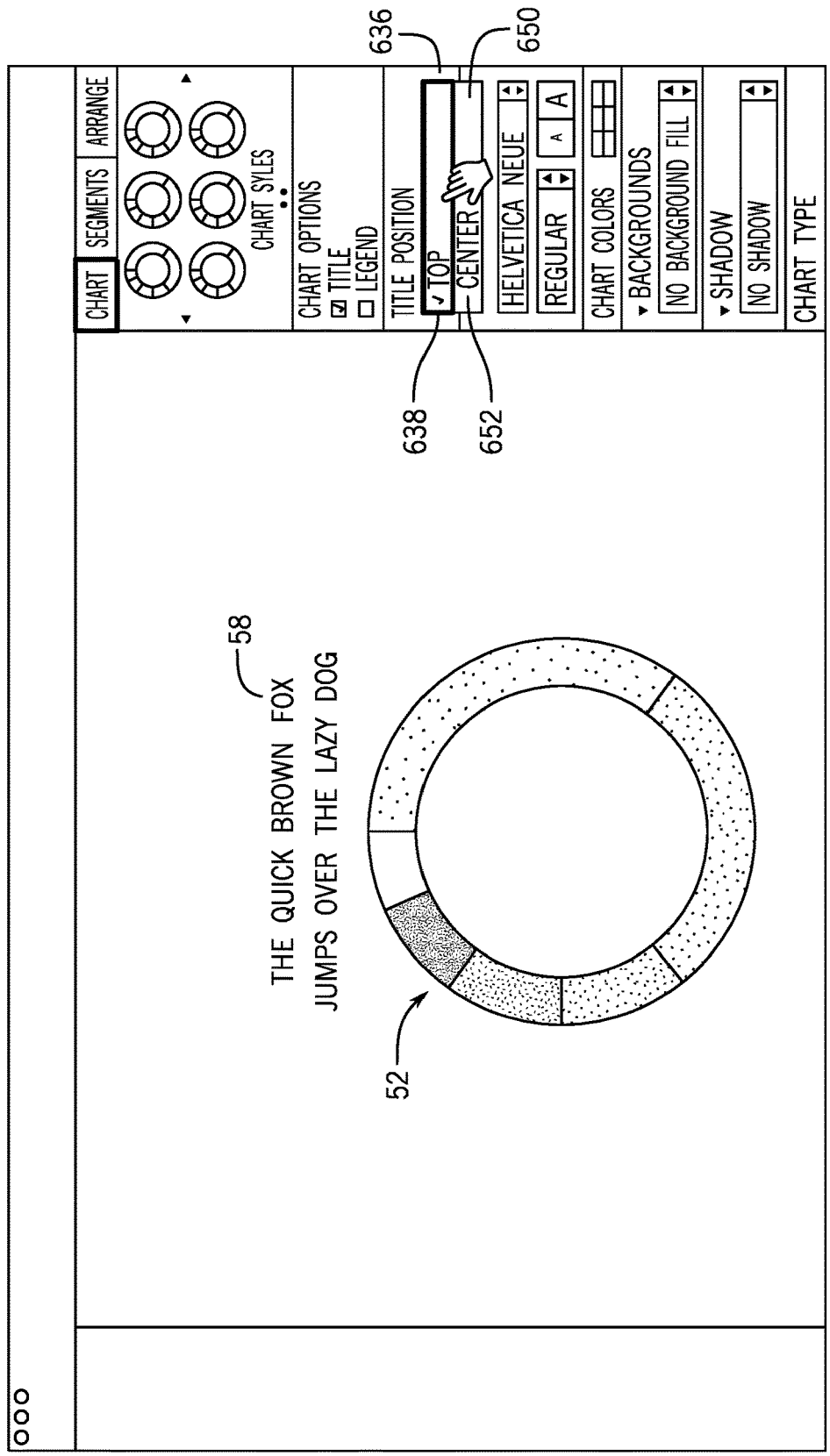
Figure 23C:
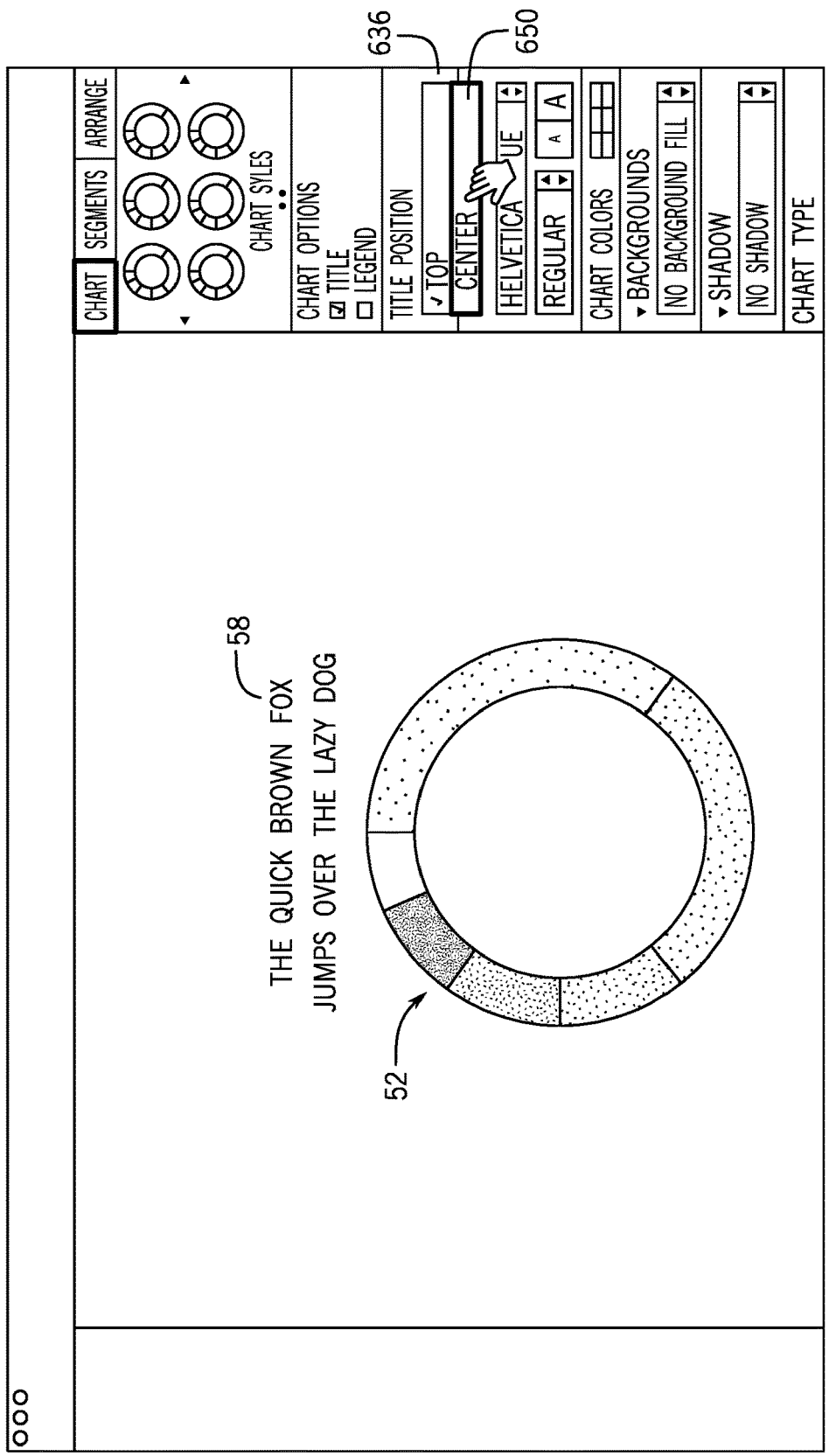
Figure 23D:
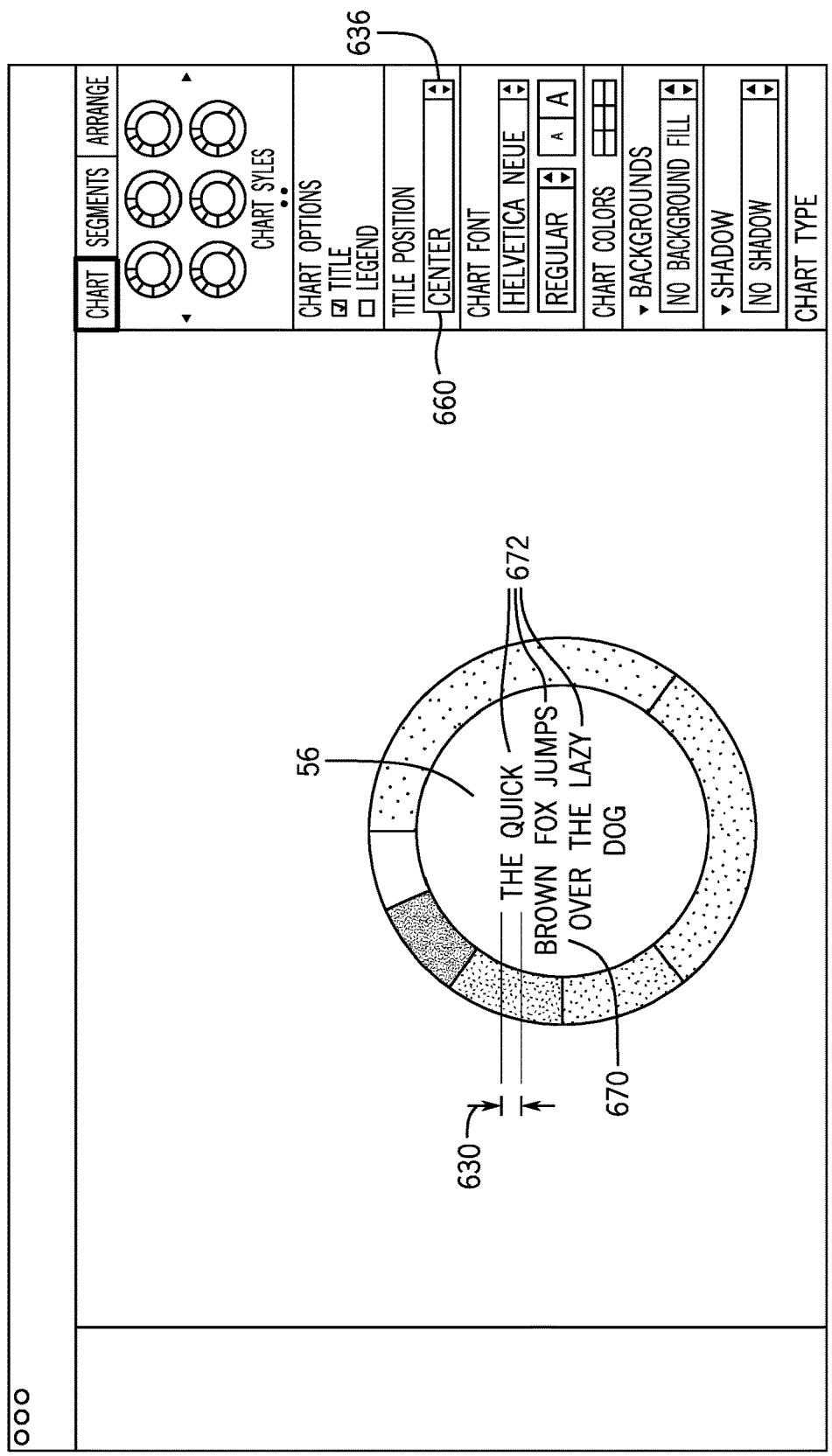

In FIG. 23B, the processor core complex 12 displays a drop-down menu 650 providing multiple locations 652 (e.g., top, bottom, left, right, center, and the like) for the title 58 to be positioned as a result of the user selecting the title location control 636. As illustrated, the current location 638 (top) of the title 58 is pre-selected. In FIG. 23C, the user selects a different location 660 (center) of the title 58. The processor core complex 12 may detect this user input of the change to the location of the title 58 from the current location 638 (top) to the different location 660 (center). The processor core complex 12 may then adjust the location of the title 58 to generate a changed location title. As illustrated in FIG. 23D, the processor core complex 12 adjusts the location of the title 58 from above the donut chart 52 to inside the inner hole region 56 to generate the changed location title 670 in response to detecting the user input of the change in location. The title location control 636 indicates the different location 660 (center) of the title 58.

The processor core complex 12 may determine whether the changed location title 670 fits in the inner hole region 56 on a single line of text. If so, the processor core complex 12 may display the changed location title 670 in the inner hole region 56 as a single line of text. If the changed location title 670 does not fit in the inner hole region 56 on a single line of text, then the processor core complex 12 may dynamically wrap the changed location title 670. Specifically, the processor core complex 12 may dynamically position line breaks 672 of the changed location title 670 to attempt to fit the changed location title 670 in the inner hole region 56 and/or center the changed location title 670 in the inner hole region 56. For example, FIG. 23D illustrates the changed location title 670 that has been dynamically wrapped by the processor core complex 12 with the line breaks 672 in the inner hole region 56. As illustrated, the font size of the dynamically wrapped changed location title 670 is the initial font size 630 (of the title 58 from FIG. 23A). This may be because the processor core complex 12 determines that the changed location title 670 fits in the inner hole region 56 (and so decreasing the size of the changed location title 670 is unnecessary).

If the processor core complex 12 determines that the changed location title 670 does not fit in the inner hole region 56, then the processor core complex 12 may dynamically decrease a text size of the changed location title 670 to generate a smaller title that fits in the inner hole region 56. As such, the processor core complex 12 may dynamically decrease the initial font size 630 of the changed location title 670 to generate a smaller title having a smaller font size. The processor core complex 12 may determine whether the smaller title fits in the inner hole region 56. If so, the processor core complex 12 may display the smaller title in the inner hole region 56. If the processor core complex 12 determines that the smaller title does not fit in the inner hole region 56, then the processor core complex 12 may determine whether the text size of the smaller title is less than or equal to a minimum text size. If not, the processor core complex 12 may decrease the text size of the smaller title. Otherwise, if the processor core complex 12 determines that the text size of the smaller title is less than or equal to the minimum text size, the processor core complex 12 may truncate the smaller title and display the truncated smaller title in the inner hole region 56. That is, the processor core complex 12 may remove a portion of the smaller title and display a unique text character indicating that the smaller title has been truncated.

In this manner, the techniques described with respect FIGS. 23A-D may dynamically adjust the title 58 based on adjusting the location of the title 58 of the donut chart 52 to generate a more visually pleasing donut chart 52, without having a user manually adjust the title 58.

7. Adjusting Label Positions of the Outer Ring Portion of the Donut Chart

The processor core complex 12 may also dynamically adjust the title 58 based on adjusting a layout of the donut chart 52, including label positions of the outer ring portion 54 of the donut chart 52. In particular, the processor core complex 12 may prevent the title 58 from being overlapped by the labels of the outer ring portion 54 when the label positions of the outer ring portion 54 of the donut chart 52 are adjusted.

Figure 24A:
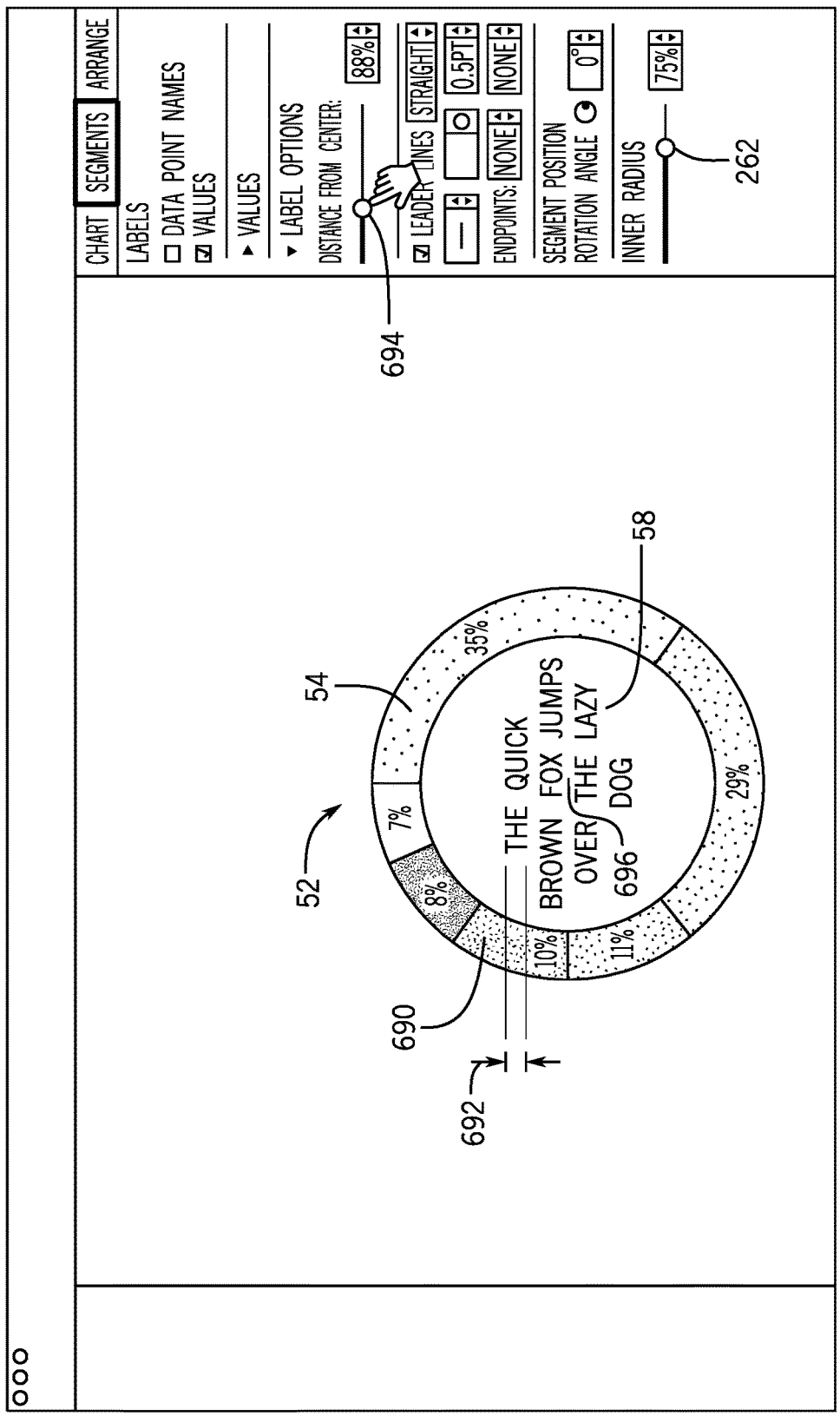
FIGS. 24A-C illustrate dynamically adjusting the title based on adjusting label positions of the outer ring portion of the donut chart of FIG. 7, according to embodiments of the present disclosure.
Figure 24B:
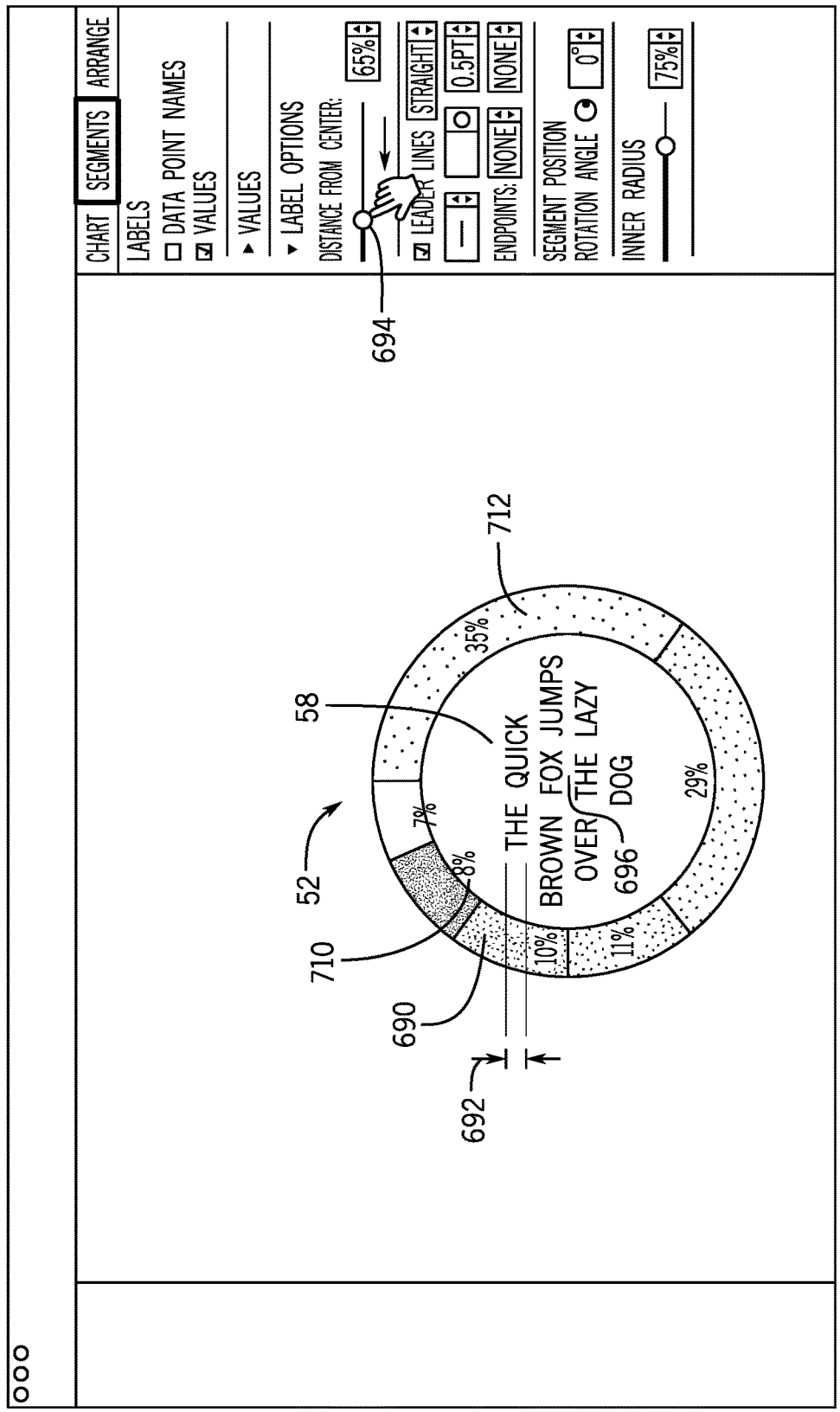
Figure 24C:
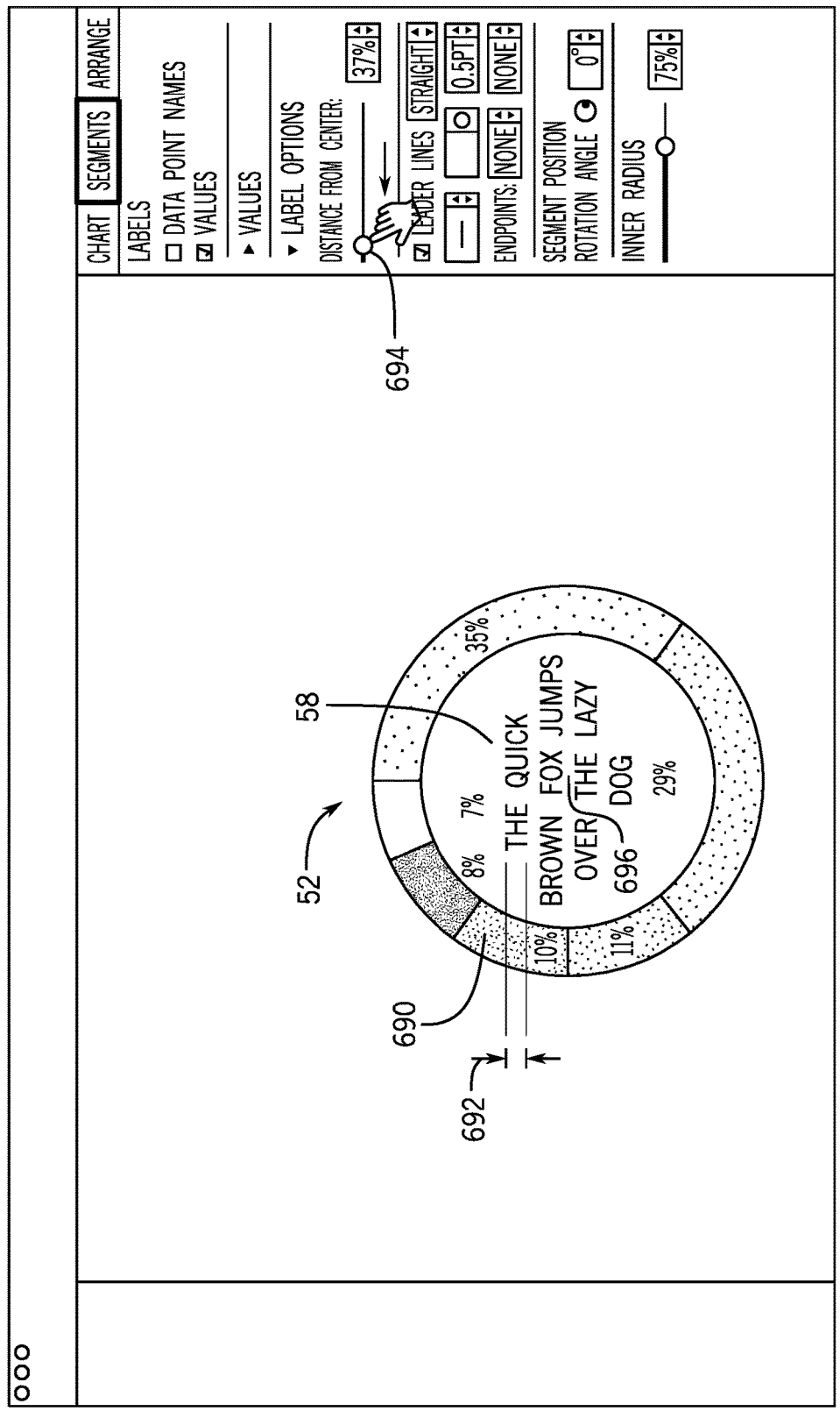

For example, FIGS. 24A-C illustrate dynamically adjusting the title 58 based on adjusting label positions of the outer ring portion 54 of the donut chart 52 of FIG. 7, according to embodiments of the present disclosure. In particular, FIG. 24A illustrates the processor core complex 12 displaying the donut chart 52 having the outer ring portion 54, the inner hole region 56 and the title 58. As illustrated, the outer ring portion 54 includes labels 690 (e.g., 10%), one of which has been selected by the user (e.g., via a mousing device, touch using a touchscreen, a stylus device, or the like). The title 58 may have an initial text size 692 as illustrated. Moreover, the outer ring portion tab 260 (titled "Segments") of the formatting panel 60 may be selected, e.g., by the user or automatically when the label 690 is selected by the user. The outer ring portion tab 260 may include the one or outer ring portion controls 262 that enable adjustment to at least some properties associated with the outer ring portion 54 and/or the inner hole region 56. For example, the one or more outer ring portion controls 262 may include a distance from center control 694, which may enable adjusting the distance of the labels 690 from the center 696 of the donut chart 52. As illustrated, the labels 690 are a distance of 88% from the center 696, as indicated by the distance from center control 694. The initial distance from center of the labels 690 may be set by the user or by default (e.g., when first opening the software application 50). As illustrated, the user may select the distance from center control 694.

In FIG. 24B, the user may adjust the distance from center control 694 to decrease the distance of the labels 690 from the center 696 of the donut chart 52 (to 65%). The processor core complex 12 may detect this user input of the change in the distance of the labels 690 from the center 696 of the donut chart 52. The processor core complex 12 may then adjust the distance of the labels 690 from the center 696 of the donut chart 52 (from 88% to 65%) in response to detecting the user input.

The processor core complex 12 may adjust the title 58 by preventing the title 58 from being overlapped by the labels 690 of the outer ring portion 54. That is, if a label 690 would overlap the title 58 when the distance of the label 690 from the center 696 of the donut chart 52 is decreased as requested by the user, then the label 690 is stopped from overlapping the title 58. For example, a first label 710 (8%) is closer to the center 696 of the donut chart 52 than a second label 712 (35%). This may be because if the distance of second label 712 is decreased any further, then the second label 712 may overlap with the title 58. As illustrated, the processor core complex 12 prevents the title 58 from being overlapped by the labels 690 of the outer ring portion 54.

In FIG. 24C, the user may adjust the distance from center control 694 to decrease the distance of the labels 690 further from the center 696 of the donut chart 52 (to 32%). The processor core complex 12 may detect this user input of the change in the distance of the labels 690 from the center 696 of the donut chart 52. The processor core complex 12 may then adjust the distance of the labels 690 from the center 696 of the donut chart 52 (from 65% to 32%) in response to detecting the user input.

The processor core complex 12 may adjust the title 58 by preventing the title 58 from being overlapped by the labels 690 of the outer ring portion 54. As such, if a label 690 would overlap the title 58 when the distance of the label 690 from the center 696 of the donut chart 52 is decreased as requested by the user, then the label 690 is stopped from overlapping the title 58. As illustrated, the processor core complex 12 prevents the title 58 from being overlapped by the labels 690 of the outer ring portion 54.

Figure 25A:
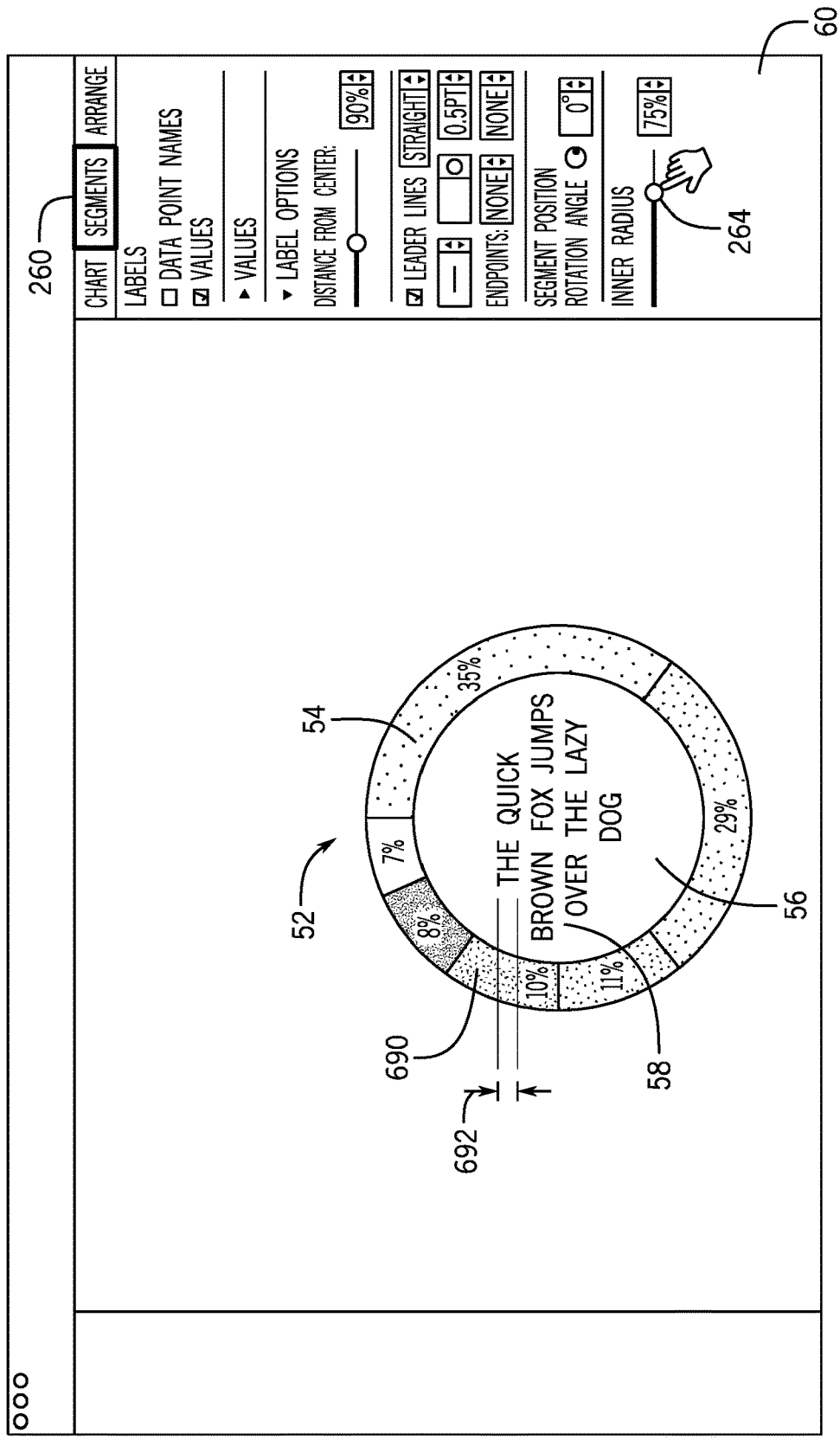
FIGS. 25A-D illustrate additional examples of dynamically adjusting the title based on adjusting components of the outer ring portion of the donut chart of FIG. 7, according to embodiments of the present disclosure.

FIGS. 25A-D illustrate additional examples of dynamically adjusting the title 58 based on adjusting components of the outer ring portion 54 of the donut chart 52 of FIG. 7, according to embodiments of the present disclosure. In particular, FIG. 25A illustrates the processor core complex 12 displaying the donut chart 52 having the outer ring portion 54, the inner hole region 56 and the title 58. As illustrated, the outer ring portion 54 includes labels 690 (e.g., 10%), one of which has been selected by the user (e.g., via a mousing device, touch using a touchscreen, a stylus device, or the like). The title 58 may have an initial text size 692 as illustrated. Moreover, the outer ring portion tab 260 (titled "Segments") of the formatting panel 60 may be selected, e.g., by the user or automatically when the label 690 is selected by the user, and the user may select the inner radius control 264. As illustrated, the inner radius control 264 shows an inner radius of the inner hole region 56 to be 75% and may enable adjustment of the inner radius of the inner hole region 56.

Figure 25B:
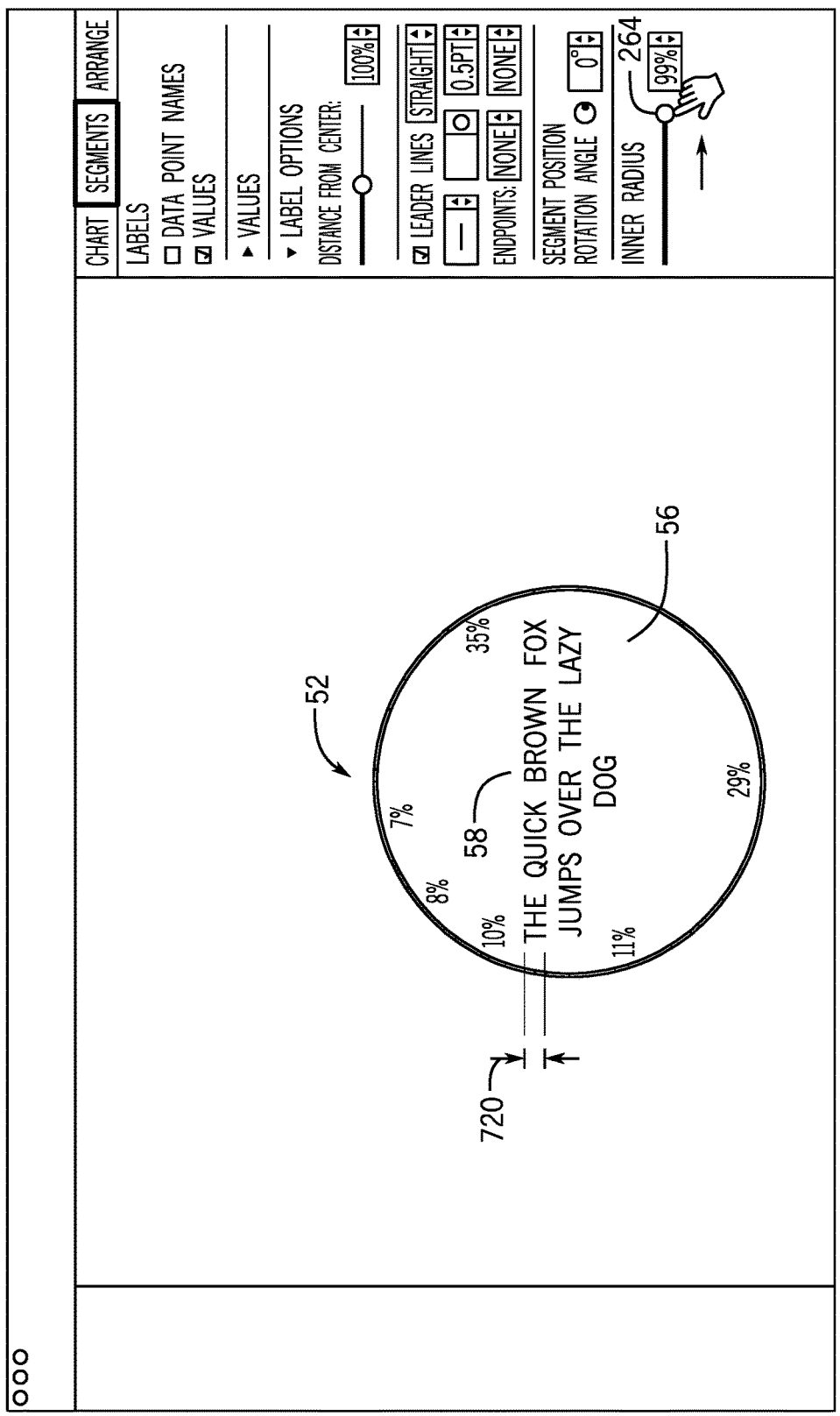

For the purposes of clarity, in FIG. 25B, the user may adjust the inner radius control 264 to increase the inner radius of the inner hole region 56 (to 99%). The processor core complex 12 may detect this user input of the change in the inner radius of the inner hole region 56. The processor core complex 12 may then adjust the inner radius of the inner hole region 56 (from 75% to 99%) in response to detecting the user input. As discussed above with respect to the process 230 of FIGS. 13A-B and the techniques described with respect FIGS. 14A-D and 15A-D above, the processor core complex 12 may dynamically adjust the title 58 based on adjusting the size of the inner hole region 56 (e.g., by dynamically adjusting the text size and/or dynamically rewrapping the title 58).

Figure 25C:
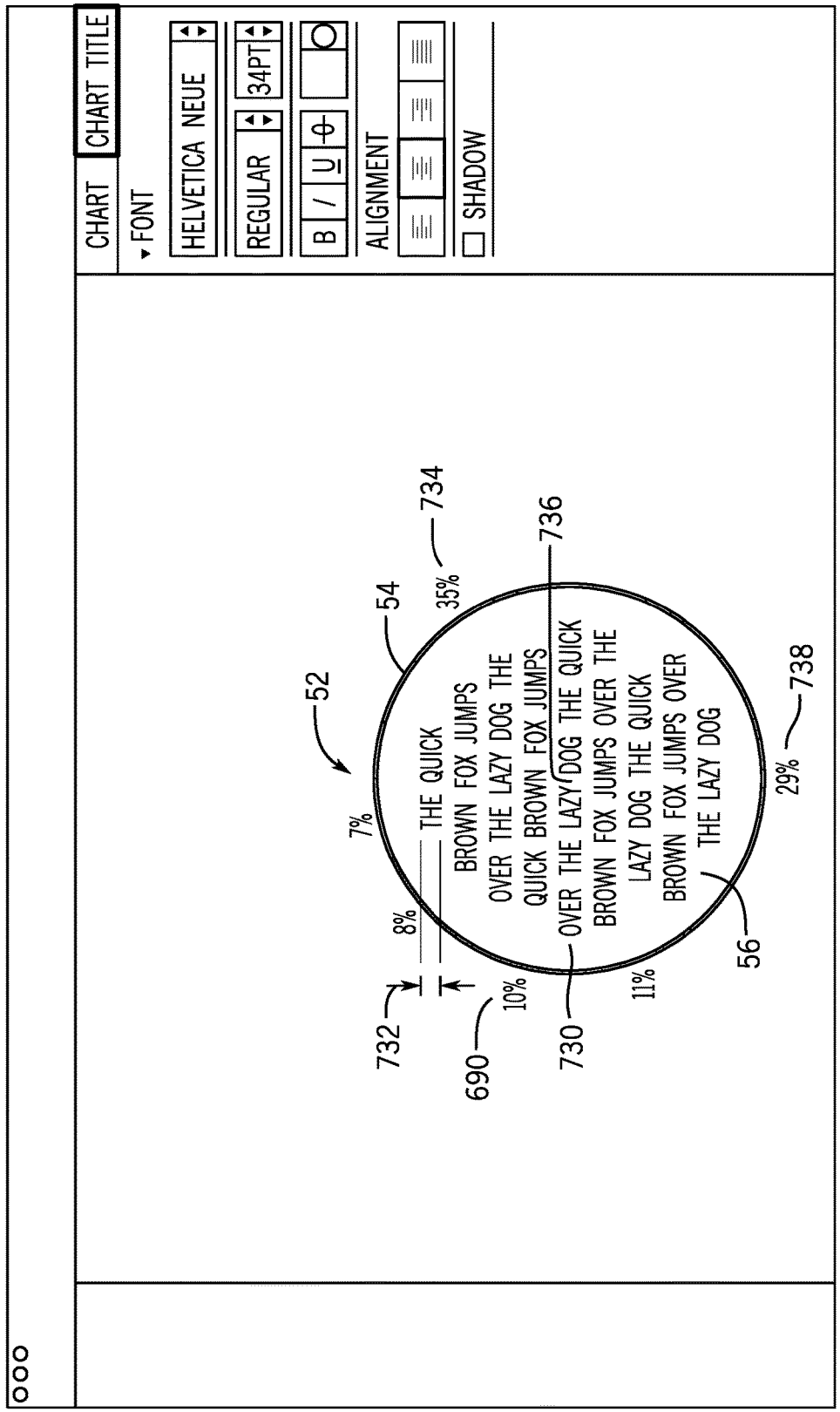

As shown in FIG. 25C, the user may add text to the title 58 of FIG. 25B to generate a longer title. As explained above with respect to the process 100 of FIG. 9 and the techniques described with respect FIGS. 10A-D, 11A-D, and 12A-C, the processor core complex 12 may detect the user input of adding text to the title 58. The text is then detected and/or received by the processor core complex 12. The processor core complex 12 may add the text to the title 58 to generate the longer title. The processor core complex 12 may determine whether the longer title fits in the inner hole region 56 of the donut chart 52 in a single line of text. If the processor core complex 12 determines that the longer title fits in the inner hole region 56 in a single line of text, then the processor core complex 12 may display the longer title in a single line of text in the inner hole region. Otherwise, the processor core complex 12 may dynamically wrap the longer title. The processor core complex 12 may determine whether the dynamically wrapped longer title fits in the inner hole region 56 of the donut chart 52. If the processor core complex 12 determines that the dynamically wrapped longer title 58 fits in the inner hole region 56 as illustrated in FIG. 25B, then the processor core complex 12 may display the dynamically wrapped longer title 58 in the inner hole region 56. If the processor core complex 12 determines that the dynamically wrapped longer title 58 does not fit in the inner hole region 56 as illustrated in FIG. 25C, then the processor core complex 12 dynamically decreases a text size of the dynamically wrapped longer title 58 to generate a smaller title 730 to attempt to fit the smaller title 730 in the inner hole region 56. In particular, the processor core complex 12 determines that the longer title 142 overlaps the outer ring portion 54, and thus does not fit in the inner hole region 56. As such, the processor core complex 12 dynamically decreases a text size of the longer title (e.g., the text size 720 of the title 58 from FIG. 25B) to generate a smaller title 730 having a text size 732 to attempt to fit the smaller title 730 in the inner hole region 56. The processor core complex 12 may then determine whether the smaller title 730 fits in the inner hole region 56. If so, the processor core complex 12 may display the smaller title 730 in the inner hole region 56. If the smaller title 730 does not fit in the inner hole region 56, then the processor core complex 12 may determine whether the text size of the smaller title 730 is less than or equal to a minimum text size. If not, the processor core complex 12 may further decrease the text size of the smaller title 730. If the text size of the smaller title 730 is less than or equal to a minimum text size, then the processor core complex 12 may truncate the smaller title 730 and display the truncated smaller title 730 in the inner hole region 56.

In any case, the processor core complex 12 may adjust the smaller title 730 by preventing the smaller title 730 from being overlapped by the labels 690 of the outer ring portion 54. That is, if a label 690 would overlap the smaller title 730 when the smaller title 730 is generated (e.g., by adding text to the title 58 of FIG. 25B), then the label 690 is stopped from overlapping the smaller title 730. For example, a first label 734 (35%) is closer to the center 736 of the donut chart 52 than a second label 738 (29%). This may be because if the distance of second label 738 is decreased any further, then the second label 738 may overlap with the smaller title 730. As illustrated, the processor core complex 12 prevents the smaller title 730 from being overlapped by the labels 690 of the outer ring portion 54.

Figure 25D:
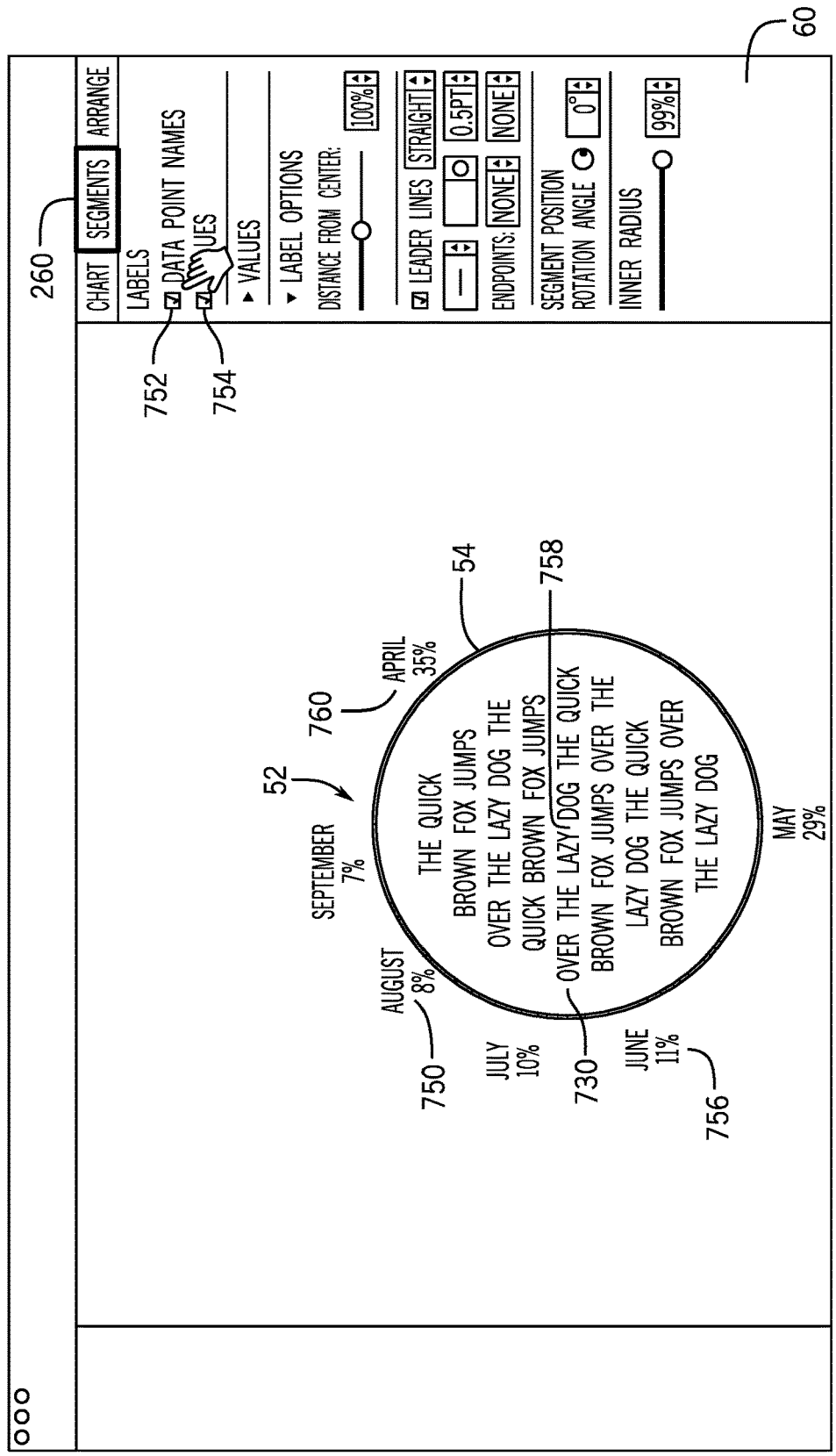

In FIG. 25D, the user may add text to the labels 690 of the outer ring portion 54 of the donut chart 52 of FIG. 25C to generate longer labels 750. In particular, the outer ring portion tab 260 (titled "Segments") of the formatting panel 60 may be selected, e.g., by the user or automatically when the donut chart 52 or a portion of the donut chart 52 (such as the inner hole region 56 or the outer ring portion 54) is selected by the user. The outer ring portion tab 260 may include a data point names control 752 that, when selected, displays names of data points in the labels 690. As illustrated, a values control 754 is already preselected (e.g., by the user or by default). The values control 754 may, when selected, display values of data points in the labels 690. For example, the longer label 750 has a data point name of "August" and a data point value of "8%."

The processor core complex 12 may adjust the smaller title 730 by preventing the smaller title 730 from being overlapped by the longer labels 750 of the outer ring portion 54. That is, if a longer label 750 would overlap the smaller title 730 when the longer label 750 is generated (e.g., by adding the data point name to the label 690 of FIG. 25C by selecting the data point names control 752), then the longer label 750 is stopped from overlapping the smaller title 730. For example, a first label 756 (June 11%) is closer to the center 758 of the donut chart 52 than a second label 760 (April 35%). This may be because if the distance of second label 760 is decreased any further, then the second label 760 may overlap with the smaller title 730. As illustrated, the processor core complex 12 prevents the smaller title 730 from being overlapped by the longer labels 750 of the outer ring portion 54.

In this manner, the techniques described with respect to FIGS. 24A-C and 25A-D may dynamically adjust the title 58 based on adjusting a layout of the donut chart 52, including label positions of the outer ring portion 54 of the donut chart 52, to generate a more visually pleasing donut chart 52, without having a user manually adjust the title 58.

8. Adjusting Segments of the Outer Ring Portion of the Donut Chart

The processor core complex 12 may also dynamically adjust the title 58 based on adjusting a segment of the outer ring portion 54 of the donut chart 52. In particular, the processor core complex 12 may maintain the title 58 (e.g., properties of the title 58 such as position, font size, font, font properties, wrapping, and the like) when the segment of the outer ring portion 54 of the donut chart 52 is adjusted.

Figure 26A:
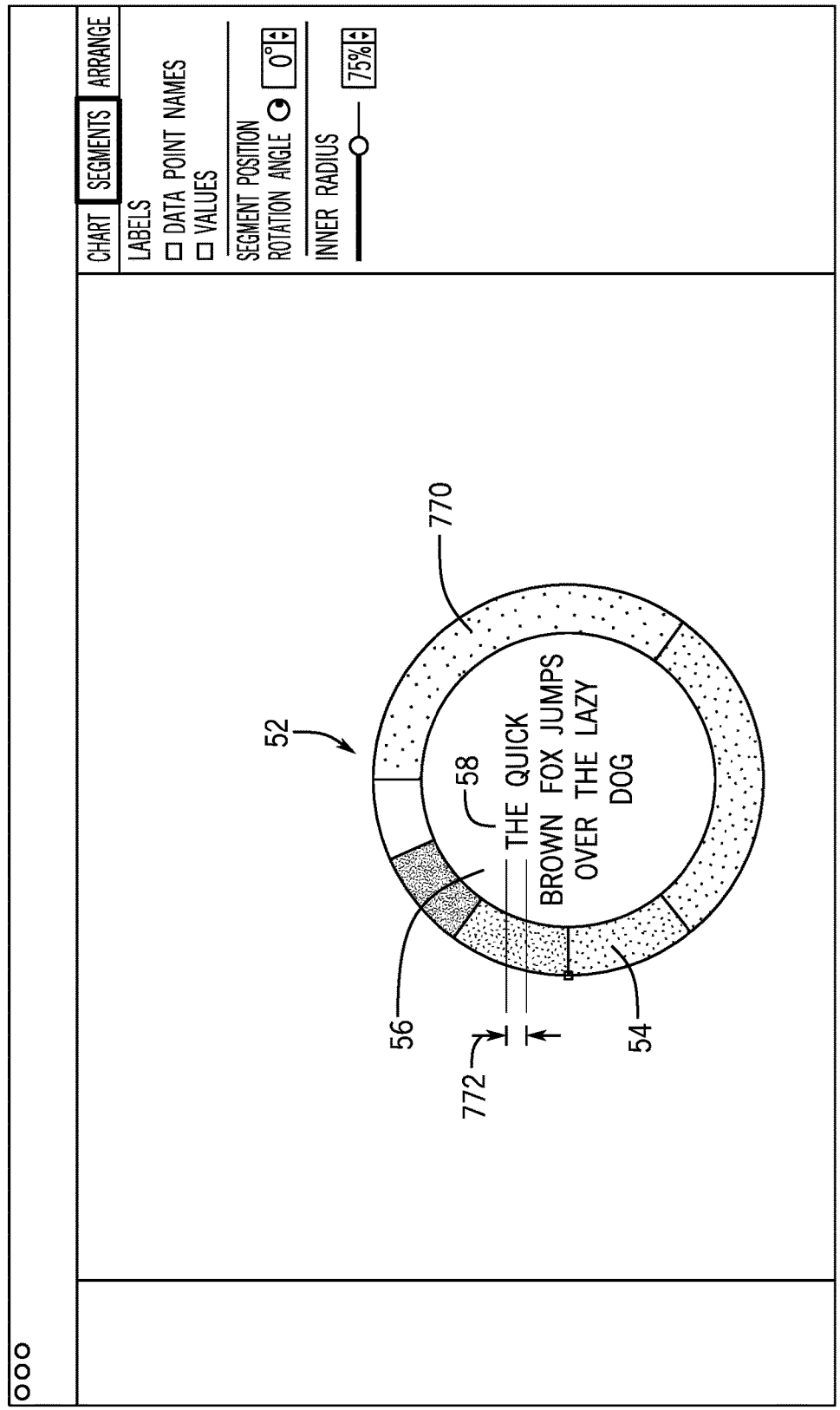
FIGS. 26A-E illustrate dynamically adjusting the title based on adjusting a segment of the outer ring portion of the donut chart of FIG. 7, according to embodiments of the present disclosure.
Figure 26B:
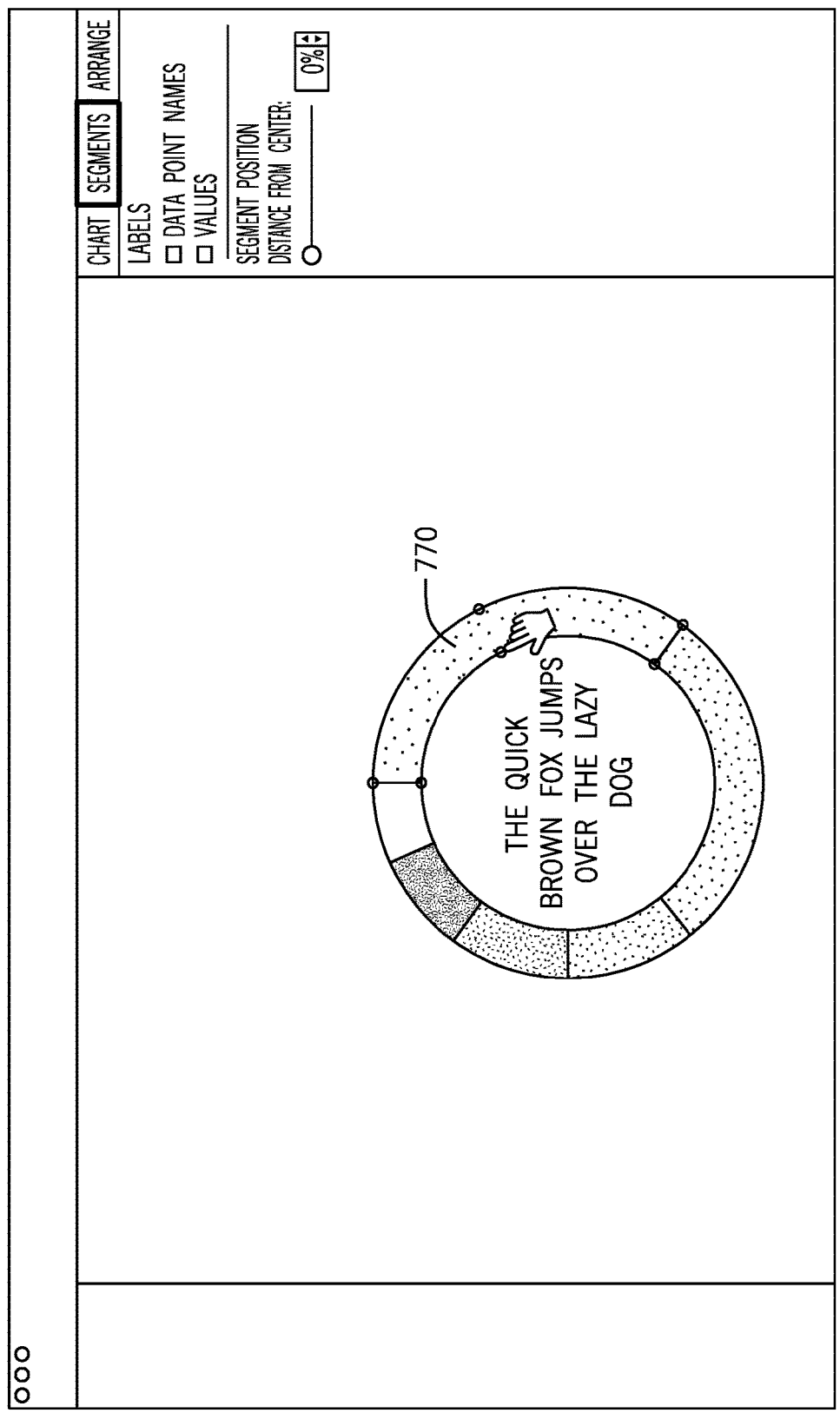

For example, FIGS. 26A-E illustrate dynamically adjusting the title 58 based on adjusting a segment of the outer ring portion 54 of the donut chart 52 of FIG. 7, according to embodiments of the present disclosure. In particular, FIG. 26A illustrates the processor core complex 12 displaying the donut chart 52 having the outer ring portion 54, the inner hole region 56 and the title 58. As illustrated, the outer ring portion 54 includes segments 770. The title 58 may have an initial text size 772 as illustrated. In FIG. 26B, a segment 770 has been selected by the user (e.g., via a mousing device, touch using a touchscreen, a stylus device, or the like).

Figure 26C:
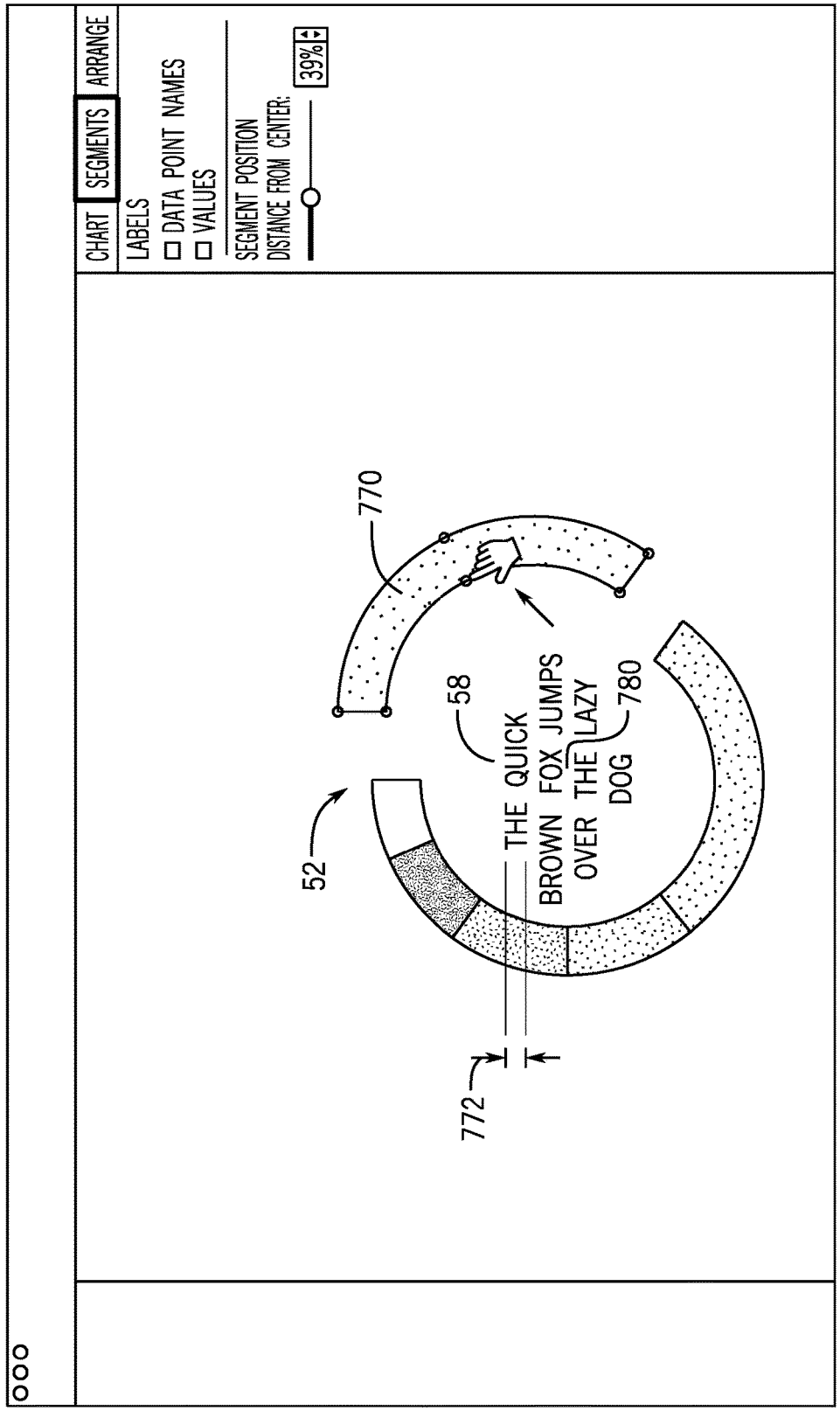

In FIG. 26C, the user adjusts the segment 770 by changing its position. As illustrated, the user drags the segment 770 away from the center 780 of the donut chart 52. The processor core complex 12 may detect this user input of the change in position of the segment 770. The processor core complex 12 may then move the segment 770 away from the center 780 of the donut chart 52 in response to detecting the user input.

The processor core complex 12 may adjust the title 58 by maintaining the title 58 (e.g., properties of the title 58 such as position, size, font, font properties, wrapping, and the like). That is, processor core complex 12 may not change the title 58, including the properties of the title 58, despite moving the segment 770 away from the center 780 of the donut chart 52. As illustrated, the processor core complex 12 maintains the title 58 in the inner hole region 56 of the donut chart 52.

Figure 26D:
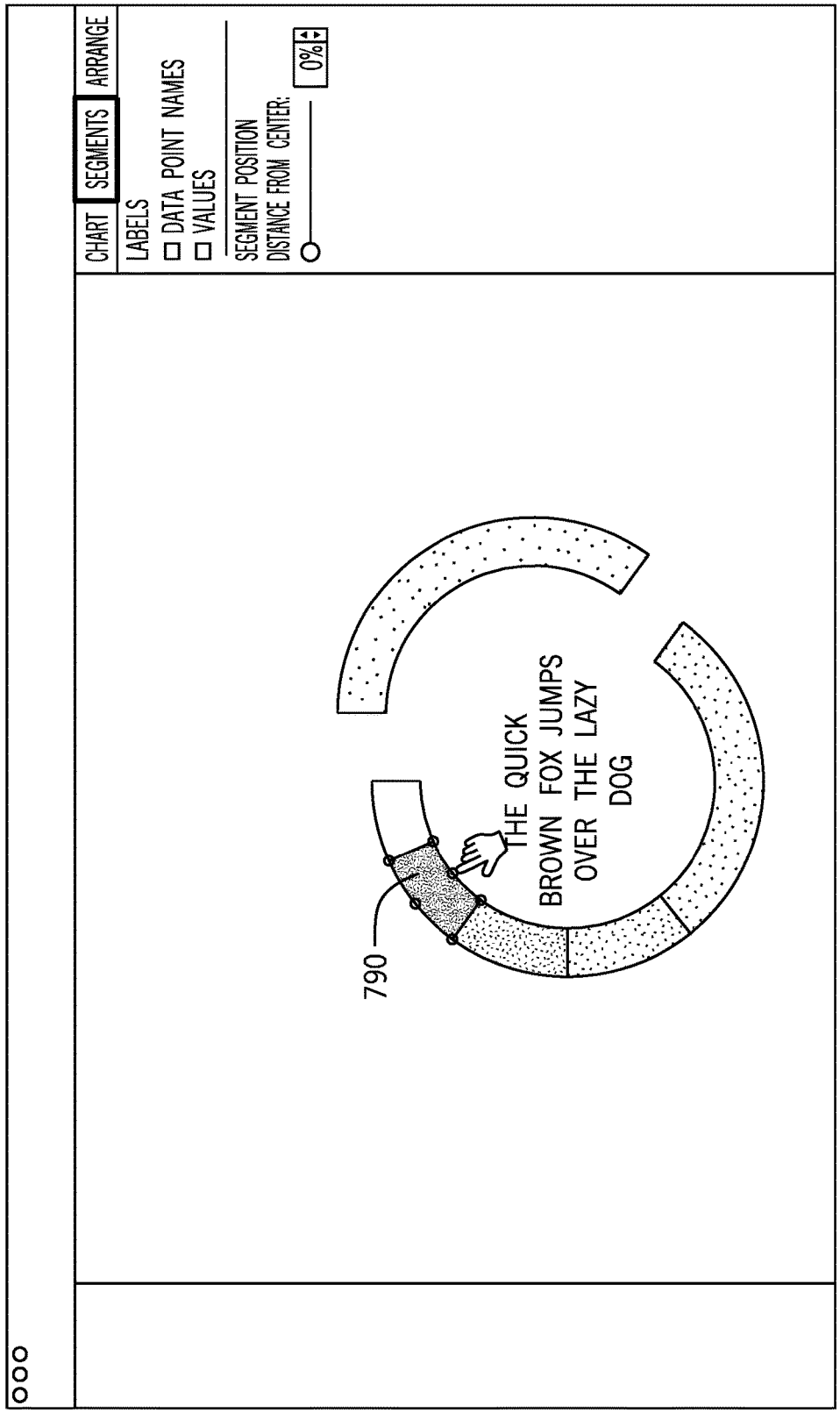
Figure 26E:
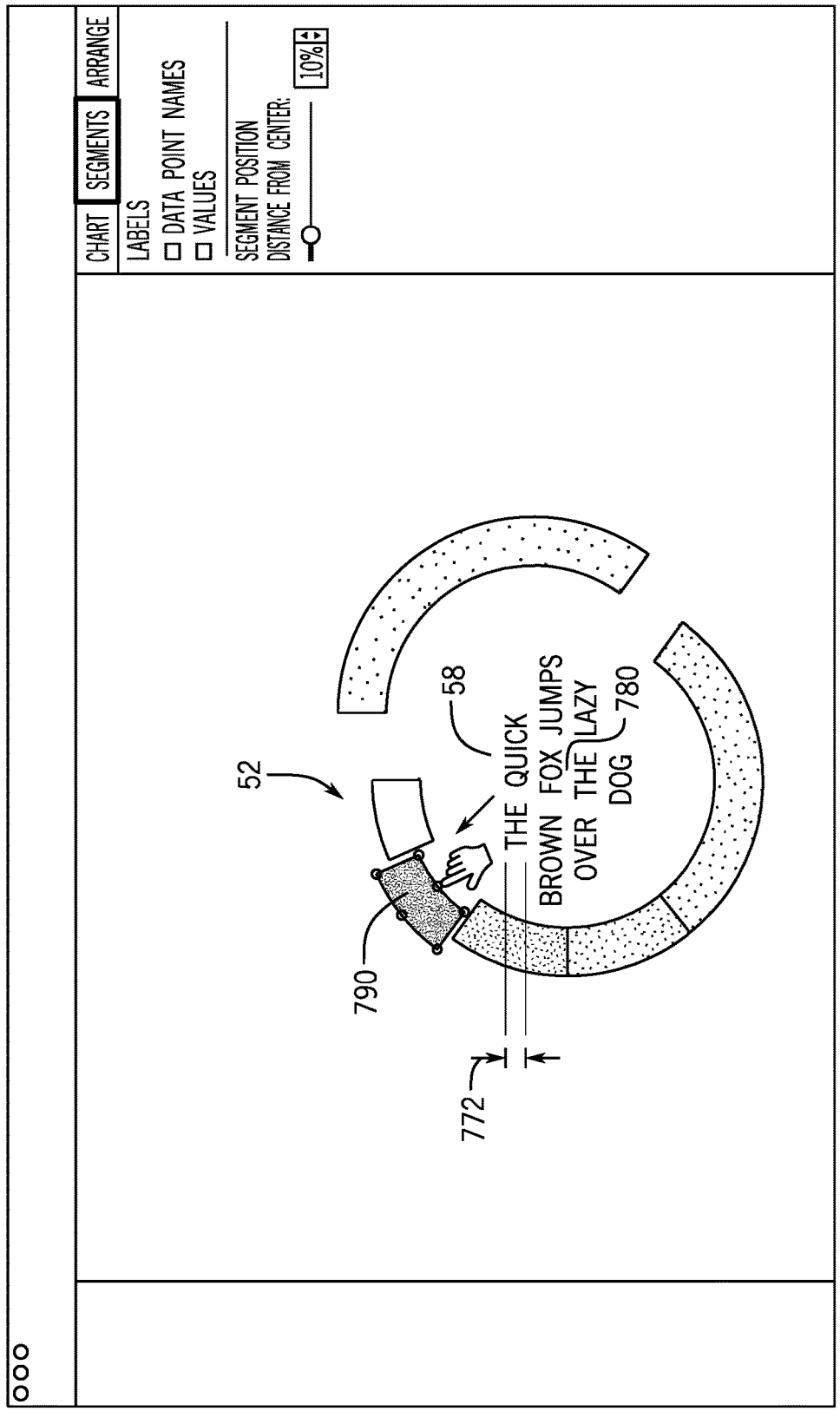

In FIG. 26D, another segment 790 has been selected by the user (e.g., via a mousing device, touch using a touchscreen, a stylus device, or the like). In FIG. 26E, the user adjusts the segment 790 by changing its position. As illustrated, the user drags the segment 790 away from the center 780 of the donut chart 52. The processor core complex 12 may detect this user input of the change in position of the segment 790. The processor core complex 12 may then move the segment 790 away from the center 780 of the donut chart 52 in response to detecting the user input.

The processor core complex 12 may adjust the title 58 by maintaining the title 58 (e.g., properties of the title 58 such as position, size, font, font properties, wrapping, and the like). That is, processor core complex 12 may not change the title 58, including the properties of the title 58, despite moving the segment 790 away from the center 780 of the donut chart 52. As illustrated, the processor core complex 12 maintains the title 58 in the inner hole region 56 of the donut chart 52.

In this manner, the techniques described with respect to FIGS. 26A-E may dynamically adjust the title 58 based on adjusting a segment of the outer ring portion 54 of the donut chart 52 to generate a more visually pleasing donut chart 52, without having a user manually adjust the title 58.

The technical effects of the present disclosure include dynamically adjusting a title 58 of a donut chart 52 based on an adjustment to the donut chart 52. The donut chart 52 may include an outer ring portion 54, an inner hole region 56, and the title 58. In particular, the title 58 may be set based on the inner hole region 56 to prevent the title 58 from overlapping the outer ring portion 54, which may, for example, prevent the title 58 from obscuring labels located in the outer ring portion. In some embodiments, the title 58 may be dynamically sized (e.g., the font size of the title 58 may be adjusted) and dynamically wrapped (e.g., the locations of line breaks in the title 58 may be adjusted) in the inner hole region 56 of the donut chart 52 for better visual effect. The title 58 may be wrapped in a circular shape within the inner hole region 56 such that the placement/rendering of the title 58 better fits the curvature of the inner hole region 56, resulting in a more natural and pleasing look and feel. Moreover, as a property (such as the font size of the title 58, the size of the donut chart 52, the size of the inner hole region 56, and the like) of the donut chart 52 may be adjusted, the title 58 may be automatically adjusted for better visual effect. For example, the title 58 may be dynamically resized (e.g., shrunk, shortened, lengthened, enlarged, and the like) and/or dynamically rewrapped (e.g., the locations of line breaks in the title may be adjusted). In this manner, the title 58 may be dynamically adjusted based on an adjustment to the donut chart 52, avoiding the tedious process of manually adjusting the title 58 for better visual effect.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computer program product for displaying a donut chart comprising an outer ring portion, an inner hole region, and a title, the computer program product being embodied in a non-transitory computer readable storage medium and comprising computer-executable instructions for:
   displaying the donut chart on an electronic computing device;
   detecting user input at the electronic computing device corresponding to a property adjustment for the donut chart;
   applying the property adjustment to the donut chart, resulting in one or more adjusted properties of the donut chart; and
   dynamically adjusting a title property based on the one or more adjusted properties of the donut chart in response to applying the property adjustment to the donut chart, such that the title property appears to be visually adjusted as the property adjustment is applied.

2. The computer program product of claim 1, wherein the property adjustment comprises adding text to the title, wherein the one or more adjusted properties of the donut chart comprise a longer title, wherein dynamically adjusting the title property comprises dynamically wrapping the longer title in response to adding the text to the title.

3. The computer program product of claim 2, wherein the computer-executable instructions include:
   determining whether the longer title fits within a bounding area of the inner hole region; and
   if the longer title does not fit, dynamically decreasing a text size of the longer title to generate a smaller title that fits within the bounding area of inner hole region.

4. The computer program product of claim 3, wherein the computer-executable instructions include:
   detecting user input at the electronic computing device corresponding to deleting smaller title text from the smaller title;
   deleting the smaller title text from the smaller title; and dynamically increasing a text size of the smaller title to generate a larger title in response to deleting the smaller title text from the smaller title.

5. The computer program product of claim 4, wherein a text size of the larger title is bounded to be less than or equal to an initial text size of the title.

6. The computer program product of claim 3, wherein the computer-executable instructions include:
determining whether the text size of the longer title exceeds a minimum threshold text size for readability;
in response to determining that a reduction of the text size of the longer title would extend beyond the minimum threshold text size for readability:
dynamically setting the text size of the longer title to the minimum threshold text size for readability; and
dynamically truncating the title and inserting a unique text character into the title.

7. The computer program product of claim 6, wherein the unique text character is an ellipsis.

8. The computer program product of claim 1, wherein the property adjustment comprises decreasing a size of the inner hole region, wherein the one or more adjusted properties of the donut chart comprise a smaller inner hole region, wherein dynamically adjusting the title property comprises dynamically wrapping the title in response to decreasing the size of the inner hole region.

9. The computer program product of claim 8, wherein the computer-executable instructions include:
determining whether the title fits in the smaller inner hole region; and
dynamically decreasing a text size of the title to generate a smaller title that fits in the smaller inner hole region in response to determining that the title does not fit in the smaller inner hole region.

10. The computer program product of claim 9, wherein the computer-executable instructions include:
applying a subsequent property adjustment to the donut chart to increase a size of the smaller inner hole region, resulting in a larger inner hole region; and
dynamically increasing a text size of the smaller title to generate a larger title that fits within the larger inner hole region in response to applying the subsequent property adjustment to the donut chart to increase the size of the smaller inner hole region.

11. The computer program product of claim 10, wherein the computer-executable instructions include:
bounding the text size of the larger title to be less than or equal to an initial text size of the title.

12. The computer program product of claim 10, wherein decreasing the size of the inner hole region occurs based on decreasing a size of the donut chart to generate a reduced donut chart, wherein increasing the size of the smaller inner hole region occurs based on increasing a size of the reduced donut chart.

13. The computer program product of claim 1, wherein the property adjustment comprises increasing a size of the inner hole region, wherein dynamically adjusting the title property comprises dynamically wrapping the title to take up more horizontal space within the inner hole region in response to increasing the size of the inner hole region.

14. A tangible, non-transitory, computer-readable medium that stores instructions for displaying a donut chart comprising an outer ring portion, an inner hole region, and a title, executable by at least one processor that, when executed by the at least one processor, cause the at least one processor to:
display the donut chart on an electronic computing device;
detect user input at the electronic computing device corresponding to a property adjustment for the donut chart;
apply the property adjustment to the donut chart, resulting in one or more adjusted properties of the donut chart; and
dynamically adjust a title property based on the one or more of the adjusted properties of the donut chart in response to applying the property adjustment to the donut chart, such that the title property appears to be visually adjusted as the property adjustment is applied.

15. The tangible, non-transitory, computer-readable medium of claim 14, wherein the property adjustment comprises changing a font property of the title, wherein the one or more adjusted properties comprise a changed font title, wherein dynamically adjusting the title property comprises dynamically wrapping the changed font title based on the change to the font property of the title so that the changed font title fits in the inner hole region in response to changing the font property of the title, dynamically resizing the changed font title based on the change to the font property of the title so that the changed font title fits in the inner hole region in response to changing the font property of the title, or both.

16. The tangible, non-transitory, computer-readable medium of claim 15, wherein the font property comprises a font type, a font size, a font emphasis, a font spacing, or any combination thereof.

17. The tangible, non-transitory, computer-readable medium of claim 14, wherein the property adjustment comprises changing a location of the title by disposing the title in the inner hole region or outside of the outer ring portion, wherein the instructions cause the at least one processor to dynamically adjust the title property by dynamically wrapping the title when the instructions cause the at least one processor to adjust the property of the donut chart by disposing the title in the inner hole region.

18. A method for displaying a donut chart comprising an outer ring portion, an inner hole region, and a title, wherein the outer ring portion comprises at least one donut chart segment, wherein the method comprises:
displaying the donut chart on an electronic computing device;
detecting user input at the electronic computing device corresponding to a property adjustment for the donut chart;
applying the property adjustment to the donut chart, resulting in one or more adjusted properties of the donut chart; and
dynamically adjusting a title property based on the one or more of the adjusted properties of the donut chart in response to applying the property adjustment to the donut chart, such that the title property appears to be visually adjusted as the property adjustment is applied.

19. The method of claim 18, wherein the property adjustment comprises changing a layout of the donut chart, wherein dynamically adjusting the title property comprises dynamically preventing a label of the at least one donut chart segment from overlapping the title property.

20. The method of claim 18, wherein the outer ring portion comprises a plurality of donut chart segments, wherein the property adjustment comprises exploding a donut chart segment of the plurality of donut chart segments, wherein dynamically adjusting the title property comprises dynamically maintaining the title property based on exploding the donut chart segment.

* * * * *